United States Patent
Buck et al.

(10) Patent No.: US 9,885,174 B2
(45) Date of Patent: Feb. 6, 2018

(54) SOUND ABATEMENT SYSTEM AND METHOD

(71) Applicants: Larry Ray Buck, Fort Worth, TX (US); Earl G. Gauntt, Fort Worth, TX (US)

(72) Inventors: Larry Ray Buck, Fort Worth, TX (US); Earl G. Gauntt, Fort Worth, TX (US)

(*) Notice: Subject to any disclaimer, the term of this patent is extended or adjusted under 35 U.S.C. 154(b) by 684 days.

(21) Appl. No.: 14/310,368

(22) Filed: Jun. 20, 2014

(65) Prior Publication Data

US 2015/0240484 A1 Aug. 27, 2015

Related U.S. Application Data

(60) Provisional application No. 61/944,202, filed on Feb. 25, 2014.

(51) Int. Cl.
*E04B 1/82* (2006.01)
*F16B 2/08* (2006.01)
*F16B 7/04* (2006.01)

(52) U.S. Cl.
CPC .......... *E04B 1/8227* (2013.01); *E04B 1/8209* (2013.01); *E04B 2001/8263* (2013.01); *F16B 2/08* (2013.01); *F16B 7/0493* (2013.01); *Y10T 403/7194* (2015.01)

(58) Field of Classification Search
CPC .... E04B 1/8209; E04B 1/8218; E04B 1/8227; E04B 2001/8263; F16B 2/08; F16B 7/0493; Y10T 403/7171; Y10T 403/7194
USPC .......... 256/24, 25, 28–30, 73; 403/396, 400
See application file for complete search history.

(56) References Cited

U.S. PATENT DOCUMENTS

| | | | | |
|---|---|---|---|---|
| 4,040,212 A | * | 8/1977 | Goransson | E04B 1/8209 181/287 |
| 4,258,511 A | * | 3/1981 | Strain | E04B 1/8218 52/270 |
| 4,283,154 A | * | 8/1981 | Shepherd | F16B 7/0493 403/400 |
| 4,592,186 A | * | 6/1986 | Braginetz | E04B 1/2604 403/396 |
| 5,566,916 A | * | 10/1996 | Bailey | F16L 3/1226 24/277 |
| 5,661,273 A | * | 8/1997 | Bergiadis | E01F 8/0029 181/285 |

(Continued)

OTHER PUBLICATIONS

"Urban Drilling, Fracing, and Production Noise Impact and Control Overview" Behrens and Associates, Environmental Noise Control, Inc.; www.environmental-noise-control.com; www.drillingnoisecontrol.com; 44 pgs.

*Primary Examiner* — Josh Skroupa
(74) *Attorney, Agent, or Firm* — David W. Carstens; Krista Y. Chan; Carstens & Cahoon, LLP

(57) ABSTRACT

A sound abatement system and method providing for assembly of stacked acoustic suppression walls is disclosed. The system incorporates vertical support members (VSM) and/or vertical I-beams (VIB) driven into the ground that support an acoustic suppression panel (ACP) array by virtue of diagonal fastening cables (DFC). The DFC in one preferred embodiment utilizes a combination of threaded J-hooks, cable loops, and angle iron to fix the ACP to the VSM/VIB by frictional contact.

14 Claims, 64 Drawing Sheets

(56) References Cited

U.S. PATENT DOCUMENTS

| | | | | |
|---|---|---|---|---|
| 5,961,248 A | * | 10/1999 | Tourtellotte | F16B 7/0493 403/400 |
| 6,561,473 B1 | * | 5/2003 | Ianello | F16B 7/0493 248/214 |
| 8,408,385 B2 | * | 4/2013 | Swinderman | F16B 7/0493 198/860.1 |
| 9,200,654 B1 | * | 12/2015 | Parduhn | F16B 7/0493 |
| 2014/0191174 A1 | * | 7/2014 | Ditta | E04G 21/3204 256/24 |
| 2015/0323126 A1 | * | 11/2015 | Edgington | F16B 2/08 248/229.17 |

* cited by examiner

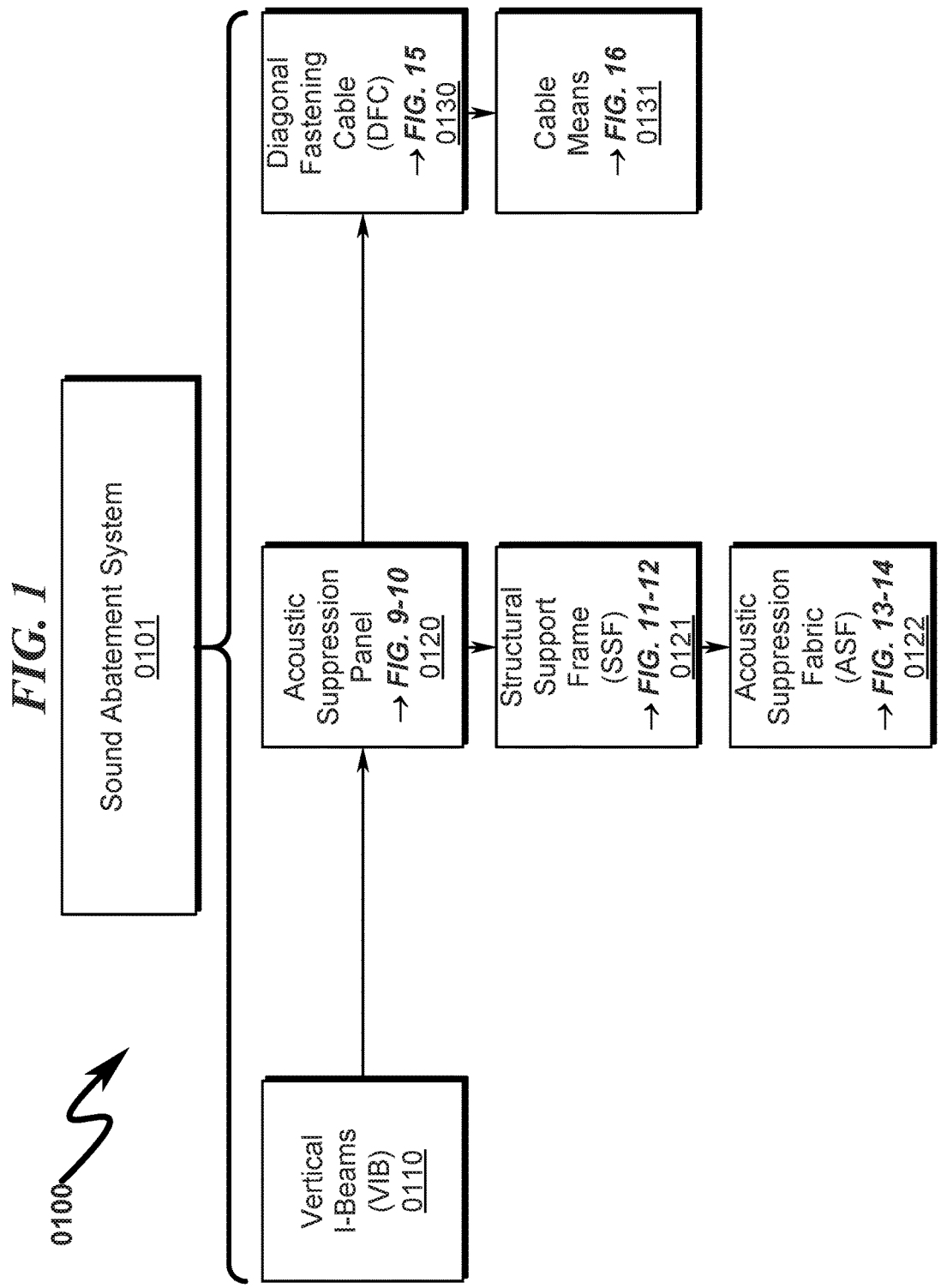

0600

FIG. 14
1400

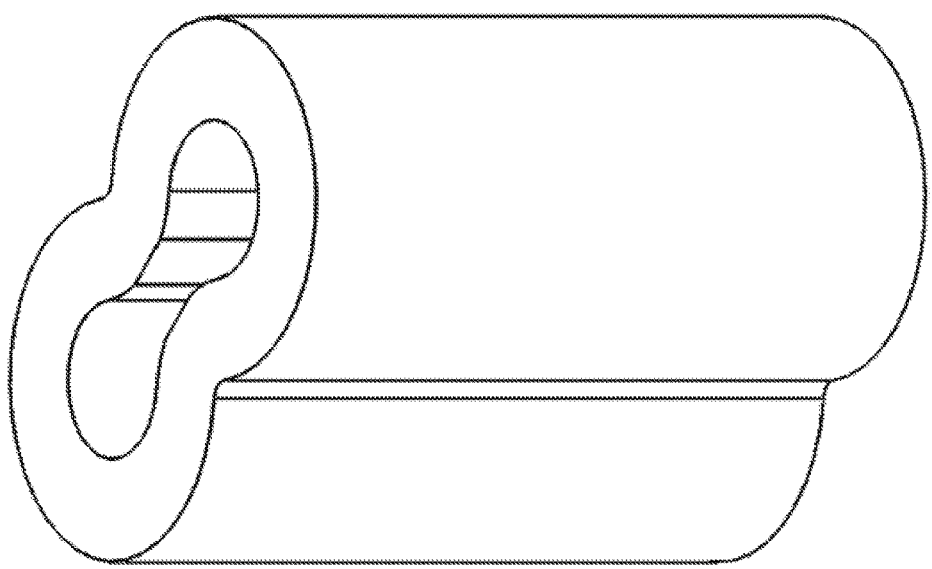
FIG. 39
3900

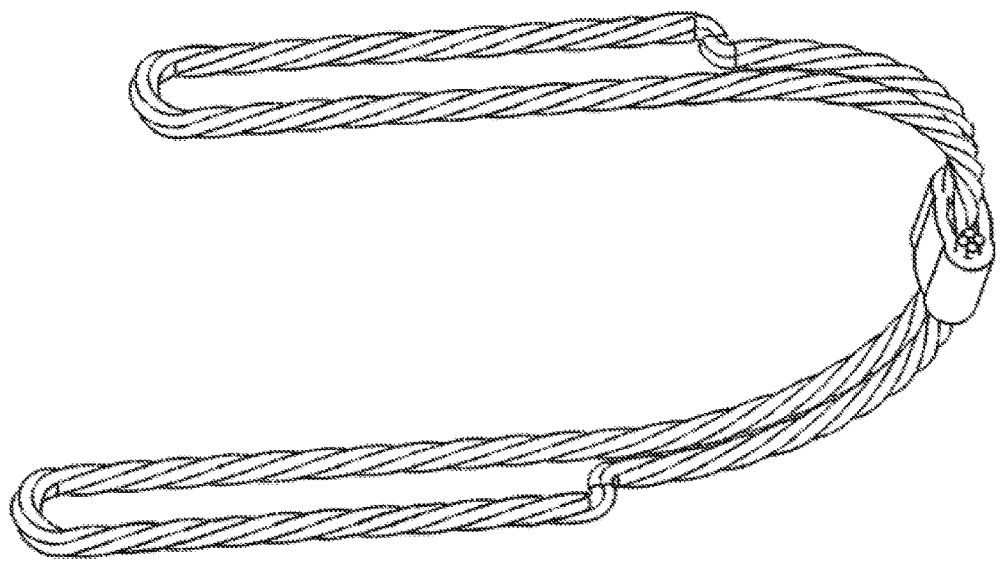
FIG. 41

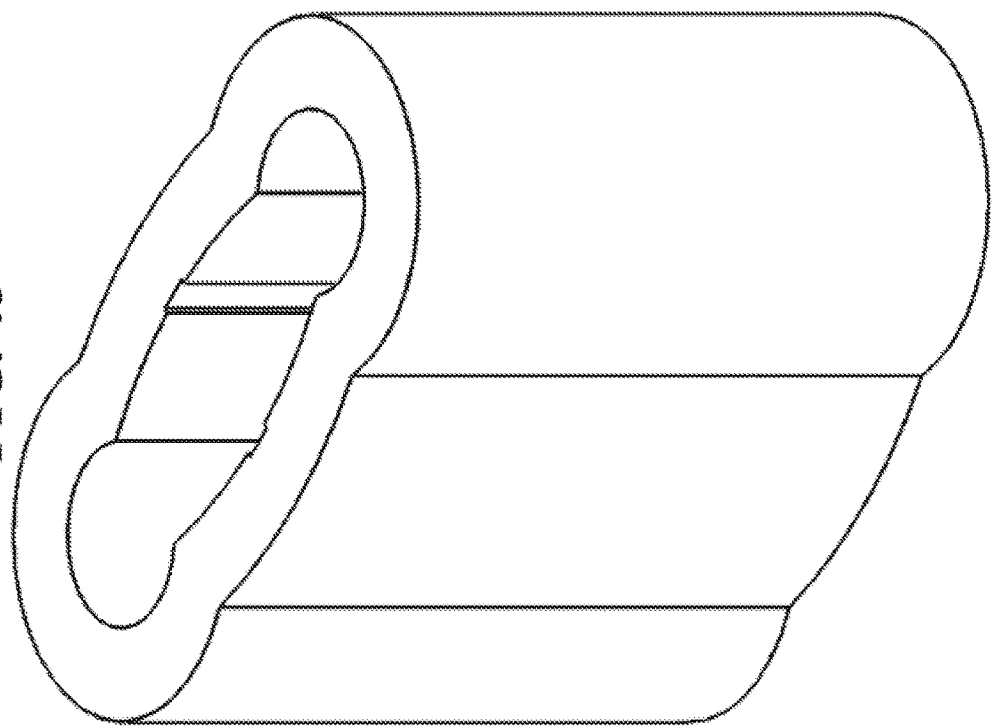

4700

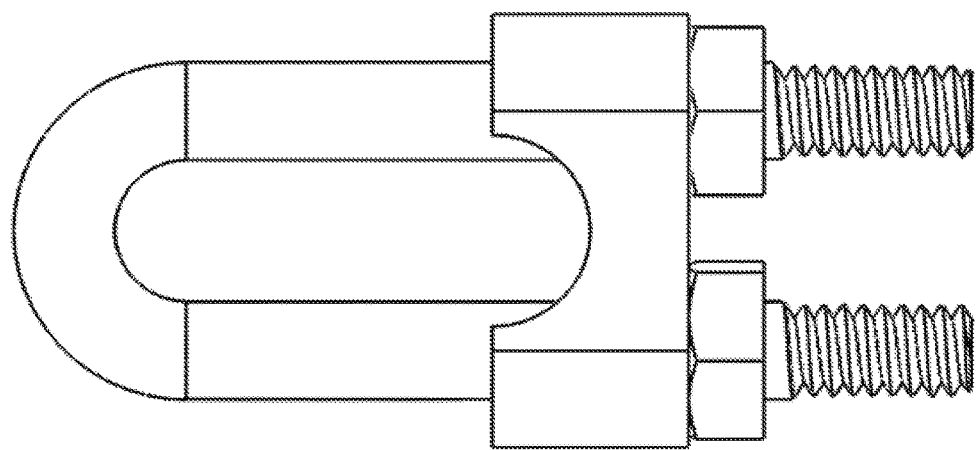
FIG. 48
4800

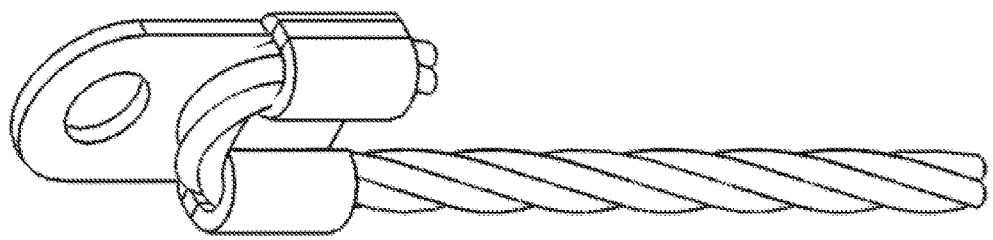
FIG. 49
4900

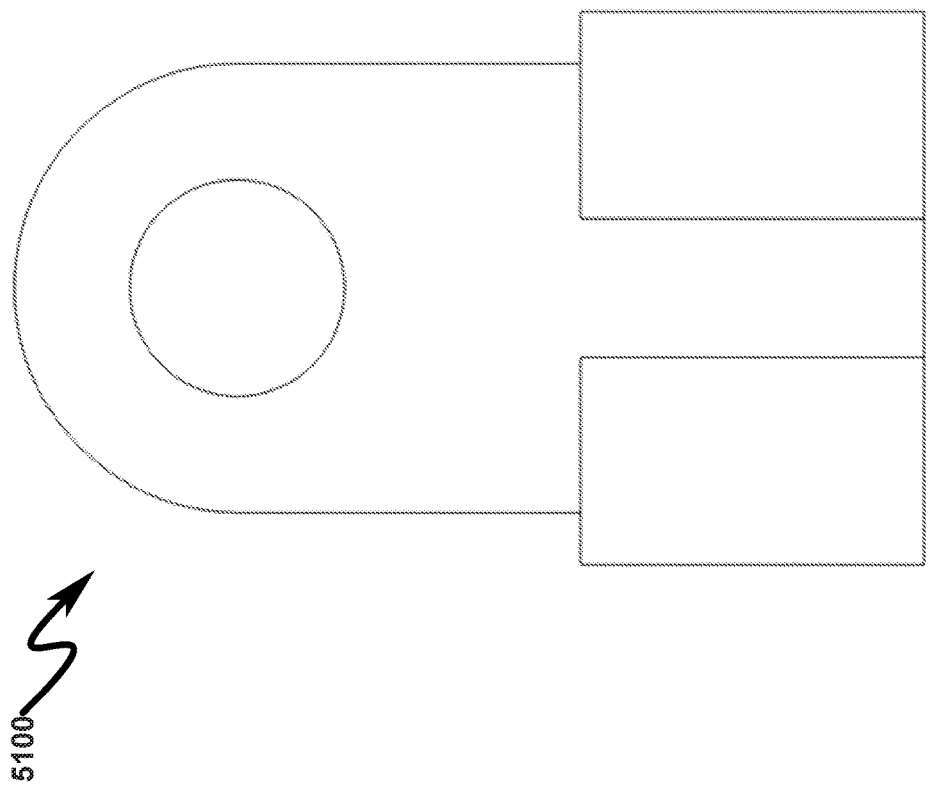

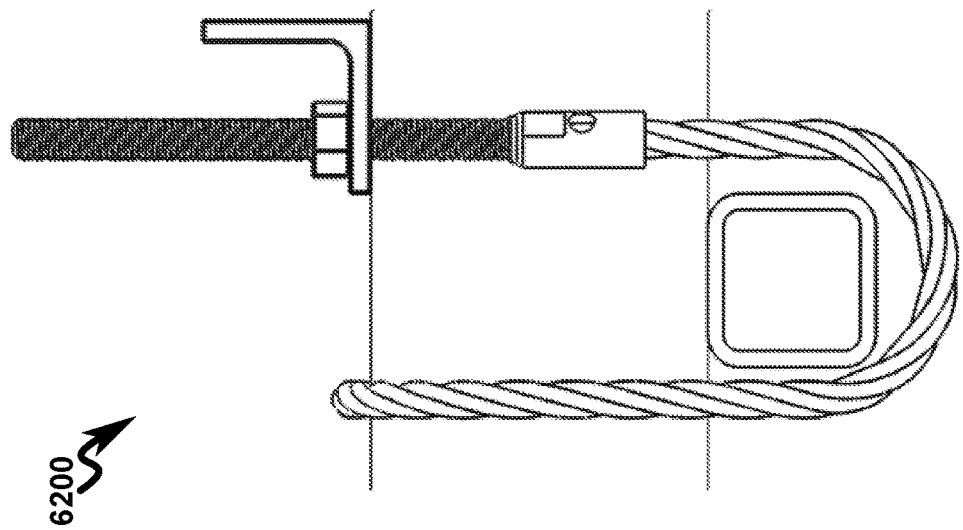
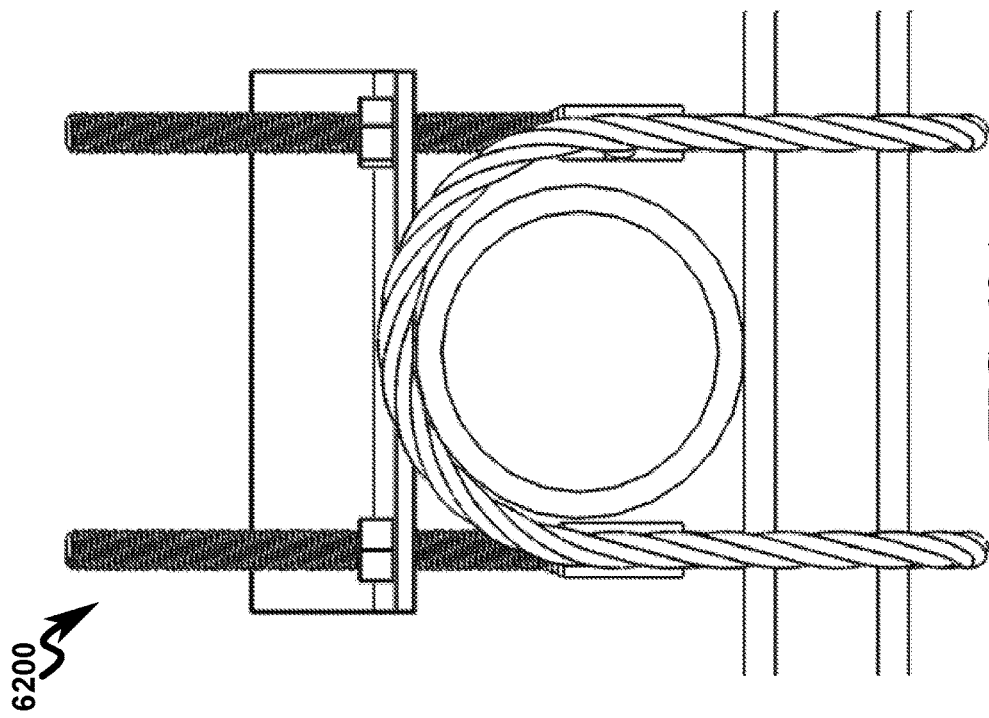

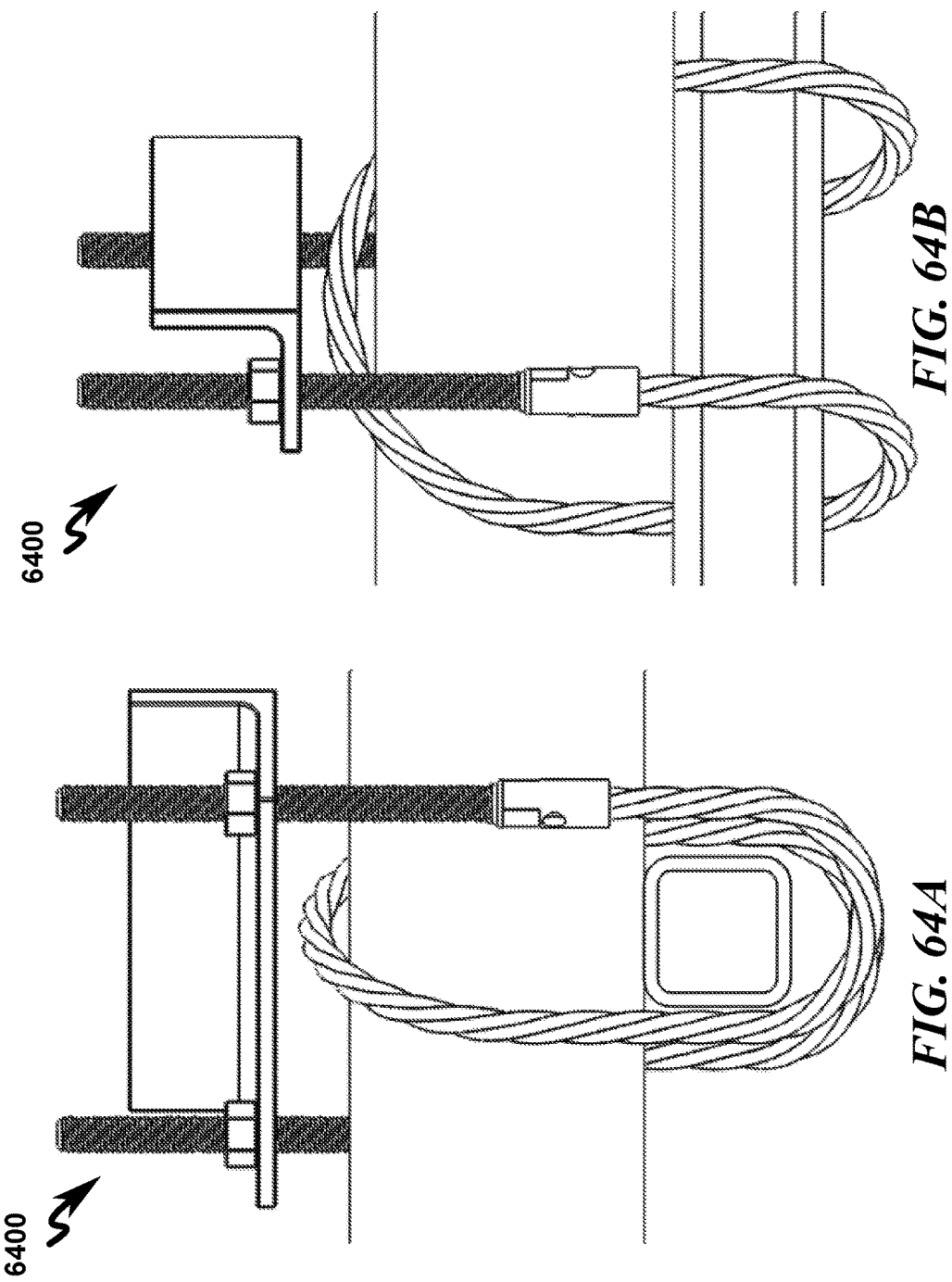

SOUND ABATEMENT SYSTEM AND METHOD

CROSS REFERENCE TO RELATED APPLICATIONS

This application claims benefit under 35 U.S.C. §119 and incorporates by reference United States Provisional patent application for SOUND ABATEMENT SYSTEM AND METHOD by inventors Larry Ray Buck and Earl G. Gauntt, filed electronically with the USPTO on Feb. 25, 2014, with Ser. No. 61/944,202.

PARTIAL WAVIER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates generally to acoustical barriers and in particular to sound abatement walls utilizing one or more semi-rigid fasteners to provide for increased resistance to wind damage. While not limitive of the invention scope, the present invention may be advantageously applied to portable oil/gas field installations where sound abatement is required during the drilling process.

PRIOR ART AND BACKGROUND OF THE INVENTION

Background

Oil and gas exploration and extraction operations typically generate high levels of noise for sustained periods of time. Such noise is primarily attributable to the operation of heavy machinery used in the drilling/extraction process, electrical generators, and motor vehicles used to transport material and people to/from the well site. The noise generated by oil and gas operations is generally considered undesirable by those persons living or working in close proximity to well sites. As a result, governmental bodies at various levels have taken steps to ensure that noise generated by oil and gas operations is controlled.

To that end, numerous federal, state, and local laws and ordinances set forth certain allowable noise levels, depending on the particular type of operations being conducted, and whether such operations are occurring during the day or night. Other federal, state, and local laws and ordinances require that certain sound abatement measures be taken by oil and gas operators. Such sound abatement measures are most often required when a particular well site is located within defined city limits, in a populated area, or adjacent to noise sensitive areas such as schools, hospitals, or residences.

Various types of structures for mitigating noise generated at well sites are known in the art. Many of such structures known in the art consist of physical noise barriers that at least partially surround the well site and serve to block and absorb sound emanating from the site. Such noise barriers are also commonly known as sound abatement walls or sound mitigation walls. Sound abatement walls known in the art are typically constructed by driving vertical I-beams into the ground along the perimeter where the wall is to be located. Wall panels are often constructed of metal frames having various dimensions which are then attached to the vertical beams. Depending on the dimensions chosen to construct the wall panels, one or more layers of wall panels can be stacked end-to-end vertically to construct a sound abatement wall having a predetermined height. The height of a sound abatement wall will be chosen based upon the types of operations being conducted at the well site and in view of any applicable laws or regulations governing oil and gas operations being conducted within the perimeter of the particular sound abatement wall. The height of sound abatement walls generally varies from fifteen (15) to forty (40) feet, depending on the foregoing factors.

The wall panels of sound abatement walls are typically covered with some type of sound insulating material. One example of a rigid sound insulating material used to cover the wall panels of a sound abatement wall is cementitious wood fiber (sold under the trade name, Tectum™ from Tectum, Inc.), which is an acoustic panel constructed primarily of wood fibers bonded together with a cement adhesive. While the use of Tectum™ in some applications may be advantageous, one drawback of its use is that the material may be more prone to deteriorate in harsh weather conditions such as may be present at an outdoor well site. Other examples of rigid sound insulating materials used to cover the wall panels of a sound abatement wall are corrugated metals such as aluminum and steel, and plastics such as fiberglass. While relatively inexpensive, one drawback of using rigid corrugated metals or plastics in connection with sound abatement walls is that they have less than optimal sound abatement properties such that sound may not be sufficiently blocked or absorbed.

One example of a non-rigid sound insulating material used to cover a wall panel of a sound abatement wall is an acoustical blanket. Acoustical blankets or "sound blankets" are typically constructed by stitching together two protective outer layers of cloth-like material, and further inserting a middle layer of sound-insulating material between these outer layers. Horizontal stitching of the outer layers of the blanket at regular intervals ensures that the sound-insulating material within the blanket is evenly distributed inside the blanket and does not accumulate at the bottom of the blanket when mounted on a wall panel. The thickness of the acoustical blanket and the amount of sound insulating material used as the middle layer of said blanket will vary depending on the desired level of sound absorption sought to be provided by the blanket. Acoustical blankets are typically mounted to wall panels by the use of fasteners such as screws, nails, rivets, or tacks. Alternatively, grommets may be placed on the perimeter of the blanket and wire, cable, rope, ties, or the like may be used to secure the blanket to the wall panel.

Rigid metal brackets and other rigid fasteners are typically utilized to secure wall panels to sound abatement walls. However, use of this type of fastening in this context often results in failure of the sound abatement wall in high wind conditions. These failure are often independent of the strength or size of the fastening apparatus. Additionally, high wind conditions in these circumstances can often result in shifting of the sound abatement structure, resulting in failure of the fastening apparatus. Any of these failures can be both inconvenient and dangerous to personnel working in these environments, as wind-driven impact by a sound abatement panel can be fatal. This is of special concern in many sound abatement applications, as these jobsites must be located near residential areas, highways, and other areas where the general public is in relative proximity to the sound abatement wall. Any failure of the sound abatement structure in this situation has a high probability of posing a public safety hazard and must be avoided at all costs.

Accordingly, a need exists in the art for a sound abatement wall that provides improved protection from damage caused by wind, which can also be easily assembled and disassembled, and which provides for additional safety to personnel working within and around the sound abated perimeter area. This need has not been addressed by the prior art.

Deficiencies in the Prior Art

The prior art as detailed above suffers from the following deficiencies:
  Prior art sound abatement systems are difficult to assemble.
  Prior art sound abatement systems are subject to collapse in high wind conditions.
  Prior art sound abatement systems require specialized hardware that is generally unique to a given installation configuration.
  Prior art sound abatement systems do not possess integrated structural integrity between sound abatement panels.
  Prior art sound abatement systems are difficult to scale to tall sound abatement structures.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:
  (1) Provide for a sound abatement system and method that is easy to assemble.
  (2) Provide for a sound abatement system and method that maintains structural integrity in high wind conditions.
  (3) Provide for a sound abatement system and method that does not require specialized hardware to accommodate a variety of installation configurations.
  (4) Provide for a sound abatement system and method that integrates structural integrity between sound abatement panels.
  (5) Provide for a sound abatement system and method that is easily scaled to tall sound abatement structures.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention utilizes modular acoustic suppression panels (ASPS) that are affixed to vertical I-beams (VIBs) driven into the ground surrounding the perimeter of an area to which sound abatement is to be applied. The ASPS consist of a structural support frame (SSF) to which acoustic suppression fabric (ASF) is affixed. The ASPS are affixed to the flanges of the I-beams (or faces of tubular support member such as a pipe or the like) using frictional contact that is achieved via the use of diagonal fastening cables (DFCs) configured to encircle the SSF structural members and the I-beams, and tighten the cable straps to achieve the frictional mating of the SSF/VIB combination.

Since the ASPS may be configured in panelized form, they are amenable to shipment to the jobsite by truck or other delivery vehicle and thus may be preassembled prior to delivery to the jobsite. This permits rapid assembly of the acoustic suppression system by first driving the VIBs into the ground surrounding the perimeter of a predetermined area and then placing the ASPS around the outer surface of the VIB flanges, and then attaching the SSF of each ASP to the VIBs using the DFCs. Note that this assembly technique also permits the corner contact regions between various ASPS to be both tied to the vertical I-beams but also strapped to each other, thus promoting an integrated structural framework of ASPS surrounding the periphery of the installed vertical I-beams. This integrated structural framework helps promote the overall structural integrity of the sound abatement system by tying all the SSFs together with the VIB supports that surround the periphery of the sound abated region.

BRIEF DESCRIPTION OF THE DRAWINGS

For a fuller understanding of the advantages provided by the invention, reference should be made to the following detailed description together with the accompanying drawings wherein:

FIG. 1 illustrates a system block diagram depicting major components of the present invention;

FIG. 14 illustrates a side view of an exemplary acoustic suppression fabric (ASF) useful in some preferred invention embodiments;

FIG. 39 illustrates a side perspective view of a preferred invention embodiment cable termination ferrule design;

FIG. 41 illustrates a perspective view of a preferred invention embodiment looped double cable design incorporating ferrule cable terminations;

FIG. 43 illustrates a side perspective view of a preferred invention embodiment double cable termination ferrule design;

FIG. 48 illustrates a side view of a preferred invention embodiment double cable clamp termination design;

FIG. 49 illustrates a perspective view of an exemplary embodiment of a cable means incorporating a swaged eyelet termination;

FIG. 51 illustrates a front view of an exemplary embodiment of a swaged eyelet cable terminator;

FIG. 62 illustrates side views of a preferred exemplary multi-loop cross-over cabling configuration as applied to the present invention;

FIG. 64 illustrates side views of a preferred exemplary multi-loop cross-point cabling configuration as applied to the present invention.

DESCRIPTION OF THE PRESENTLY PREFERRED EXEMPLARY EMBODIMENTS

Figure 2B:
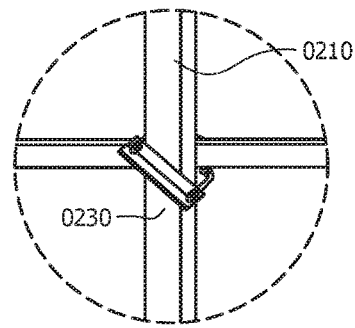
FIG. 2 illustrates a perspective view of an exemplary system application context for the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated. The numerous innovative teachings of the present application will be described with particular reference to the presently preferred embodiment, wherein these innovative teachings are advantageously applied to the particular problems of a SOUND ABATEMENT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Cable Fastening not Limitive

The present invention in many preferred embodiments utilizes wire cable as part of the attaching means between the acoustic panels and the vertical support structures. These wire cables may be terminated using a variety of methods including but not limited to cable clamps, braiding, welding, encapsulation, ferrules/clips/sleeves, and the like. The present invention does not limit the type of wire cable termination in this context, and thus the term "termination" should be given its broadest possible meaning in this application context.

J-Hook not Limitive

Many preferred invention embodiments make use of "J-hooks" also referred to as "J-bolts" in the mechanical arts. Either of these terms should be considered equivalent in the context of the present invention. Many of these J-hook configurations will incorporate a hooked end and a threaded shaft to which a fastener, such as a nut, is affixed. One skilled in the art will recognize that the fastening means in this circumstance may include a wide variety of fastener types.

Vertical Support Member (VSM)/Vertical I-Beam (VIB) not Limitive

Many preferred invention embodiments may make use of vertically-oriented conventional structural I-beams comprising a first and second flange parallel to one another, perpendicularly connected to each other with a web. While many preferred embodiments may make use of I-beams having a 12-inch web, other structural entities may be utilized in this context such as pipe, square tubing, rectangular tubing, structural channel, and the like. In these alternative contexts, the flanges of the I-beam as discussed herein may be substituted by any suitable surface of the alternative vertical support structure member.

As illustrated in the Figures, the present invention is aptly suitable for application within a variety of vertical support members (VSM) as compared to the prior art because in contrast to the prior art the use of the diagonal fastening cable (DFC) means ensures that the profile of the VSM can be accommodated to affix the acoustic suppression panel (ASP) array to the VSM. This feature is not available in the prior art.

Thus, the term VSM should be broadly construed to include a variety of support members including VIB structures. While the attached Figures and description will concentrate on VIB configurations, these embodiments are equally applicable to and should be considered as incorporating more generic VSM structures including pipe, square tubing, and other structural members.

Pipe not Limitive

While many invention embodiments may make use of structural pipe as the vertical support member (VSM) to which the acoustic suppression panels (ASPS) are affixed, this term should be given broad interpretation as including a wide variety of tubular structural members.

Binding Retention Plate not Limitive

While the present invention as depicted herein in some embodiments illustrates the use of angle iron as the binding retention plate (BRP) material, other equivalent forms are also anticipated, including square tubing, flat bar stock, and preformed plate assemblies, all of which should be included within the scope of the term BRP.

System Overview (0100)-(0700)

Structural Block Diagram Overview (0100)

A structural block diagram overview of the present invention may be generally interpreted via FIG. 1 (0100) wherein the sound abatement system (0101) is configured to comprise vertical I-beams (VIBs) (0110) to which acoustic suppression panels (ASPS) (0120) are attached. The ASPS (0120) consist of a structural support frame (SSF) (0121) to which an acoustic suppression fabric (ASF) (0122) is attached. The ASPS (0120) are then attached in a panelized array to the VIBs (0110) via use of a diagonal fastening cable means (DFC) (0130) that comprises fastening hardware attaching a variety of cable means (0131). The DFC (0130) is specifically designed to overcome the structural integrity problems associated with the prior art, as well as provide for an efficient methodology of attaching the ASPS (0120) to the VIBs (0110).

Figure 15:
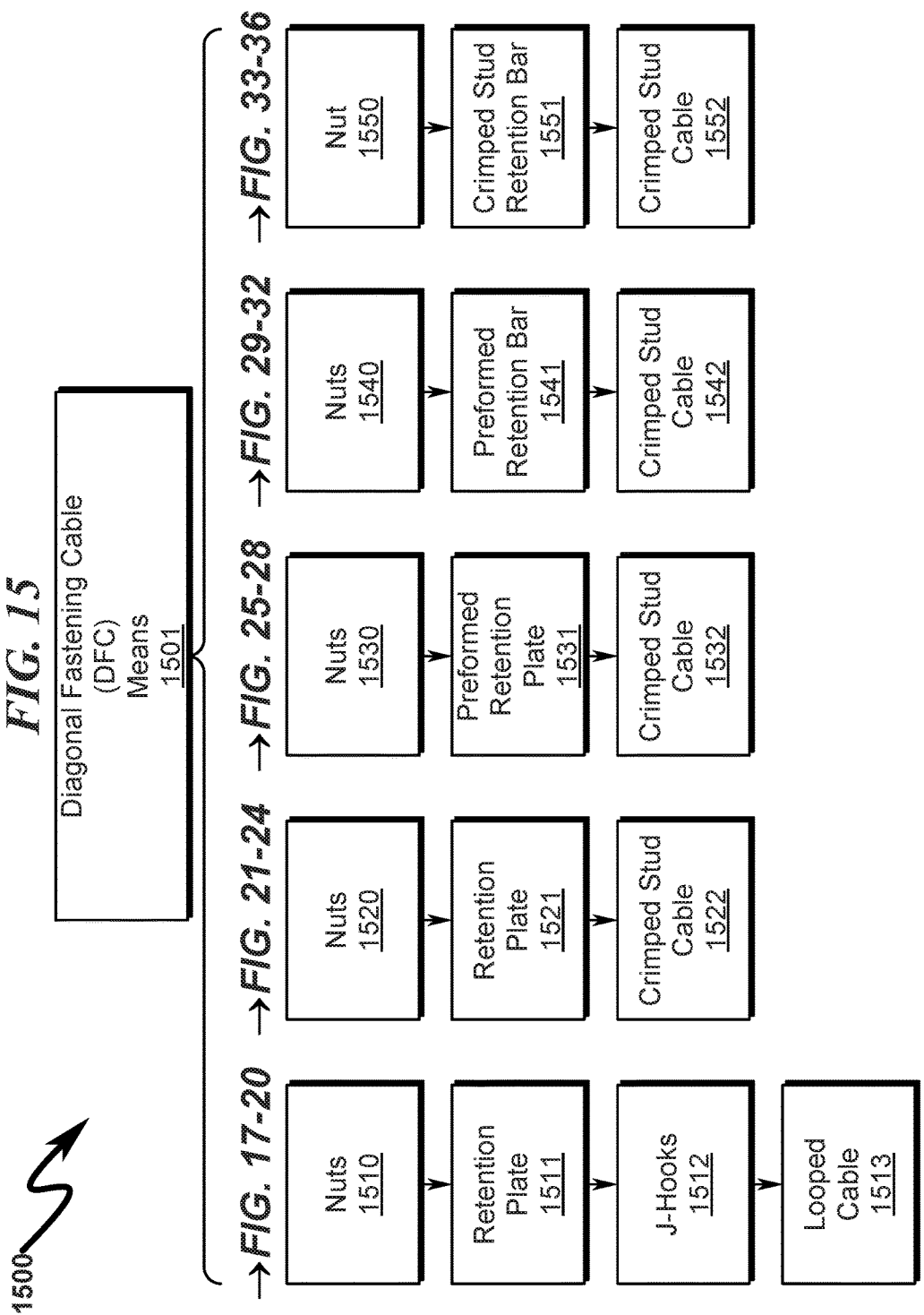
FIG. 15 illustrates a hierarchal system block diagram depicting typical configurations of a diagonal fastening cable (DFC) means used in various invention embodiments.
Figure 16:
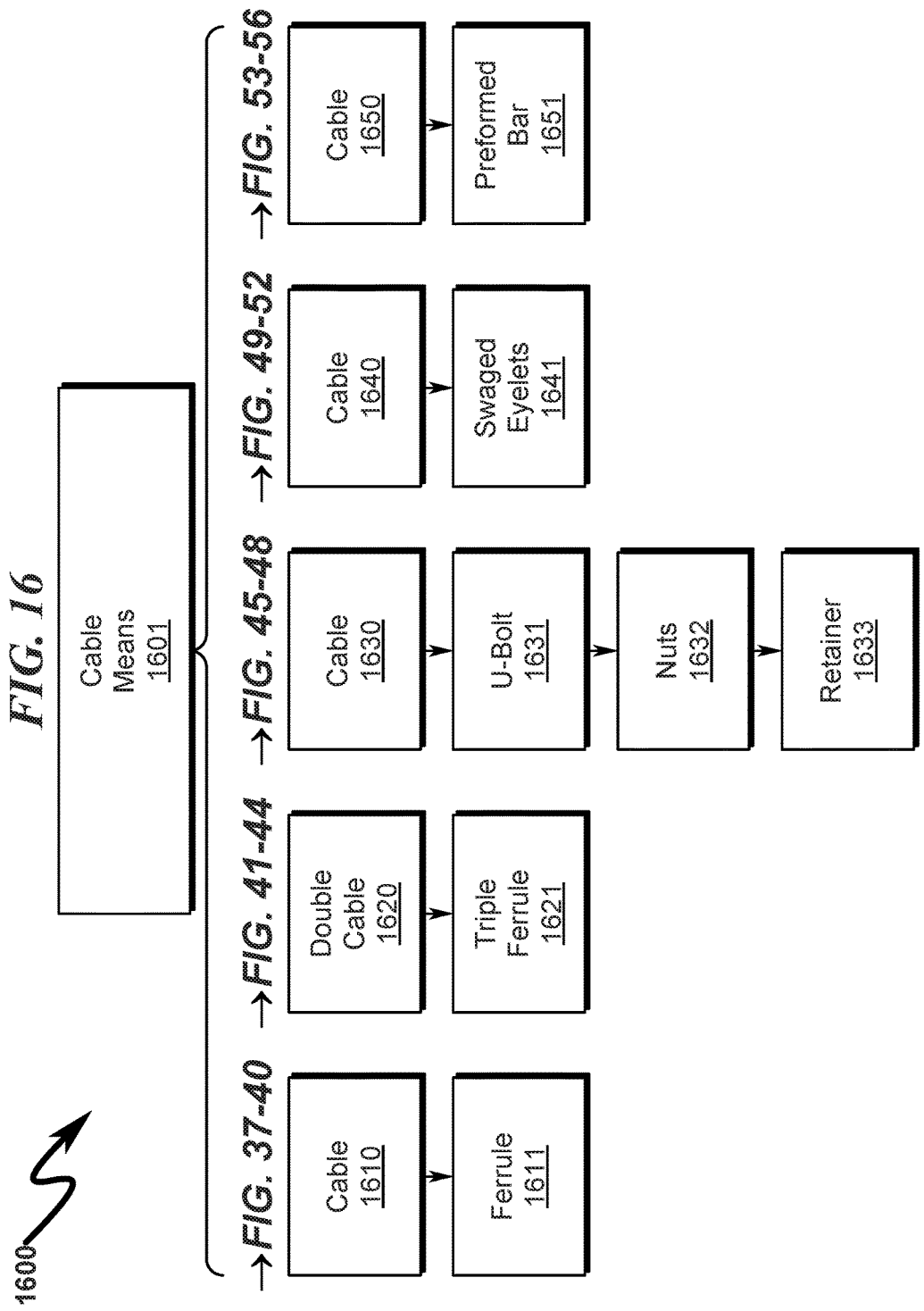
FIG. 16 illustrates a hierarchal system block diagram depicting typical configurations of various cabling means used in various invention embodiments.

More detail on the ASP (0120) and DFC (0130) configurations is provided by the Figure references in FIG. 1 (0100) and hierarchical block diagrams illustrated in FIG. 15 (1500) and FIG. 16 (1600). Exemplary embodiments of the system as implemented in a typical oil/gas field drilling operation are depicted in FIG. 2 (0200)-FIG. 7 (0700).

Typical Oil/Gas Field Drilling Configuration (0200)(0700)

Figure 2A:
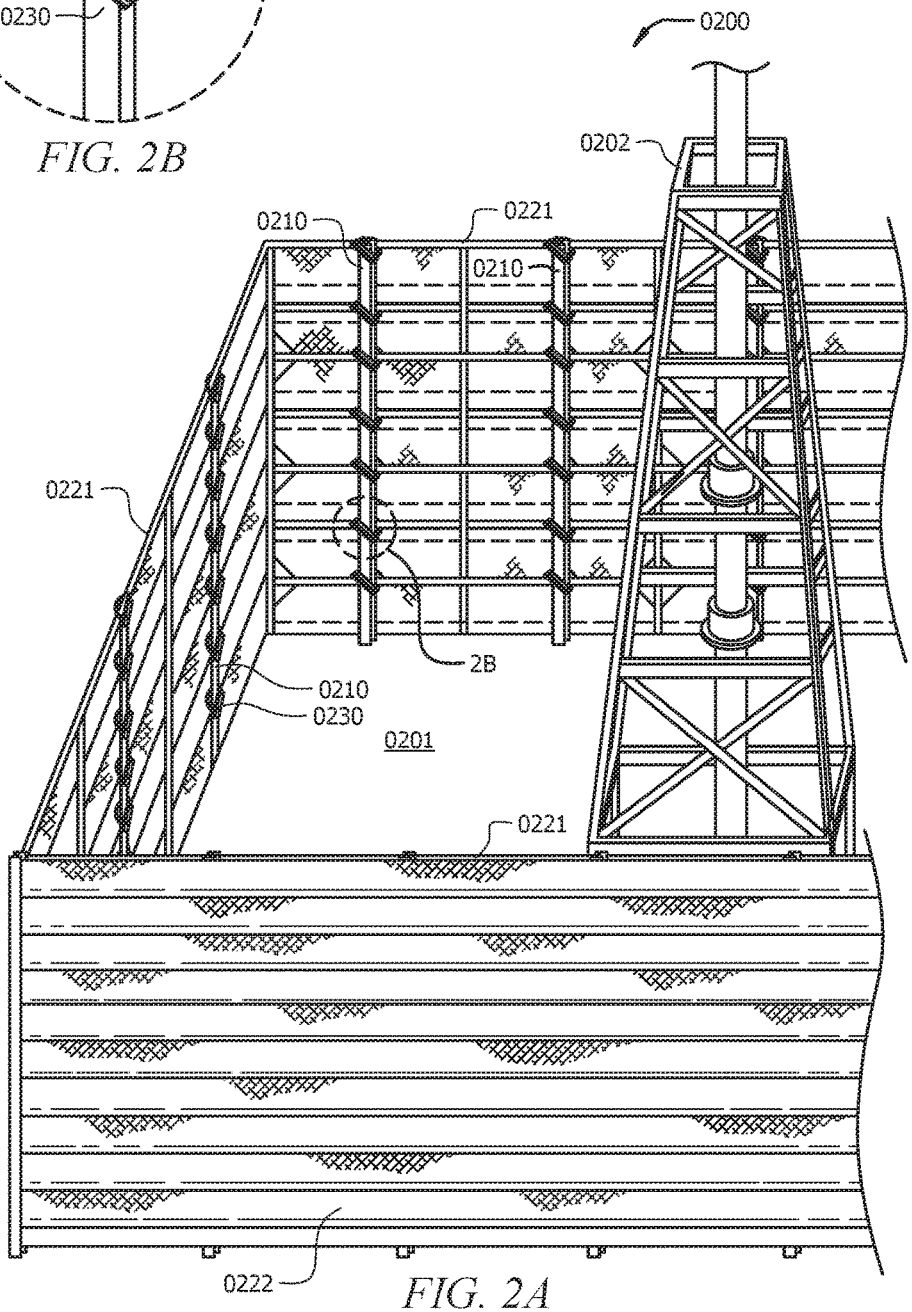

As generally depicted in FIG. 2 (0200), the present invention may be advantageously applied to situations in which large areas (0201) associated with gas/oil drilling operations are to be provided sound abatement capability to suppress noise from drilling equipment (0202) and associated machinery and operations. In these situations, the perimeter of the sound abated area (0201) is fitted with vertical I-beams (VIBs) (0210) that provide support for a panelized array of acoustic suppression panels (ASPS) comprising a structural support frame (SSF) (0221) and covered with an acoustic suppression fabric (ASF) (0222). The ASPS are generally prefabricated and configured so that the SSF (0221) is attached to the ASF (0222). The SSF (0221) is then attached to the VIBs (0210) via use of a diagonal fastening cable (DFC) (0230) to secure the ASPS to the VIBs (0210), and to secure each SSF (0221) to adjacent SSFs in the panelized ASP array.

Figure 3B:
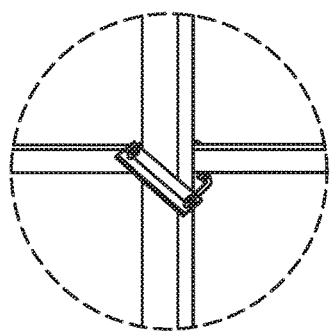
FIG. 3 illustrates a perspective view of an exemplary system application context for the present invention.
Figure 3A:
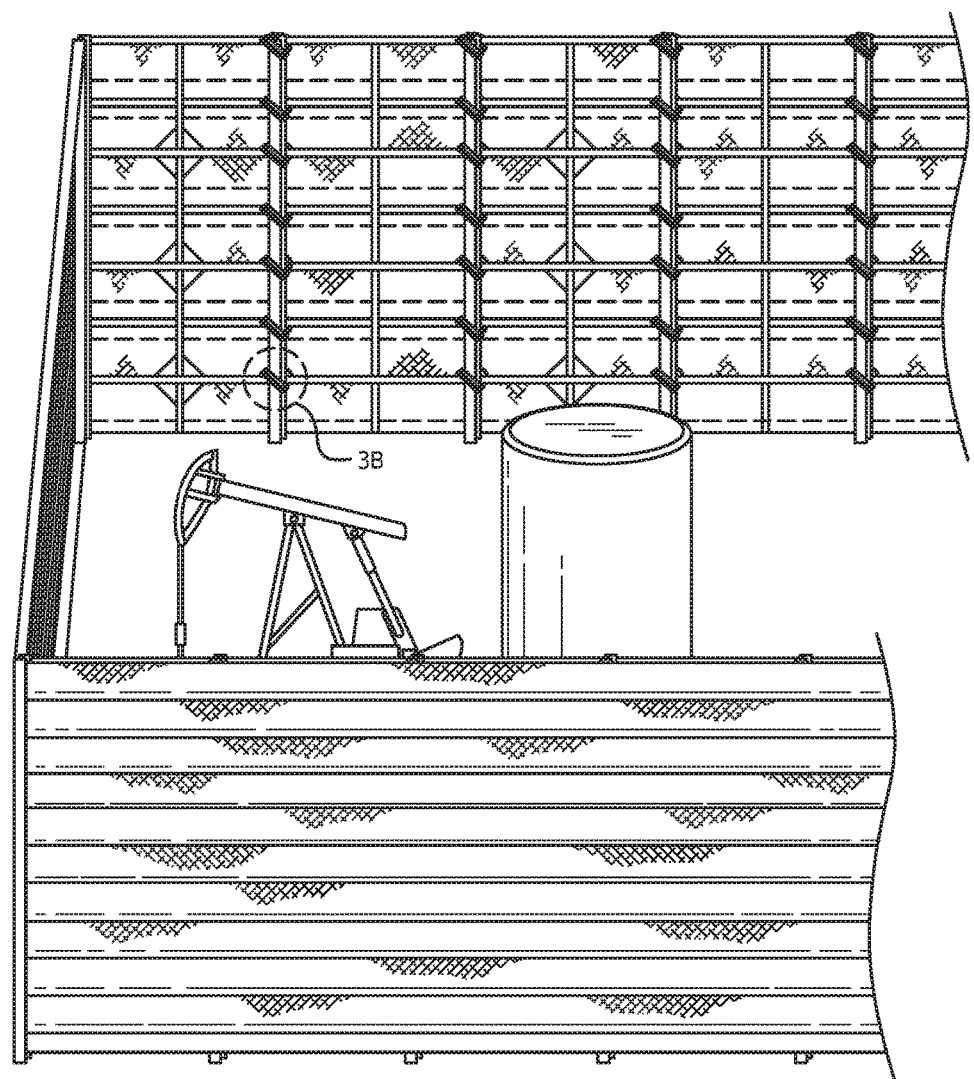

As depicted in FIG. 3 (0300), the present invention system and method may be equally applied to oil/gas drilling operations or situations in which sound abatement (and/or visual screening) is to be applied to a variety of post-drilling operations.

Figure 4:
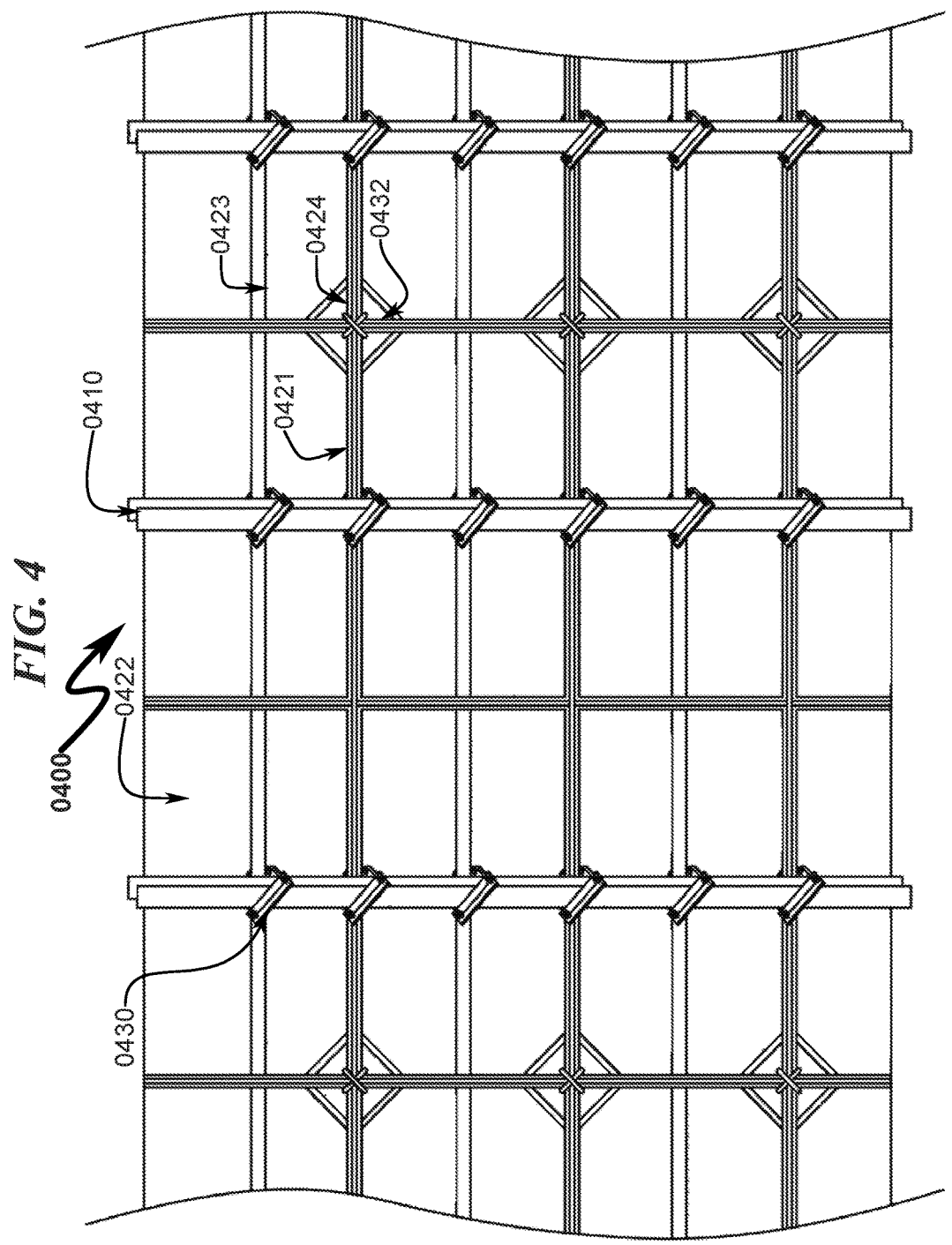
FIG. 4 illustrates a detail construction view of an exemplary sound abatement wall incorporating an exemplary system embodiment of the present invention.

The panelized nature of the ASP array is further depicted in the inside perimeter view of FIG. 4 (0400), wherein the VIBs (0410) are attached to the ASP SSF frame (0421) via the use of the diagonal fastening cable (DFC) (0430). The SSF frame (0421) is attached to the sound suppression fabric (SSF) (0422) and may incorporate cross ribs (0423) within the perimeter of the SSF (0421). Additionally, diagonal internal supports (0424) may be incorporated to provide lateral stability to the SSF (0421). In addition to the use of the DFCs (0430) to affix the SSFs (0421) to the VIBs (0410), the system may incorporate crosspoint ties (0432) to integrate a SSF (0421) with adjacent SSFs at the corner points. While in many preferred invention embodiments the vertical perimeter of each SSF (0421) will coincide with the VIBs (0410), as illustrated in this example this is not necessarily a requirement for construction of the system as the SSF perimeter edges may be arbitrarily placed at intervals between the VIBs (0410).

Figure 5:
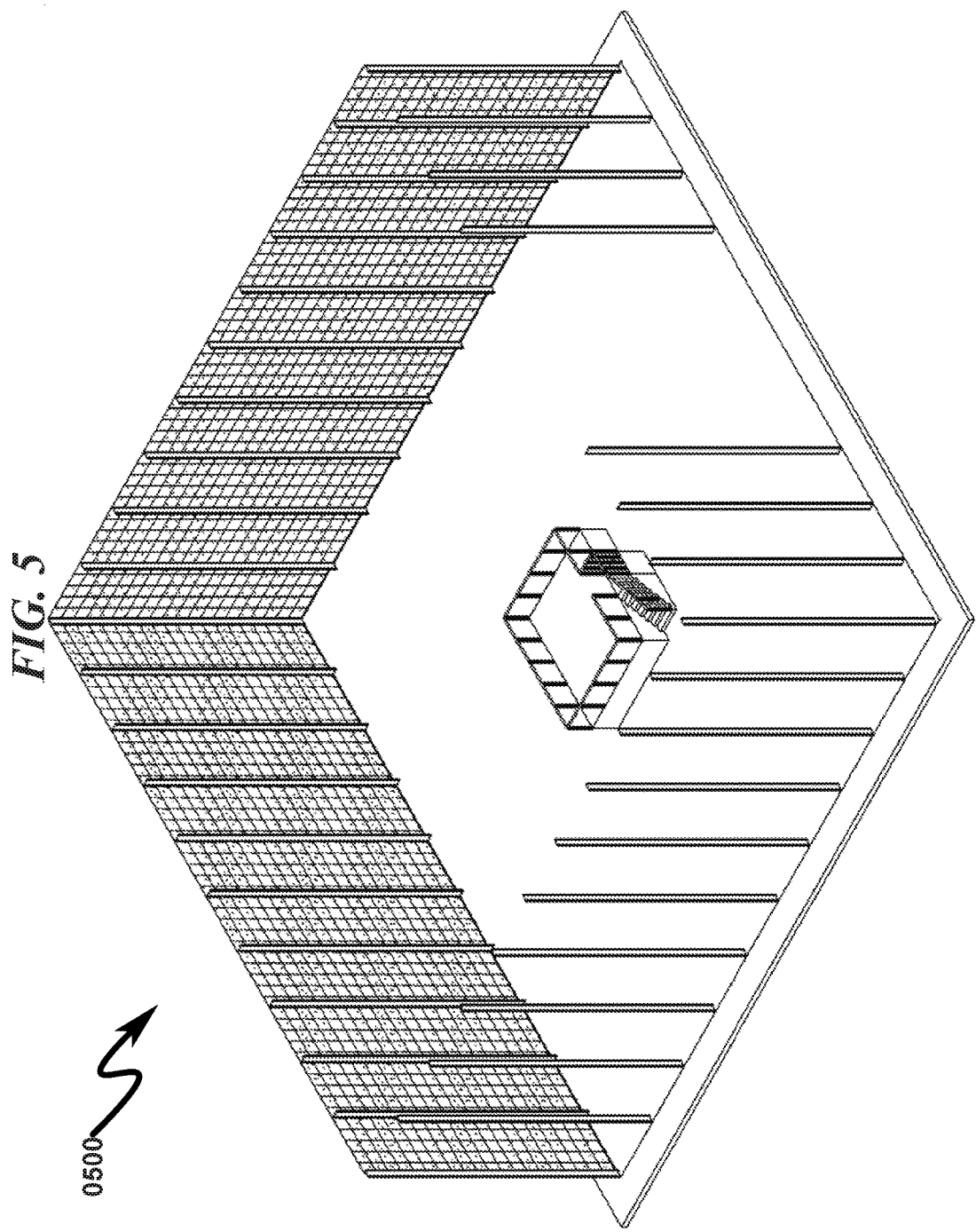
FIG. 5 illustrates a perspective view of a partially completed sound abatement application context incorporating an exemplary system embodiment of the present invention utilizing vertical I-beams (VIBs) as the vertical support members (VSMs)
Figure 6:
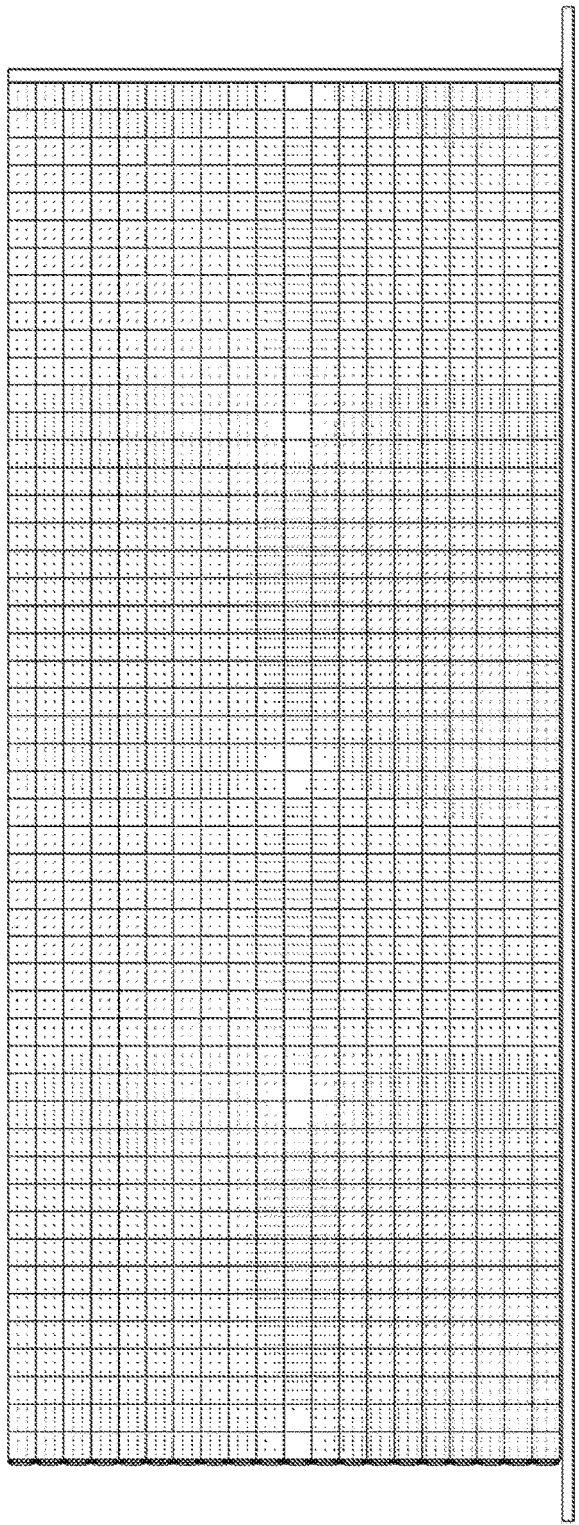
FIG. 6 illustrates a perspective view of a partially completed sound abatement application context incorporating an exemplary system embodiment of the present invention utilizing steel pipe as the vertical support members (VSMs)

A typical configuration in partial construction using vertical I-beams (VIBs) for support is depicted in FIG. 5 (0500). FIG. 6 (0600) illustrates an alternative partial construction embodiment wherein steel pipe is used for the vertical support members. Outer wall detail is generally depicted in FIG. 7 (0700).

Method Overview (0800)

Figure 7:
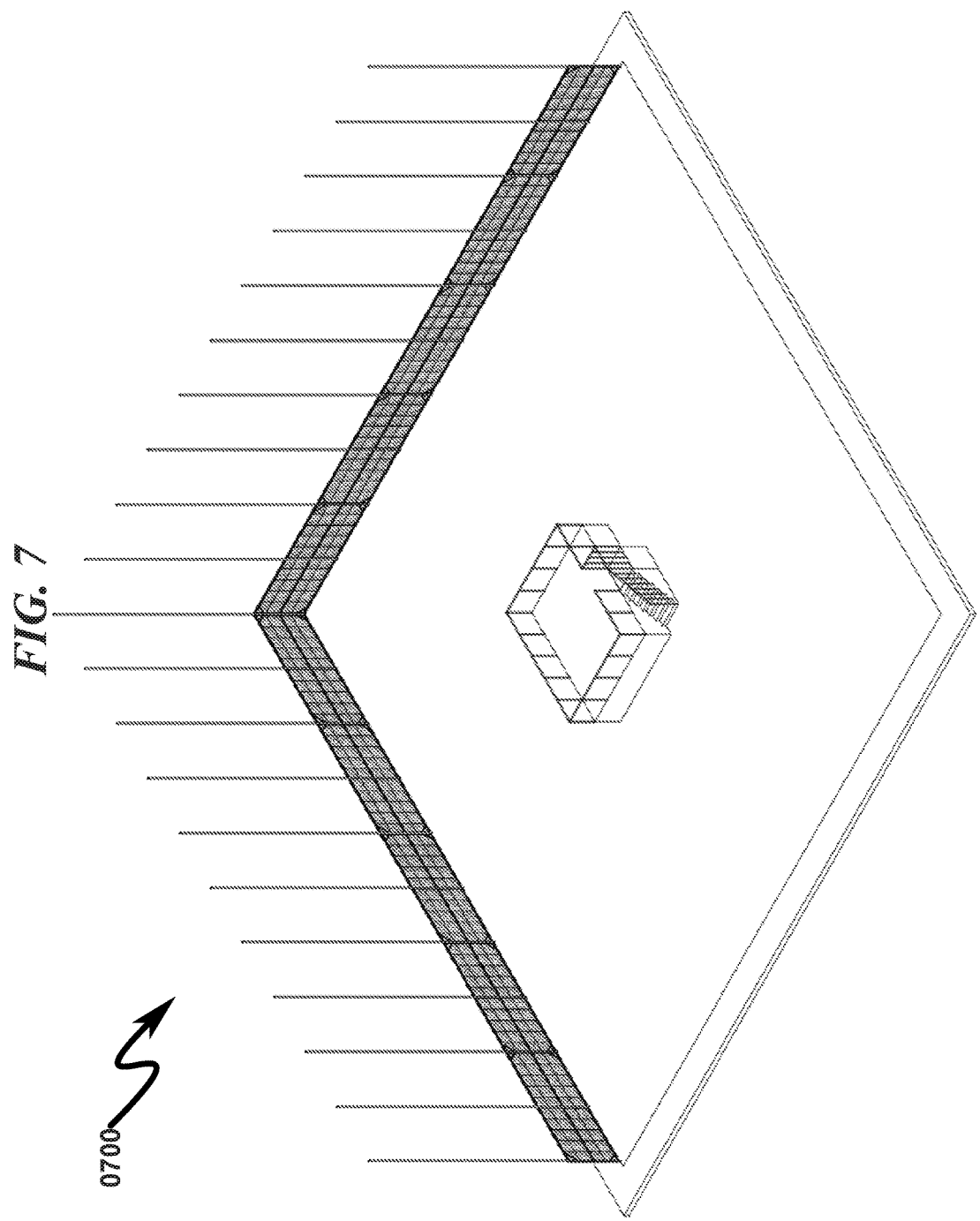
FIG. 7 illustrates a side outside view of a sound abatement wall incorporating an exemplary system embodiment of the present invention.

The system application context depicted in FIG. 1 (0100)-FIG. 7 (0700) integrates a method whereby sound abatement for large areas may be rapidly and efficiently deployed. This methodology utilizes acoustic suppression panels (ASPS) that are pre-fabricated to be attached to vertical support members (VSMs) (which may include vertical I-beams (VIBs)) that are driven into the ground surrounding the perimeter of the sound abated area.

Figure 8:
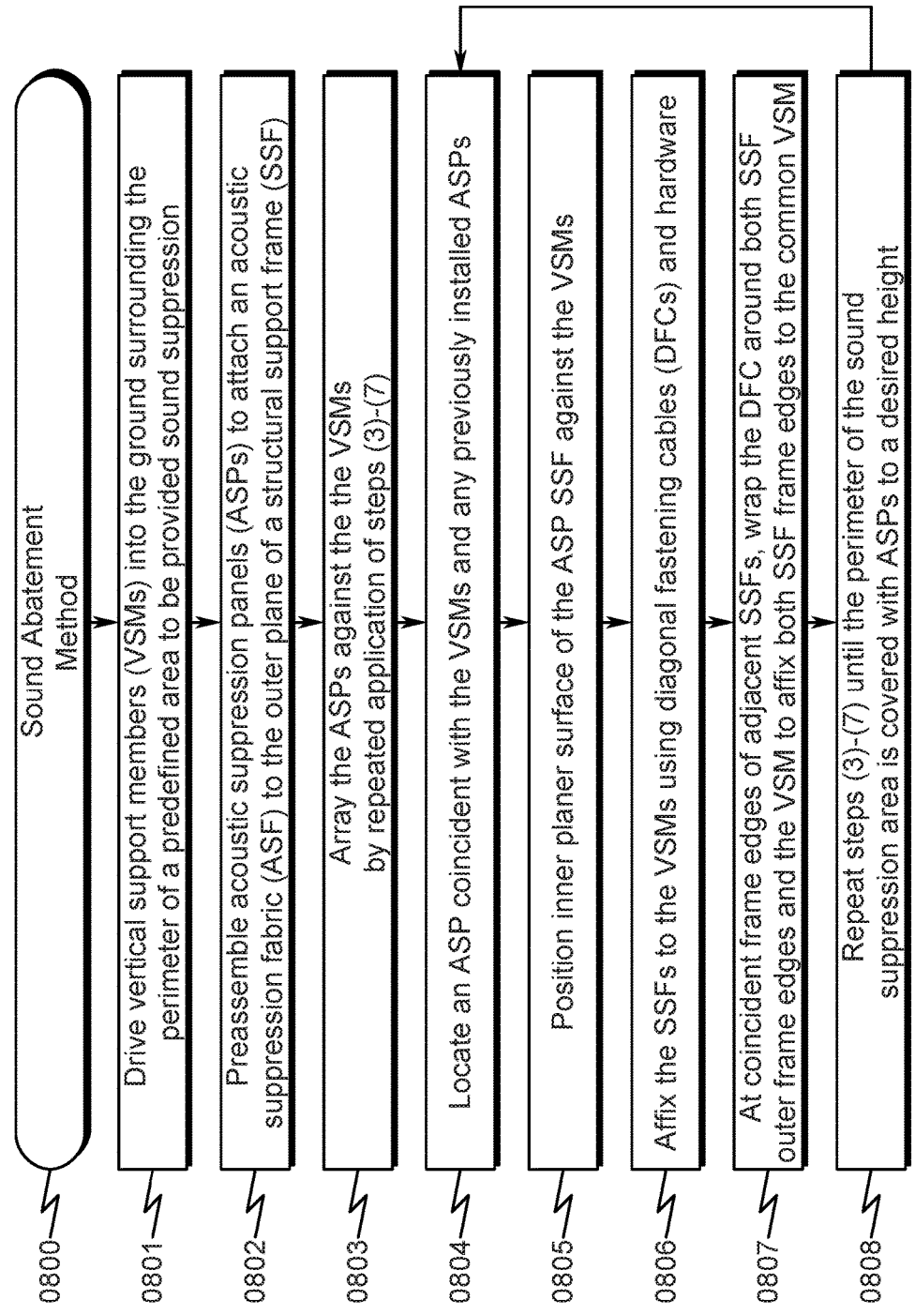
FIG. 8 illustrates a flowchart depicting a preferred exemplary invention method.

An exemplary present invention method can be generally described in the flowchart of FIG. 8 (0800) as incorporating the following steps:
 (1) Driving vertical support members (VSMs) into the ground surrounding the perimeter of a predefined area to be provided sound suppression (0801);
 (2) Preassembling acoustic suppression panels (ASPS) to attach an acoustic suppression fabric (ASF) to the outer plane of a structural support frame (SSF) (0802);
 (3) Arraying the ASPS against the VSMs by repeated application of steps (3)-(7) (0803);
 (4) Locating an ASP panel coincident with the VSMs and any previously installed ASPS (0804);
 (5) Positioning the inner planer surface of the ASP SSF against the VSMs (0805);
 (6) Affixing the SSFs to the VSMs using diagonal fastening cables (DFCs) and hardware (0806);
 (7) At coincident frame edges of adjacent SSFs, wrapping the DFC around both SSF outer frame edges and the VSM to affix both SSF frame edges to the common VSM (0807); and
 (8) Repeating steps (3)-(7) until the perimeter of the sound suppression area is covered with ASPS to a desired height (0808).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

As will be described herein, a key aspect of the present invention is the use of the diagonal fastening cable and associated hardware to secure the ASP SSFs to the VSMs. In contrast to the prior art, the use of cable attachment of the SSFs to the VSMs by frictional contact prevents the ASPS from dislocation from the VSMs during high wind conditions. This form of attachment also prevents the SSFs from rattling against the VSMs during high wind conditions, and thus creating noise in an environment in which sound suppression is the goal.

Acoustic Suppression Panels (ASP) (0900)-(1000)

Figure 9:
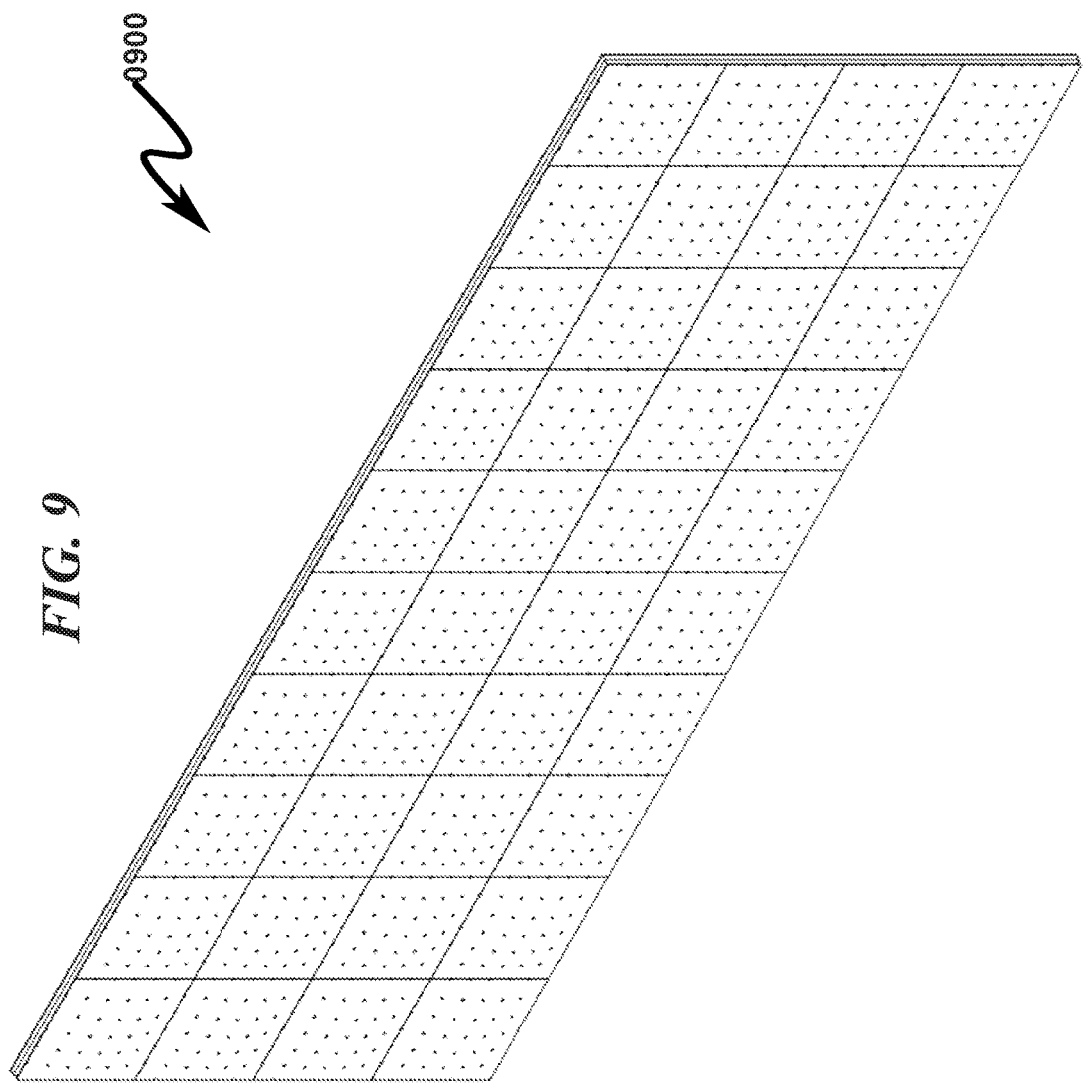
FIG. 9 illustrates a front perspective view of an exemplary acoustic suppression panel (ASP) useful in some preferred invention embodiments.
Figure 10:
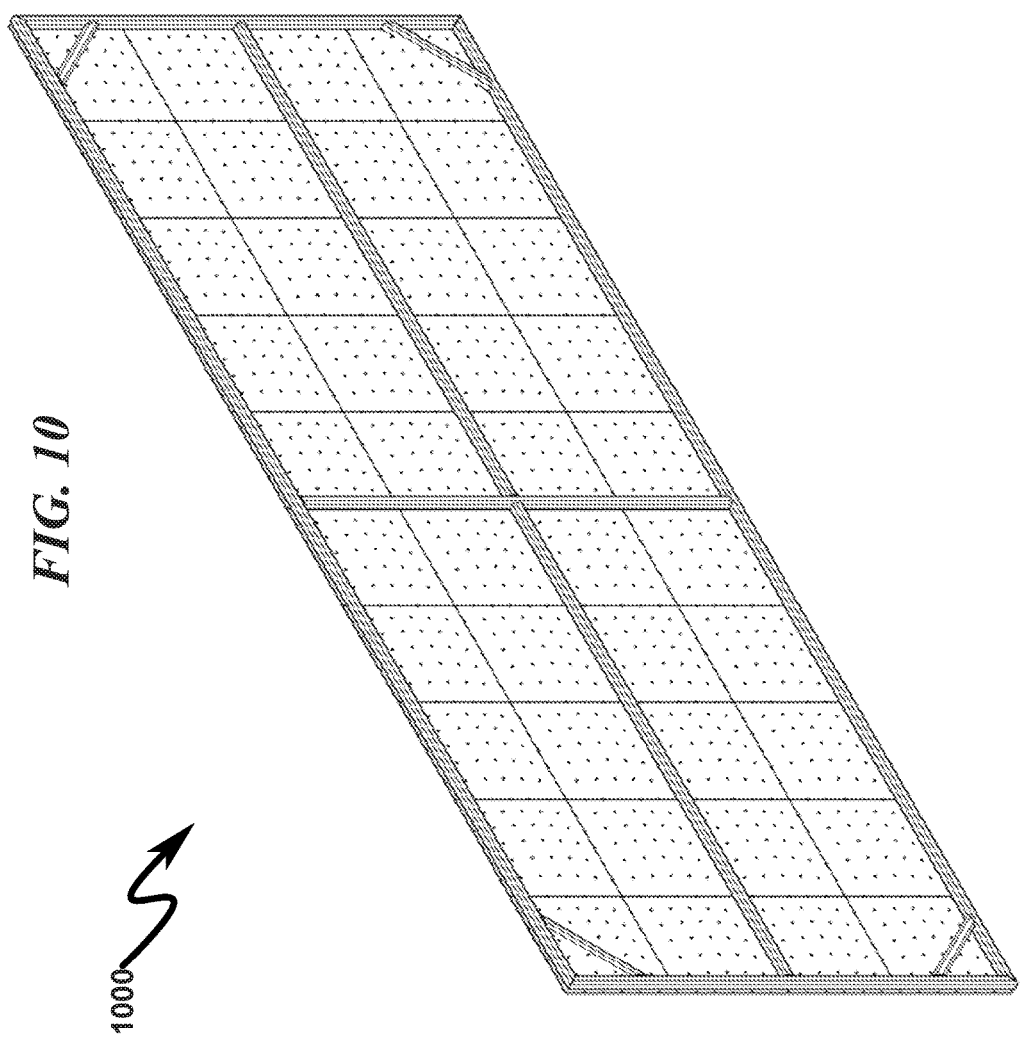
FIG. 10 illustrates a rear perspective view of an exemplary acoustic suppression panel (ASP) useful in some preferred invention embodiments.

As generally illustrated in FIG. 9 (0900) and FIG. 10 (1000), the system typically incorporates acoustic suppression panels (ASPS) having a rectangular form factor that comprise a welded structural support frame (SSF) comprising a tubular steel that is covered with acoustic suppression fabric (ASF) typically comprising a cementitious wood fiber such as the TECTUM brand of this material. The structural support frame (SSF) is depicted in more detail in the perspective view of FIG. 10 (1000).

Structural Support Frame (SSF) (1100)-(1200)

Figure 11:
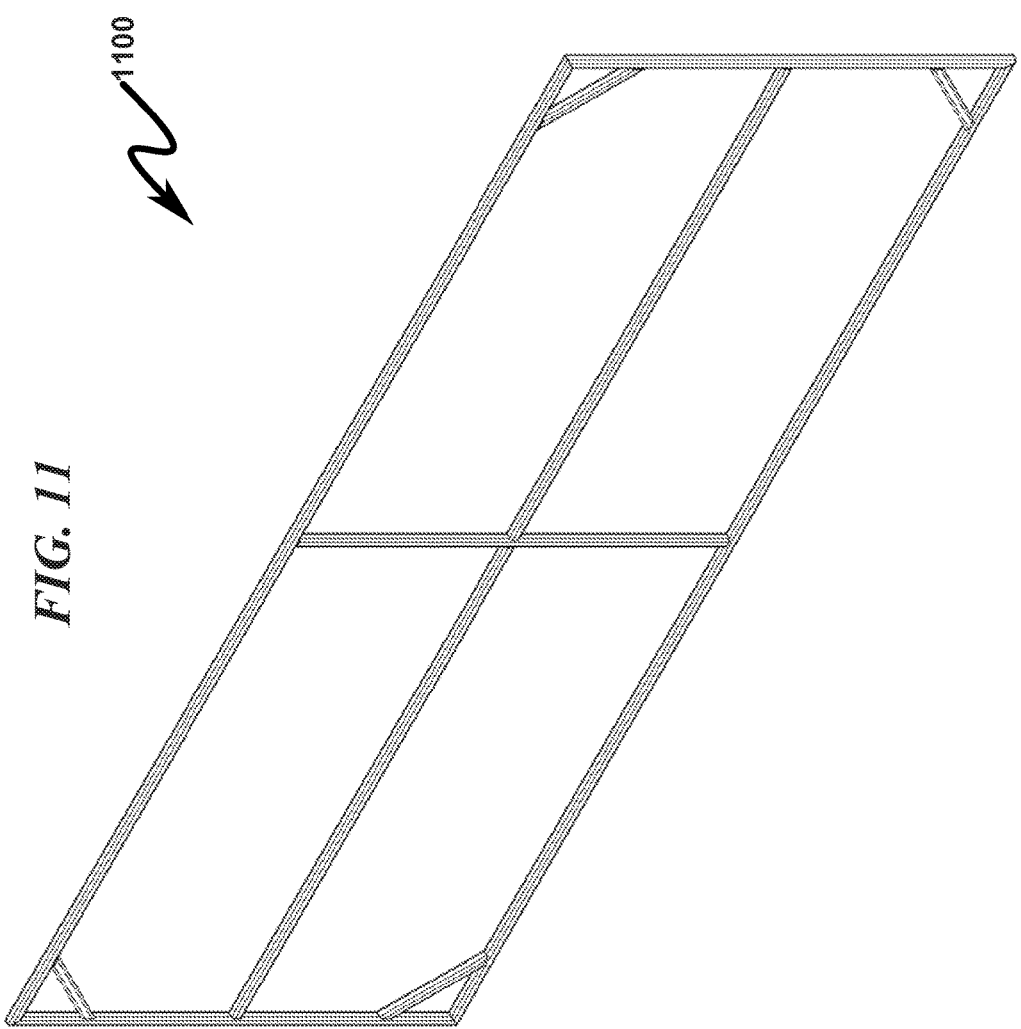
FIG. 11 illustrates a perspective view of an exemplary structural support frame (SSF) useful in some preferred invention embodiments.
Figure 12:
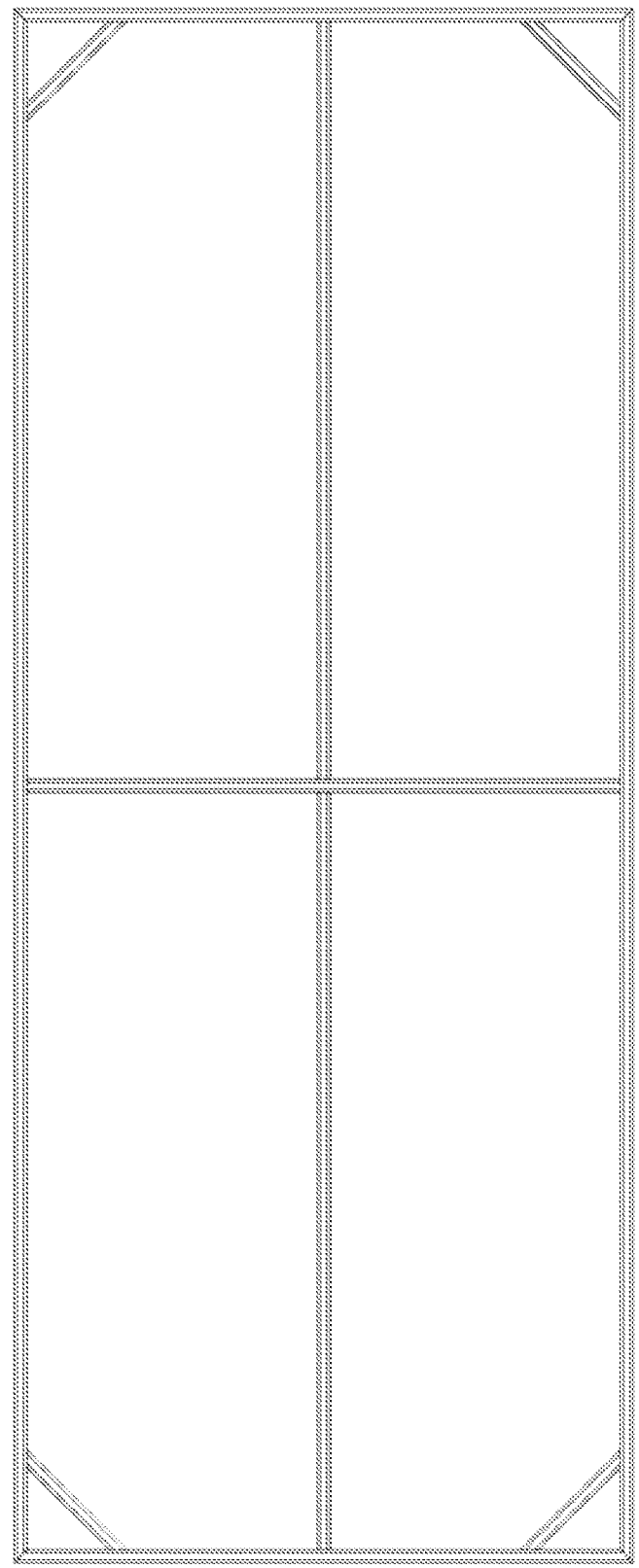
FIG. 12 illustrates a front view of an exemplary structural support frame (SSF) useful in some preferred invention embodiments.

The construction of the ASPS must typically meet several criterion, including the ability to rapidly deploy the sound abatement system, provide structural rigidity in high wind conditions, minimize weight, efficiently transport the system, and reduce material costs. To this end, optimal configurations of the present invention incorporate 2-inch square steel tubing for the SSF having dimensions of 20 feet wide by 8 feet or 10 feet high with internal cross supports at the midpoint of these extents. The use of tubular metal of other types is also anticipated. This permits optimal utilization of 20-foot standard tubular steel lengths by using three section lengths (joints) for the horizontal members, one half joint to support each vertical end of the frame, and an additional joint to support the center support. Remaining cutoff sections may then be used to supply diagonal supports as illustrated in FIG. 11 (1100) and FIG. 12 (1200).

This optimal configuration permits the ASPS to be both easily positioned with a crane at the job site, but also efficiently transported on a standard 40-foot flatbed trailer. The use of 20-foot by 8-foot or 20-foot by 10-foot panels permits these panels to be stacked efficiently on a standard 10-foot by 40-foot flatbed trailer.

Note that this SSF configuration also permits the midpoint perimeter of the SSF to be coincident with the placement of vertical I-beams (VIBs) that are driven into the ground around the periphery of the sound abated area if these VIBs are placed at 10-foot intervals. This degree of frequency is necessary given the fact that many sound abatement walls may be 30-40 feet high, and thus experience a significant wind load when populated with the ASPS.

Acoustic Suppression Fabric (ASF) (1300)-(1400)

Figure 13:
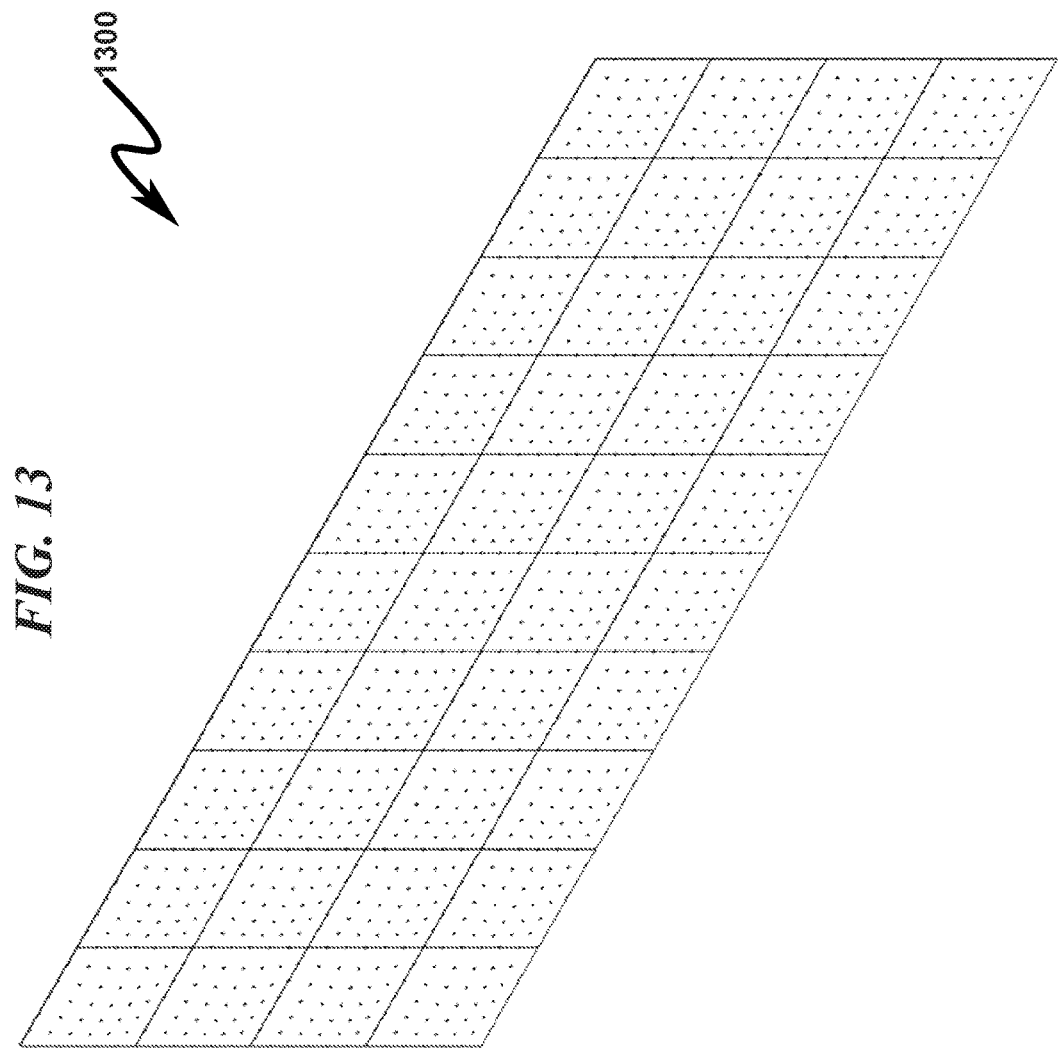
FIG. 13 illustrates a perspective view of an exemplary acoustic suppression fabric (ASF) useful in some preferred invention embodiments.

FIG. 13 (1300) and FIG. 14 (1400) provide additional detail regarding the acoustic suppression fabric (ASF) that may be used in many preferred invention embodiments. This material is generally fabricated in sheets conforming to the desired SSF area and may be attached to the SSF using a variety of methods including screws, eyelets, wire, rope, and flat steel plate mating the ASF material to the SSF via the use of a screw, bolt, or other fastener.

Exemplary Diagonal Fastening Cable Means Overview (1500)

Figure 17:
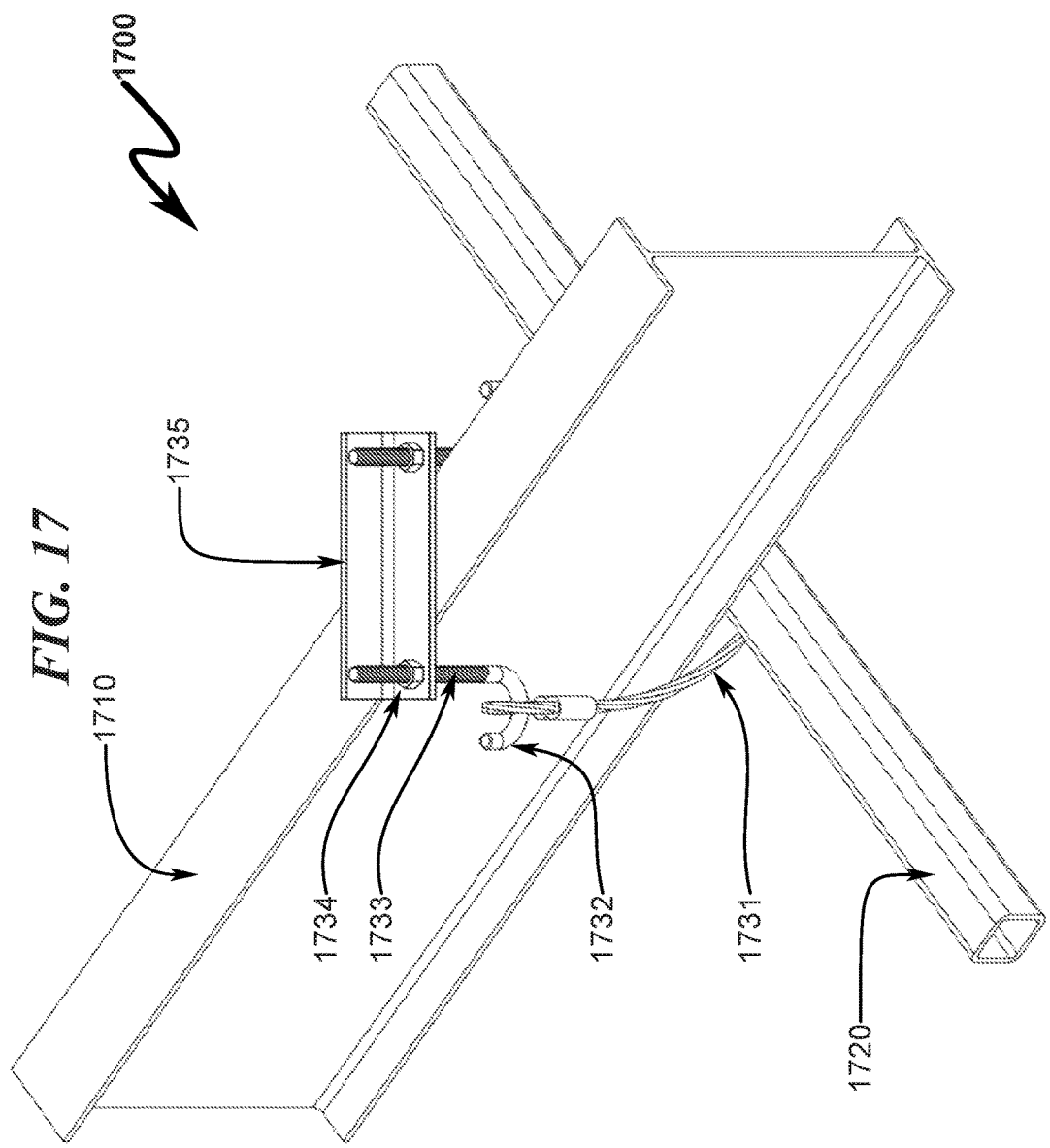
FIG. 17 illustrates a top right perspective view of a preferred invention embodiment utilizing a looped cable and retention plate.
Figure 18:
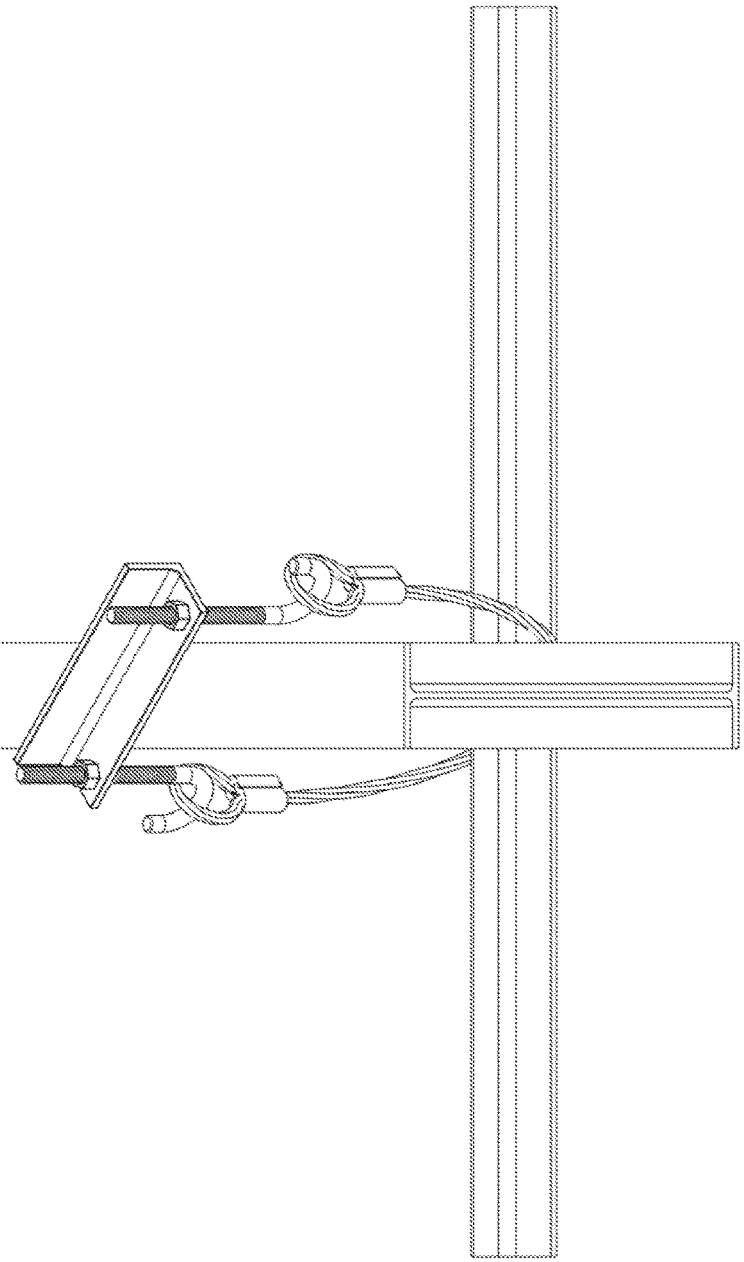
FIG. 18 illustrates a top center perspective view of a preferred invention embodiment utilizing a looped cable and retention plate.
Figure 19:
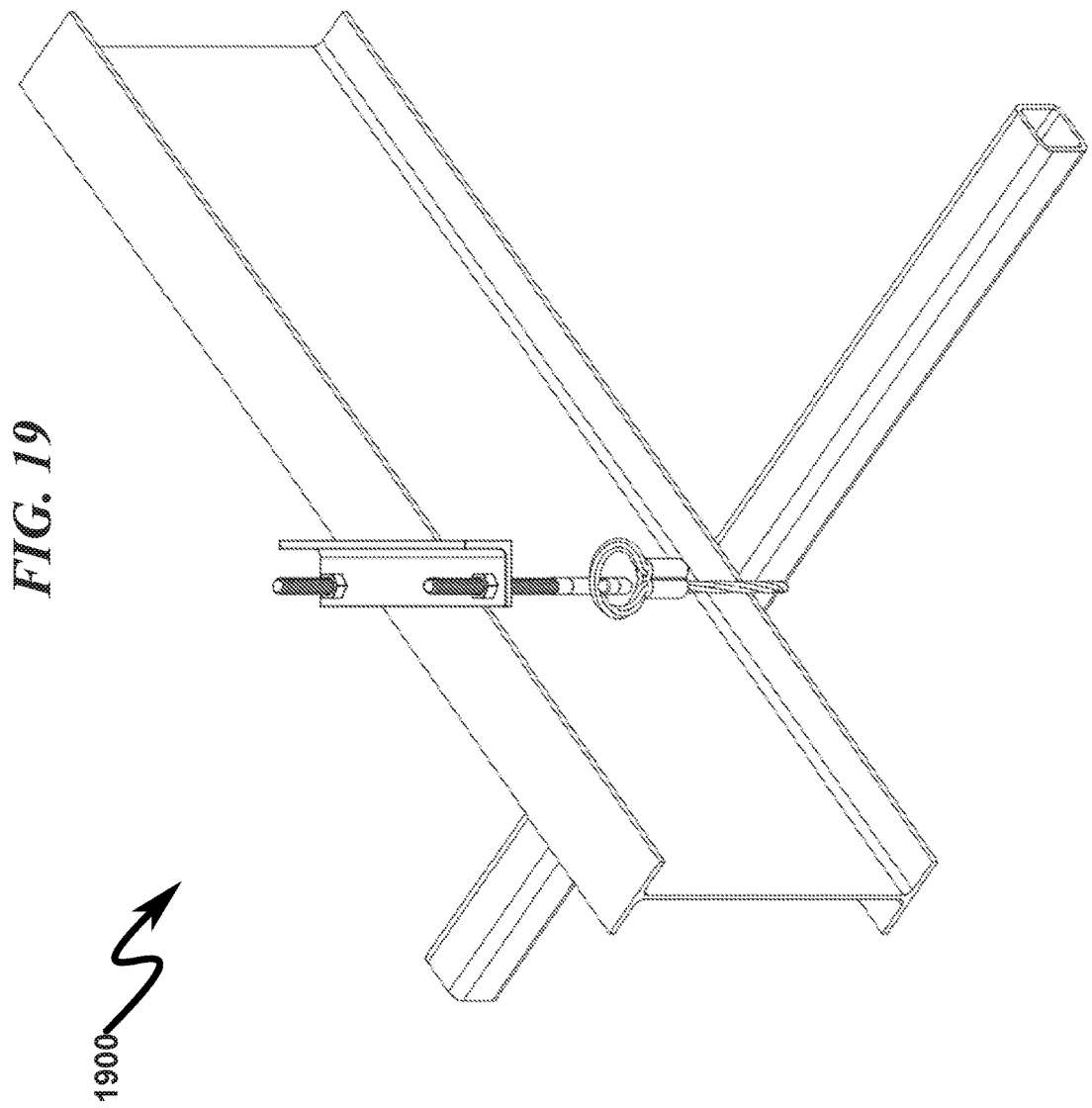
FIG. 19 illustrates a top left perspective view of a preferred invention embodiment utilizing a looped cable and retention plate.
Figure 20:
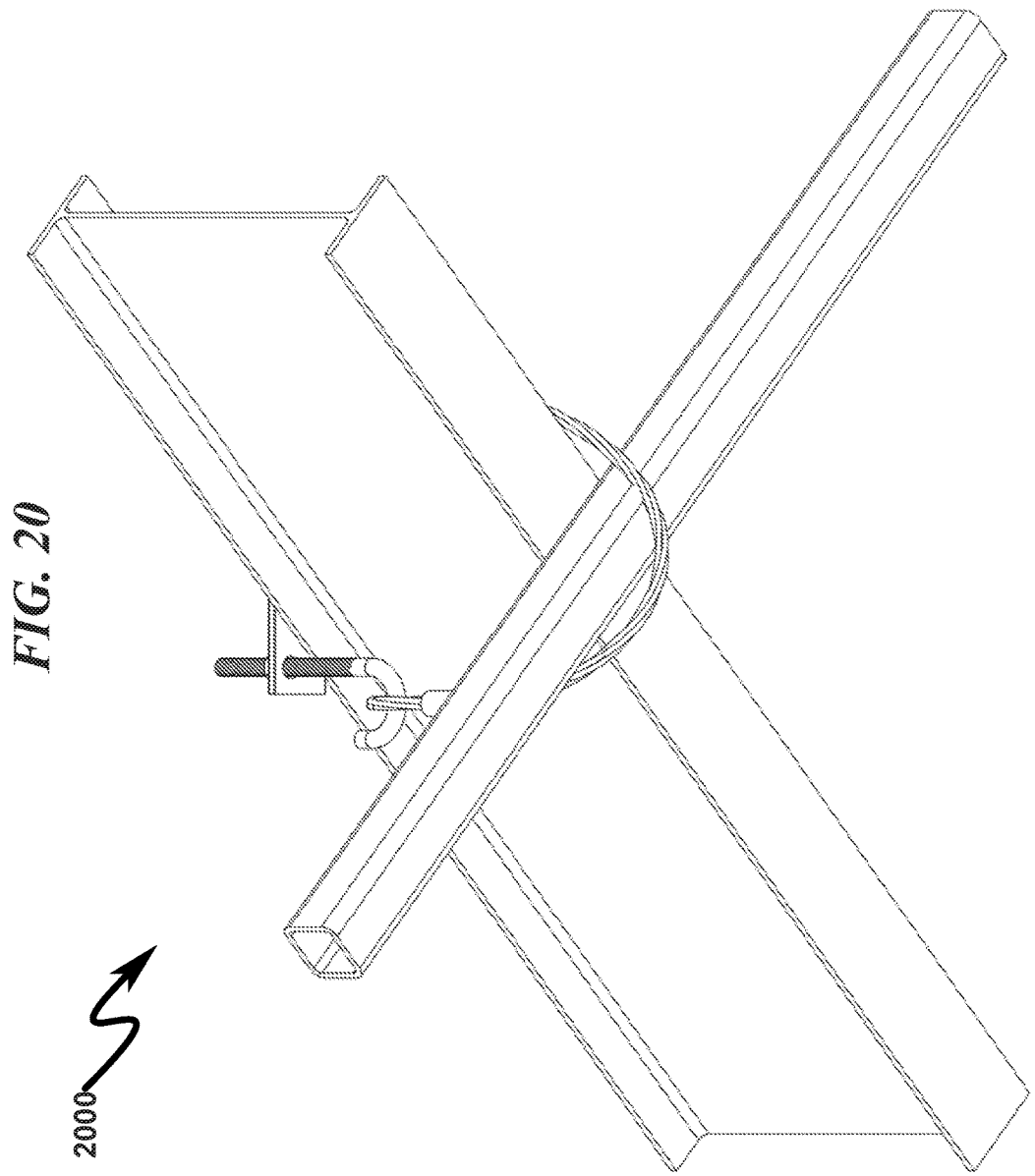
FIG. 20 illustrates a bottom perspective view of a preferred invention embodiment utilizing a looped cable and retention plate.
Figure 21:
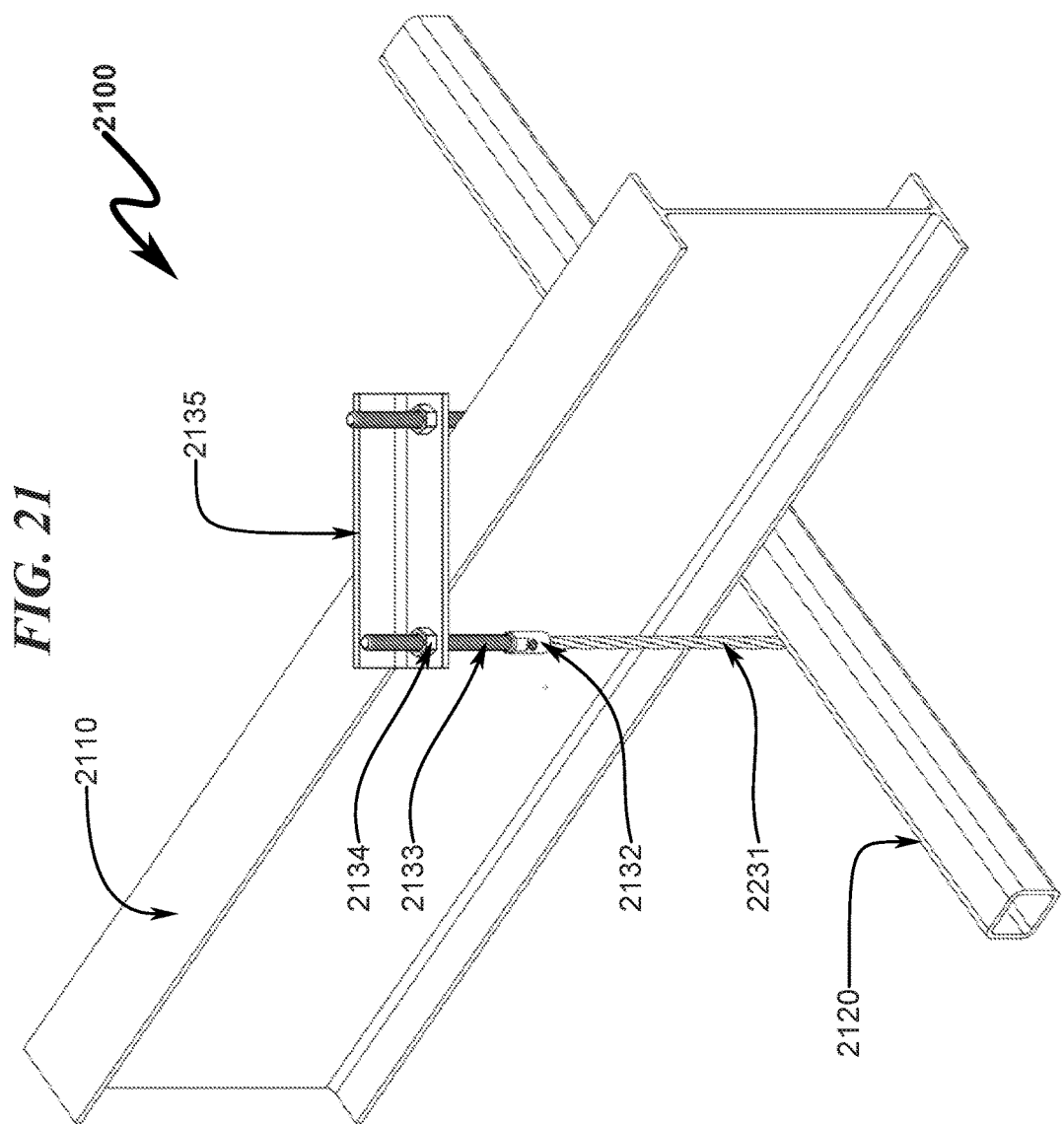
FIG. 21 illustrates a top right perspective view of a preferred invention embodiment utilizing a crimped stud cable and retention plate.
Figure 24:
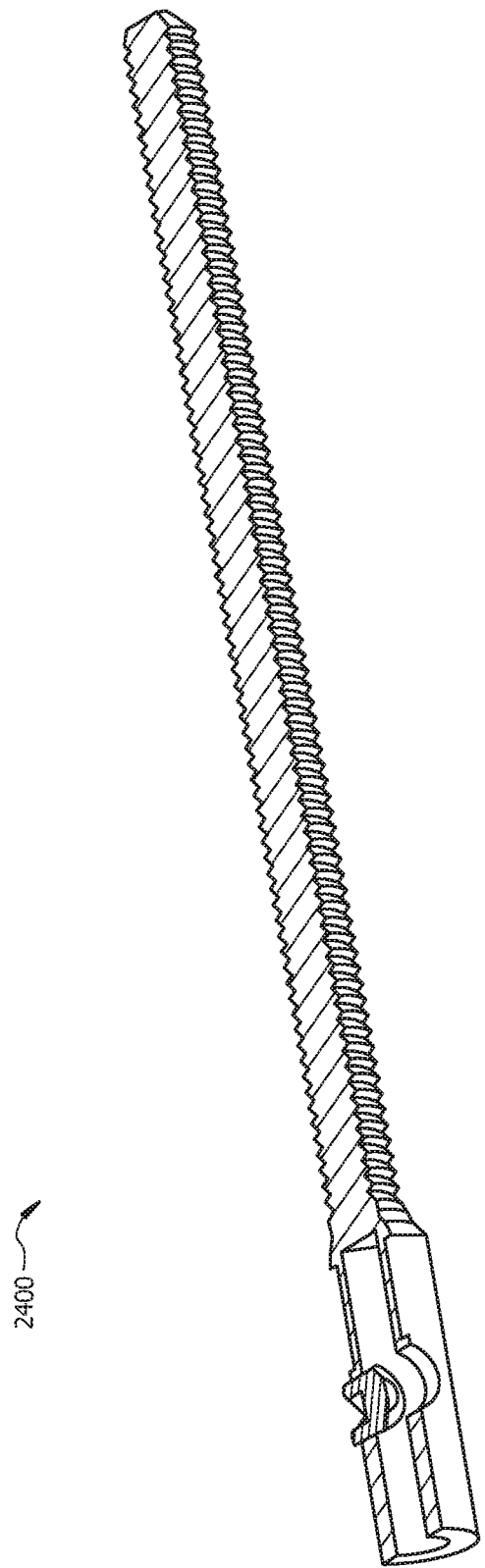
FIG. 24 illustrates a perspective sectional view of a preferred invention crimped stud cable embodiment.
Figure 25:
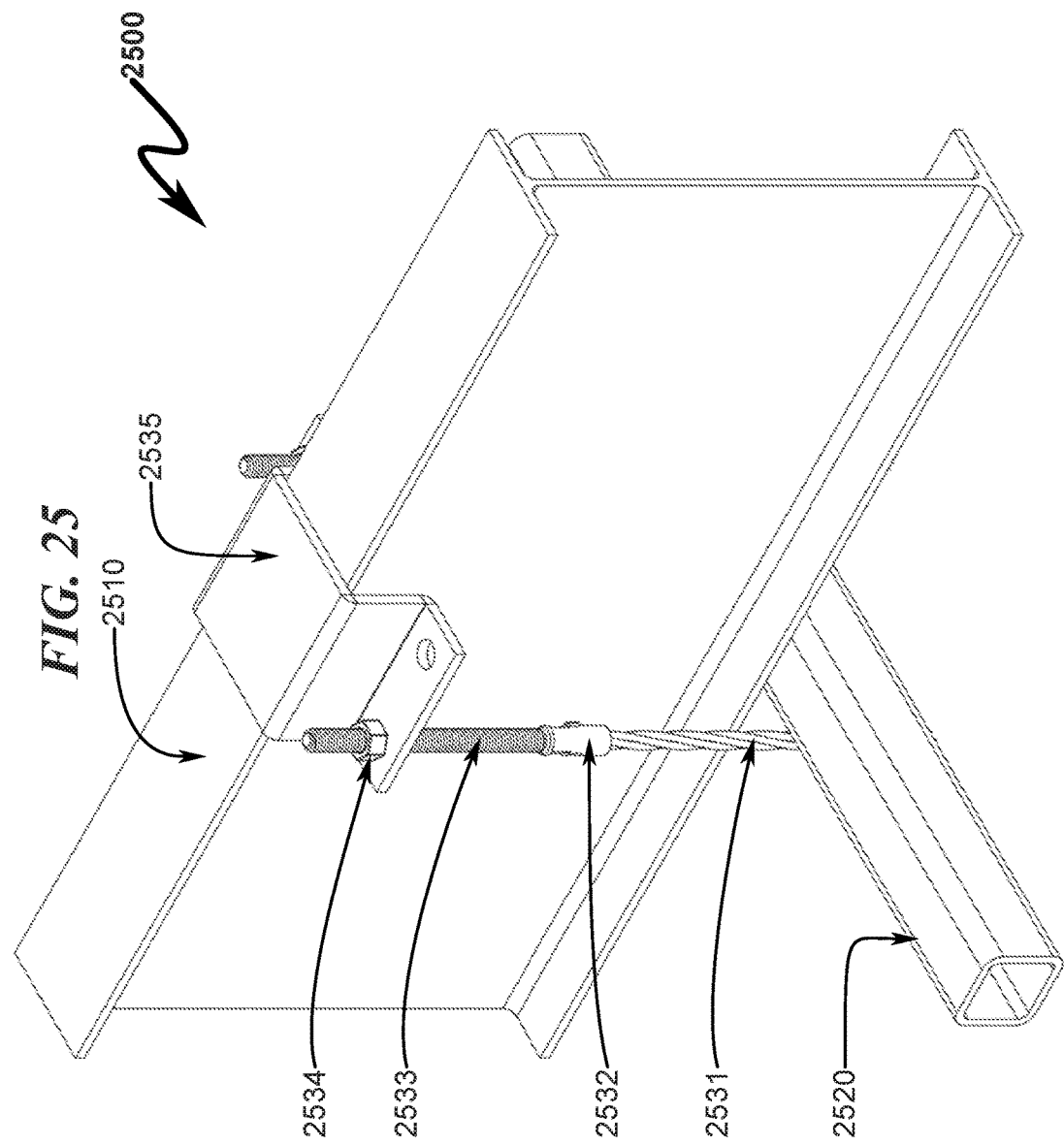
FIG. 25 illustrates a top right perspective view of a preferred invention embodiment utilizing a crimped stud cable and preformed retention plate.
Figure 28:
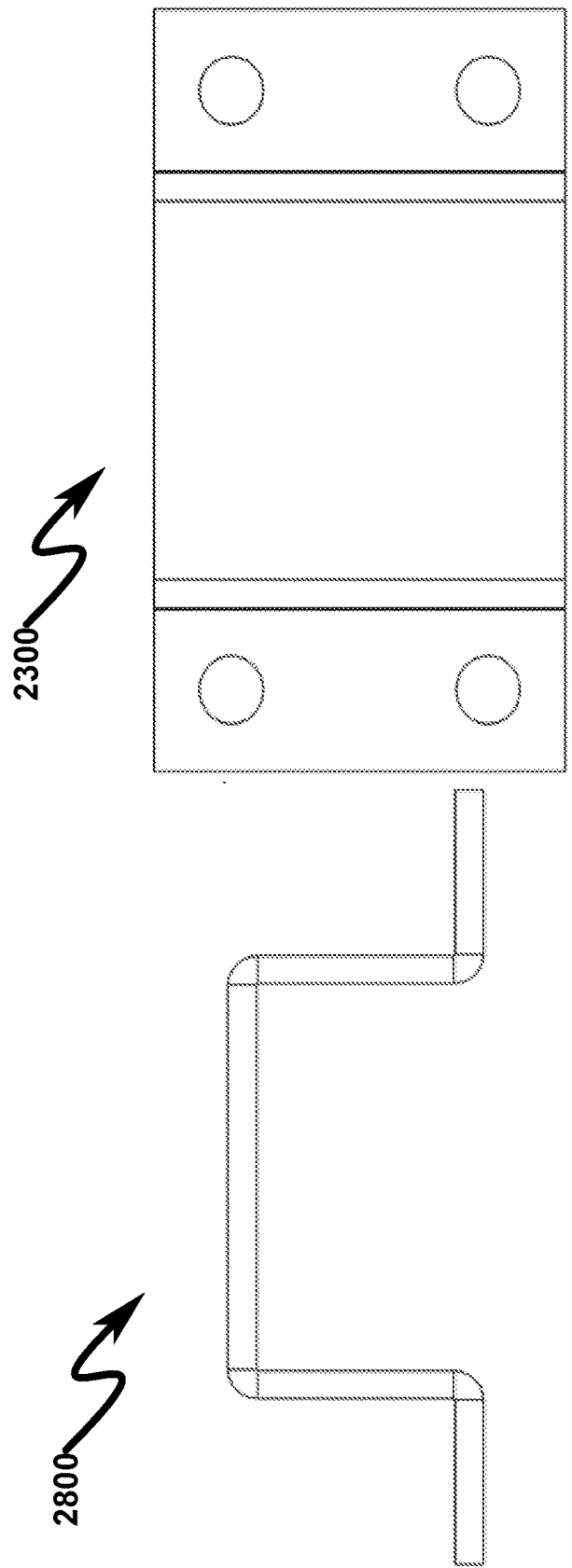
FIG. 28 illustrates side and top views of a preferred invention embodiment utilizing a preformed retention plate.
Figure 29:
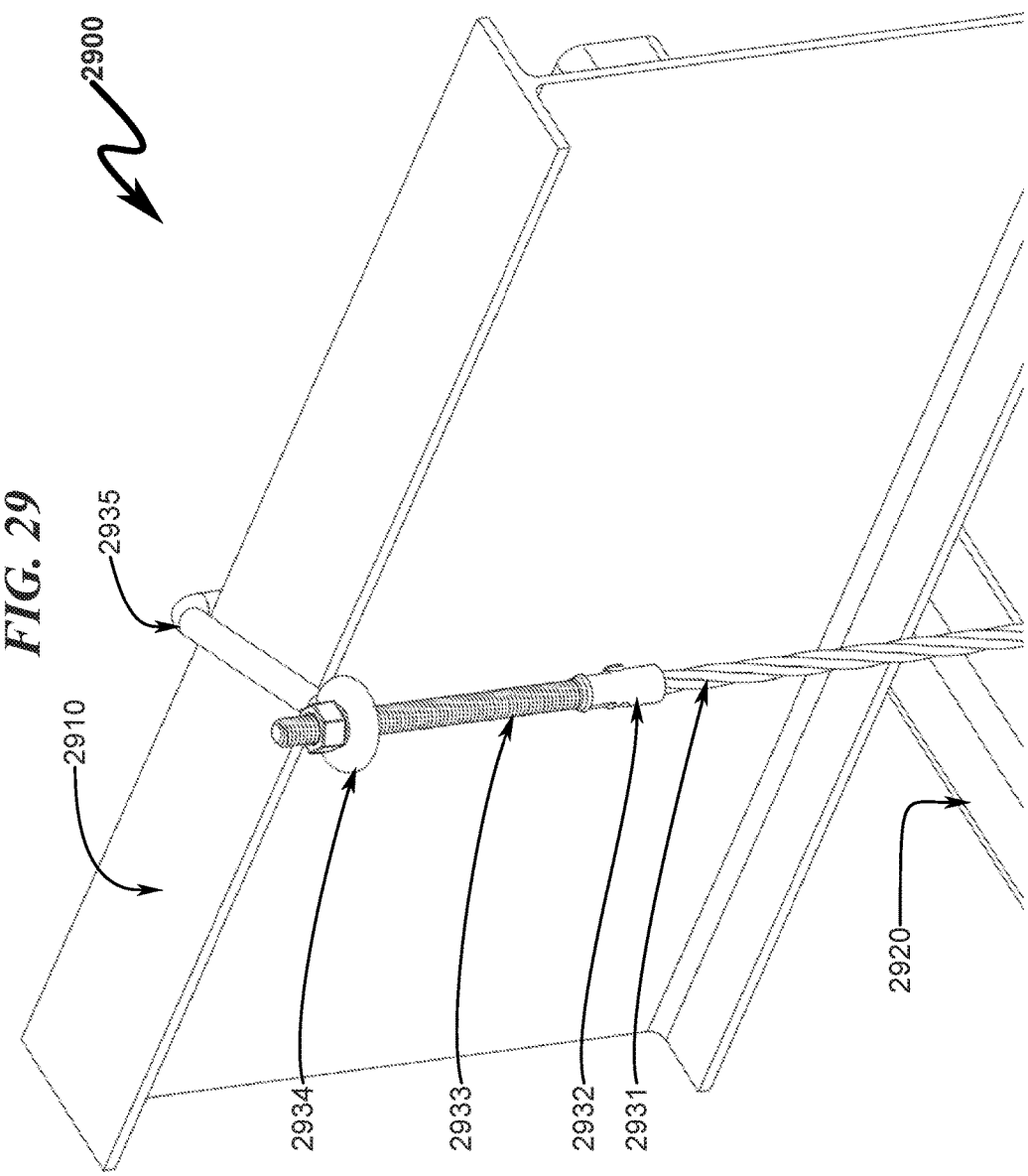
FIG. 29 illustrates a top right perspective view of a preferred invention embodiment utilizing a crimped stud cable and preformed retention bar.
Figure 32:
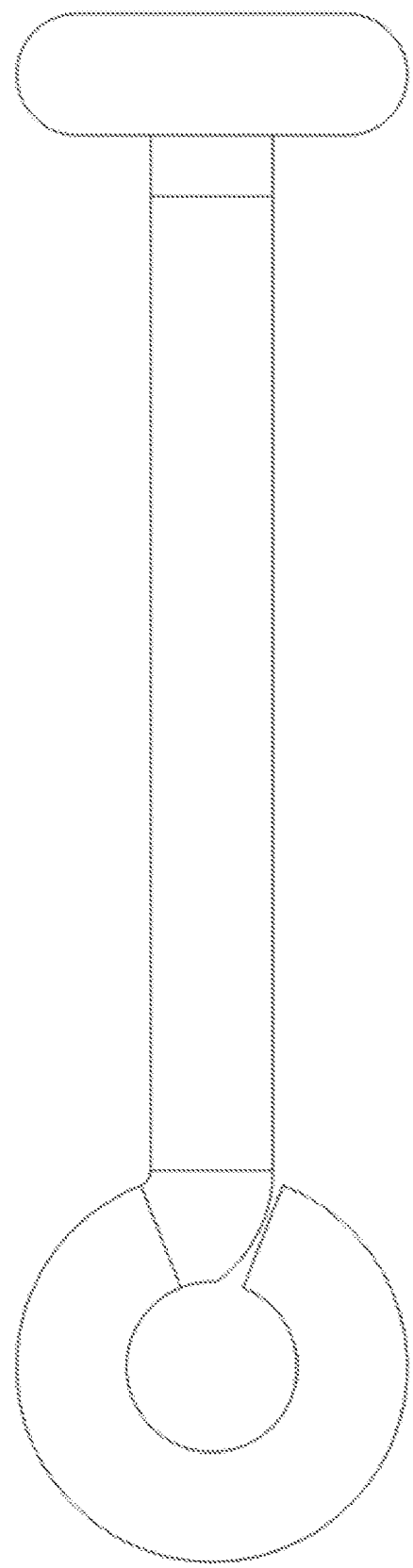
FIG. 32 illustrates a side view of a preferred invention embodiment preformed retention bar.
Figure 33:
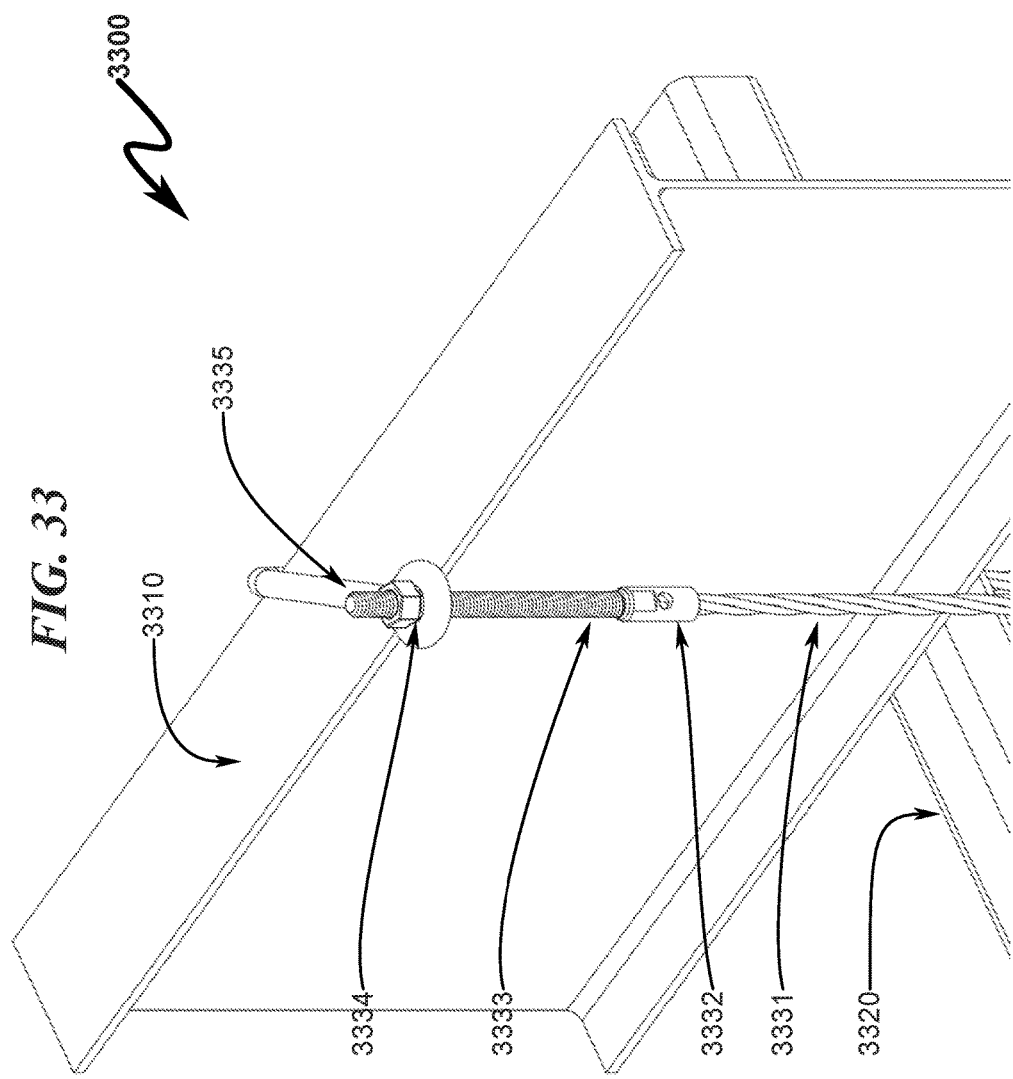
FIG. 33 illustrates a top right perspective view of a preferred invention embodiment utilizing a crimped stud cable and crimped stud retention bar.
Figure 36:
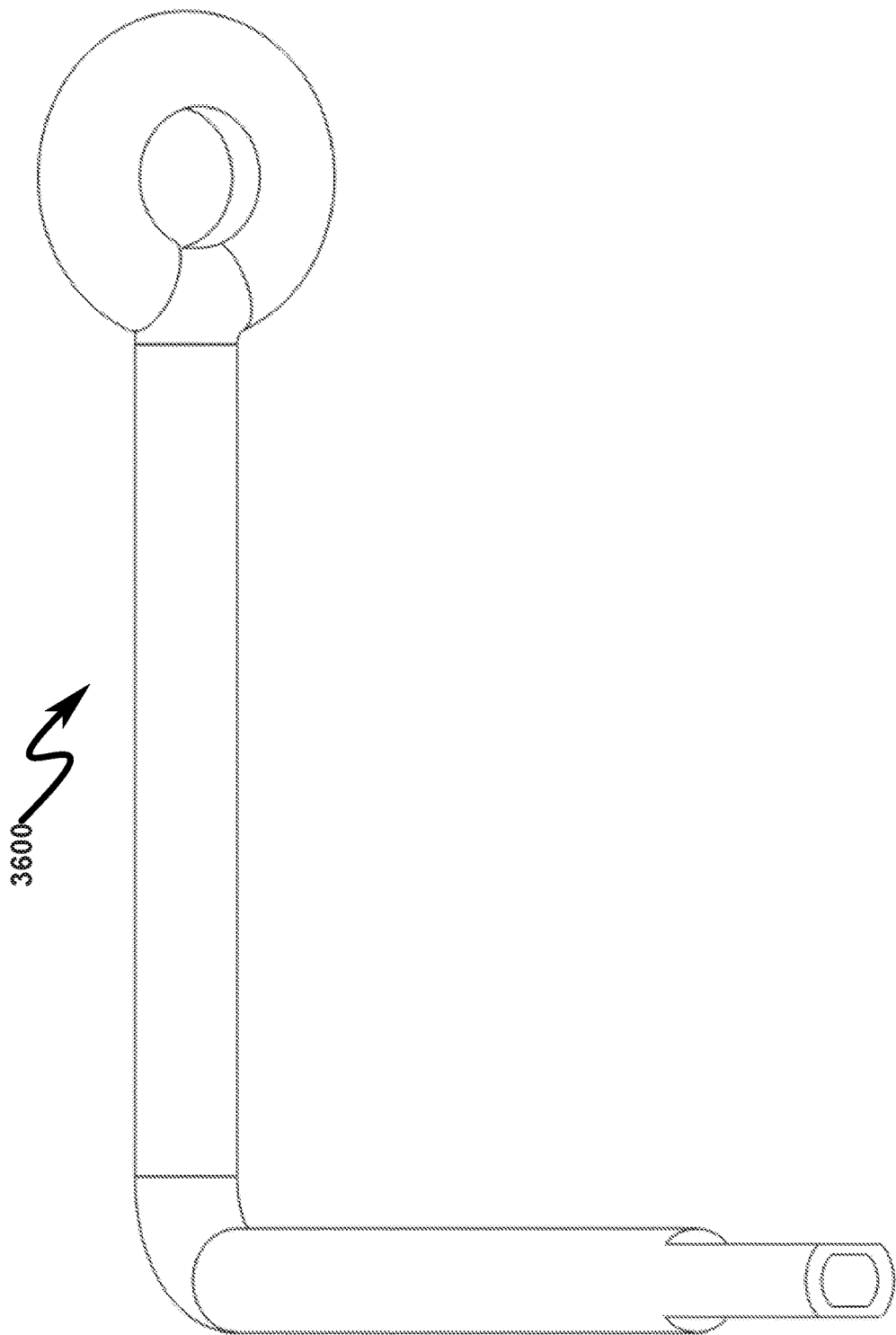
FIG. 36 illustrates a side view of a preferred invention embodiment crimped stud retention bar.

While the present invention may be implemented in many forms, several preferred embodiments make use of diagonal fastening cable means (1501) as depicted schematically in FIG. 15 (1500). This chart and the corresponding Figure references detail a variety of preferred exemplary methodologies of implementing the diagonal fastening cable means for securing the vertical I-beams (VIB) to the acoustic suppression panel (ACP) structural support frames (SSF). While not exhaustive, some preferred DFC (1501) configurations include:

J-HOOK—comprising nuts (1510) (or other suitable fasteners), retention plate (1511), J-hooks (1512), and looped cable (1513) (FIG. 17 (1700)-FIG. 20 (2000));

CRIMPED STUD—comprising nuts (1520) (or other suitable fasteners), retention plate (1521), and crimped stud cable (1522) (FIG. 21 (2100)-FIG. 24 (2400));

PREFORMED RETENTION PLATE—comprising nuts (1530) (or other suitable fasteners), preformed retention plate (1531), and crimped stud cable (1532) (FIG. 25 (2500)-FIG. 28 (2800));

PREFORMED RETENTION BAR—comprising nuts (1540) (or other suitable fasteners), preformed retention bar (1541), and crimped stud cable (1542) (FIG. 29 (2900)-FIG. 32 (3200)); and CRIMPED STUD RETENTION BAR—comprising nuts (1550) (or other suitable fasteners), crimped stud retention bar (1551), and crimped stud cable (1552) (FIG. 33 (3300)-FIG. 36 (3600)).

One skilled in the art will recognize that this list is only exemplary of the present invention teachings.

Exemplary Cable Means Overview (1600)

Figure 37:
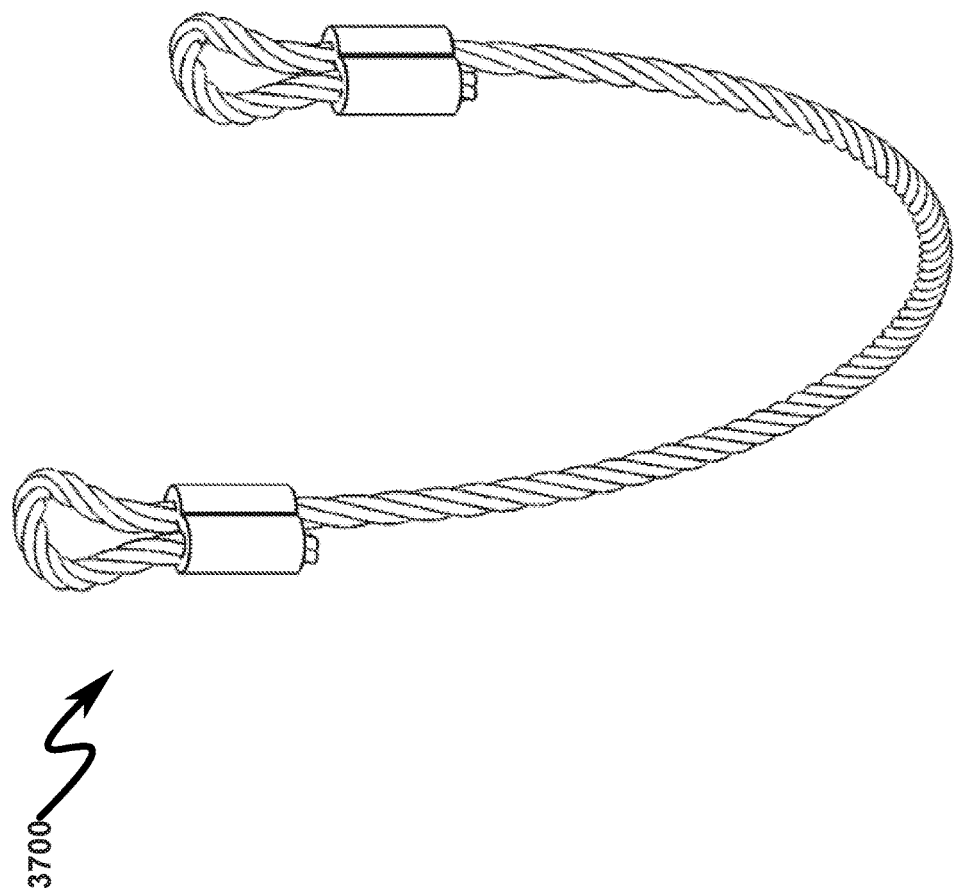
FIG. 37 illustrates a perspective view of a preferred invention embodiment looped cable design incorporating ferrule cable terminations.
Figure 38:
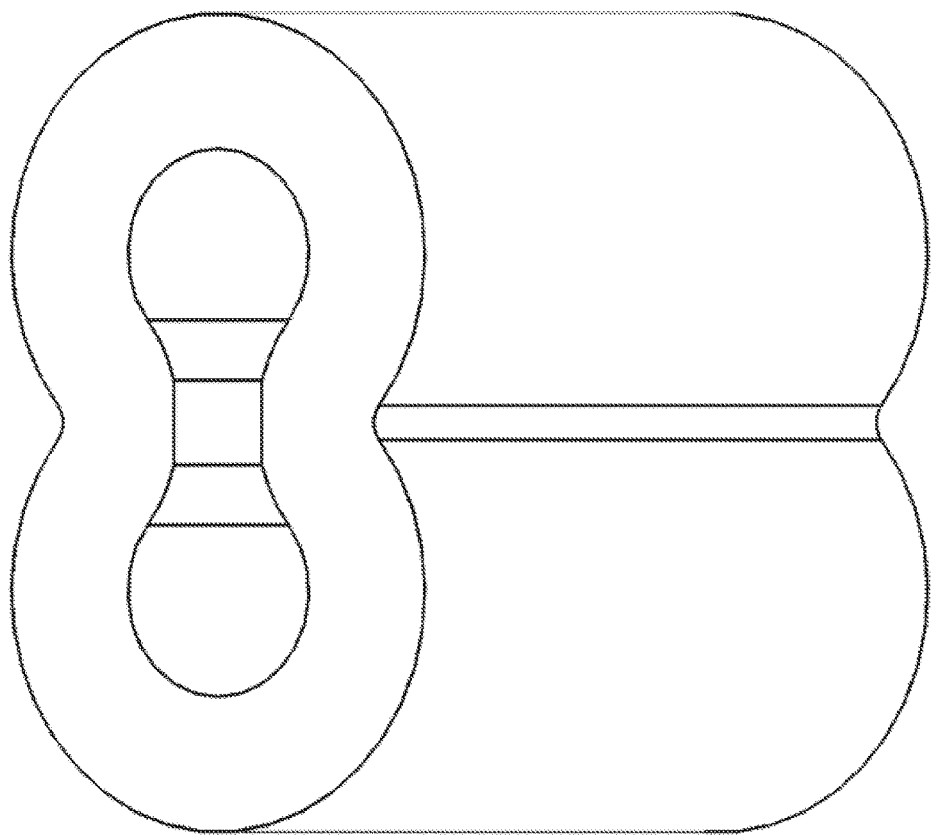
FIG. 38 illustrates a front perspective view of a preferred invention embodiment cable termination ferrule design.
Figure 40:
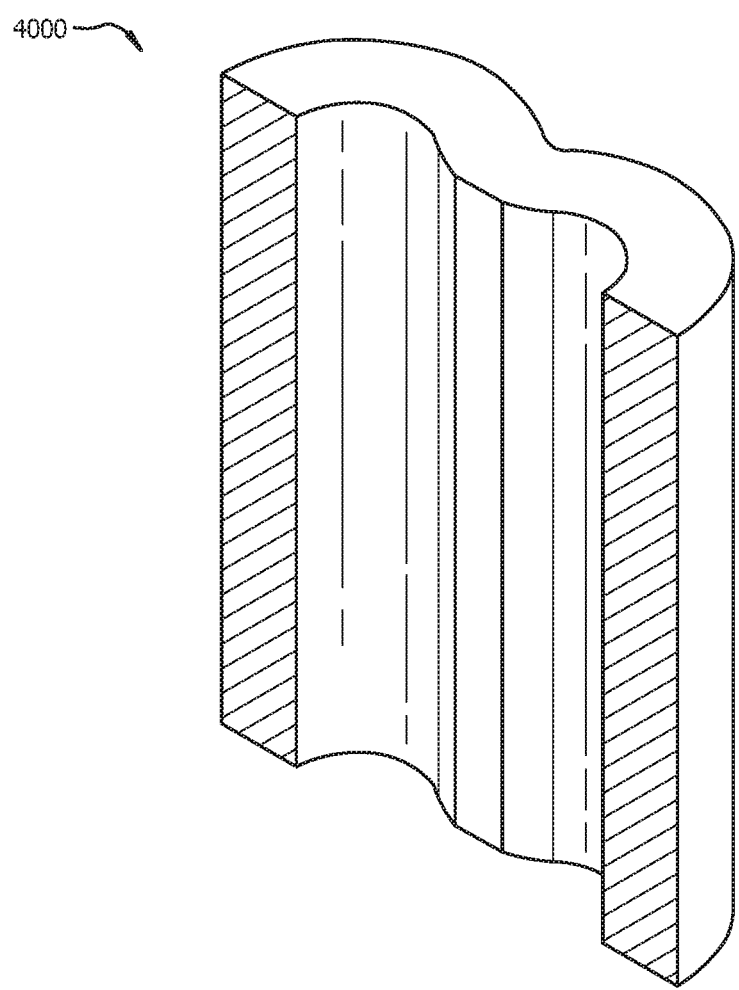
FIG. 40 illustrates a sectional view of a preferred invention embodiment cable termination ferrule design.
Figure 42:
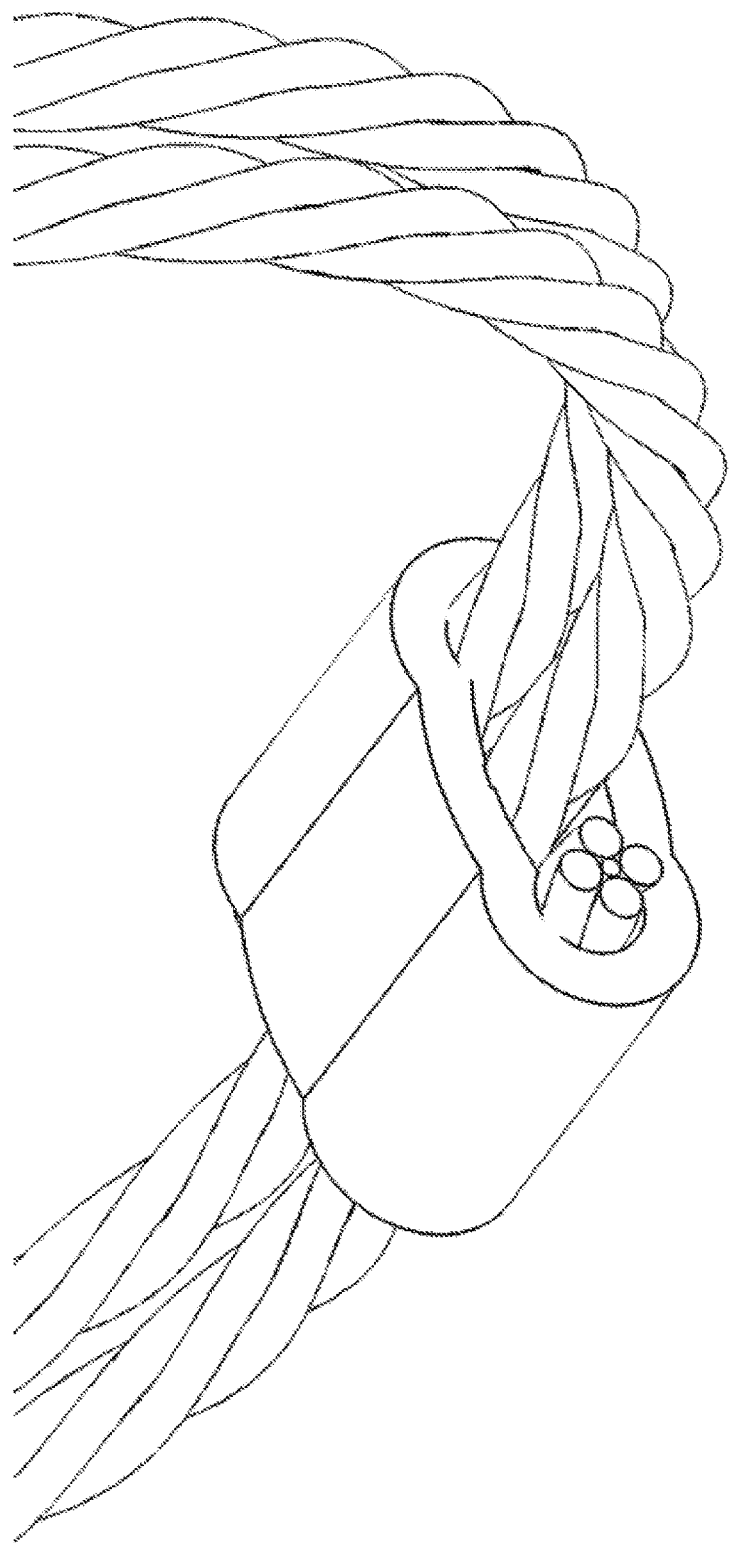
FIG. 42 illustrates a front perspective view of a preferred invention embodiment double cable termination ferrule design.
Figure 44:
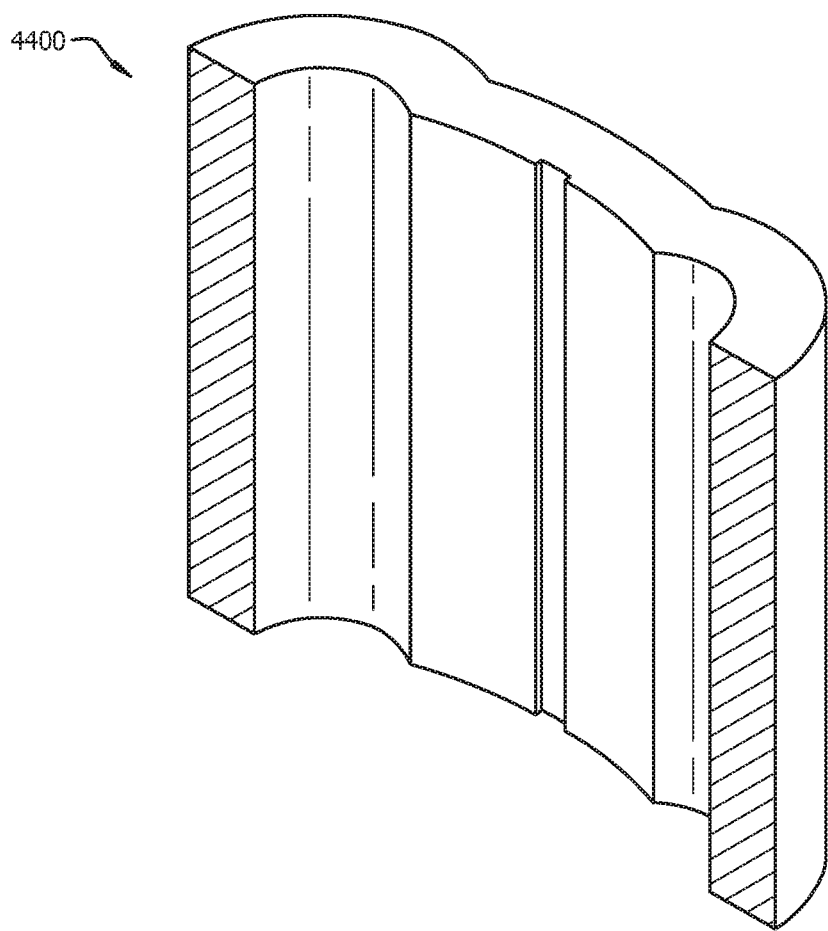
FIG. 44 illustrates a sectional view of a preferred invention embodiment double cable termination ferrule design.
Figure 45:
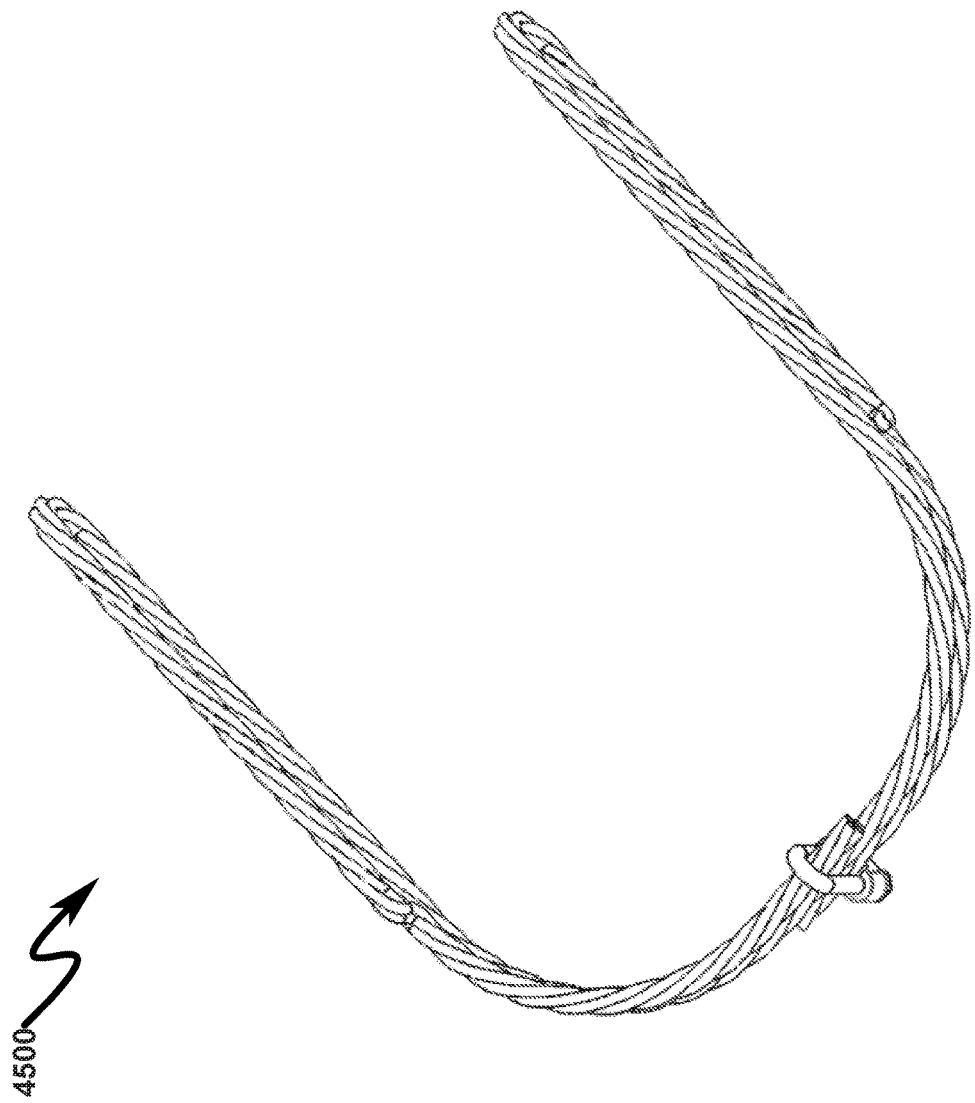
FIG. 45 illustrates a top perspective view of a preferred invention embodiment looped double cable design incorporating a cable clamp termination.
Figure 46:
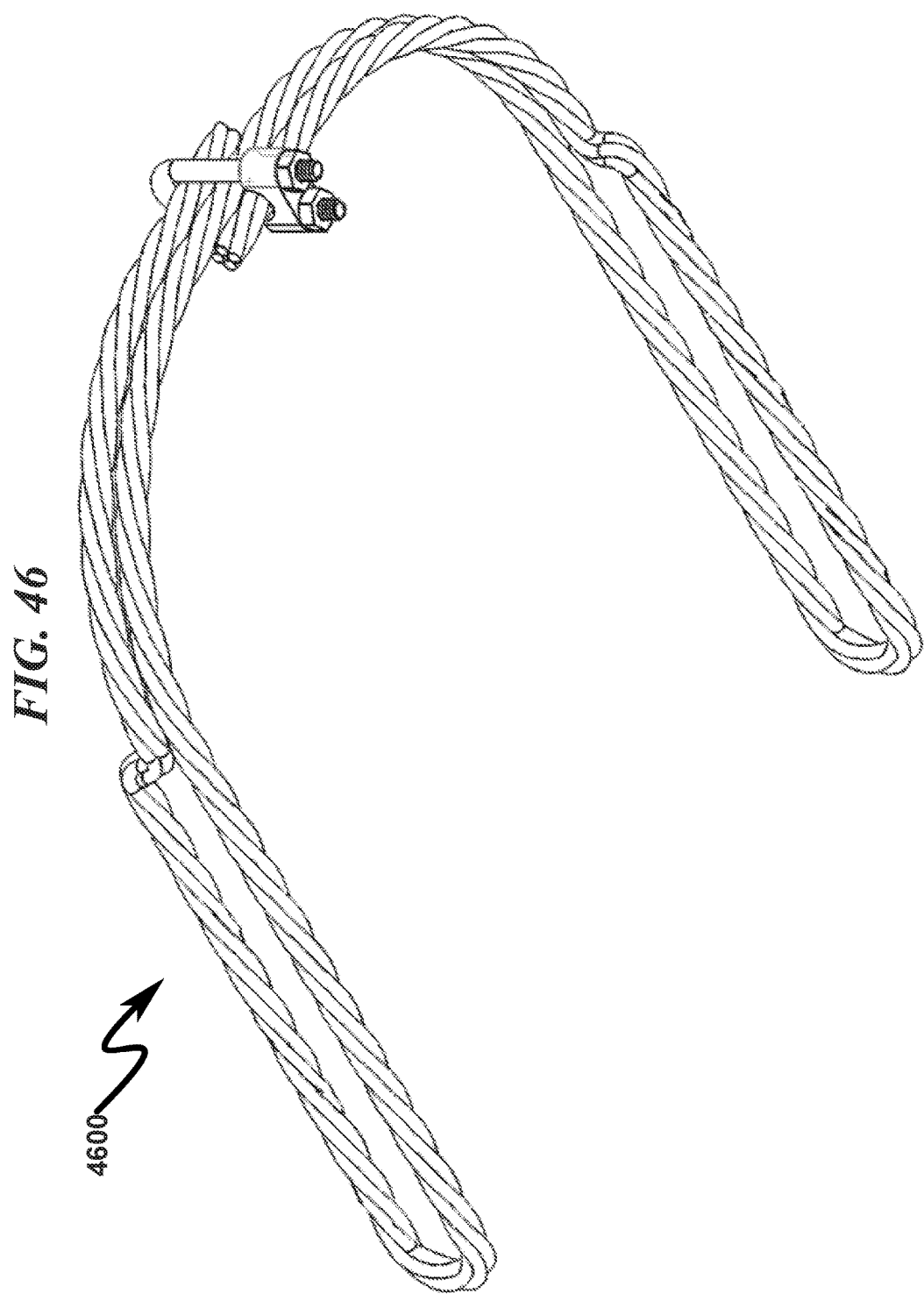
FIG. 46 illustrates a bottom perspective view of a preferred invention embodiment looped double cable design incorporating a cable clamp termination.
Figure 47:
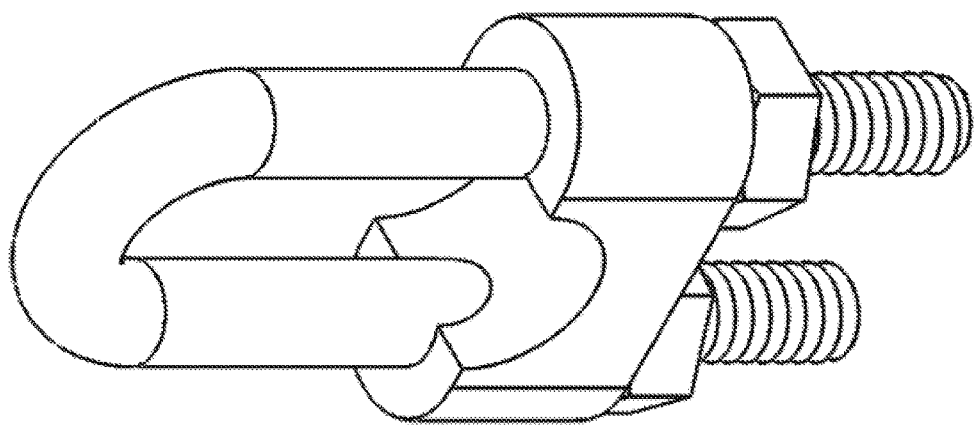
FIG. 47 illustrates a side perspective view of a preferred invention embodiment double cable clamp termination design.
Figure 50B:
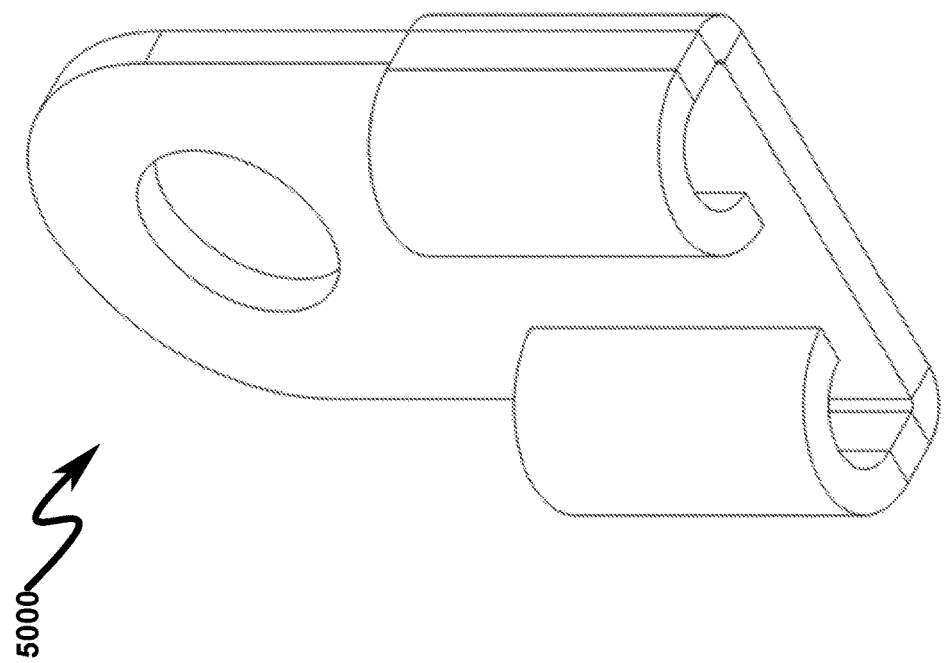
FIG. 50 illustrates perspective views of an exemplary embodiment of a swaged eyelet cable terminator.
Figure 50A:
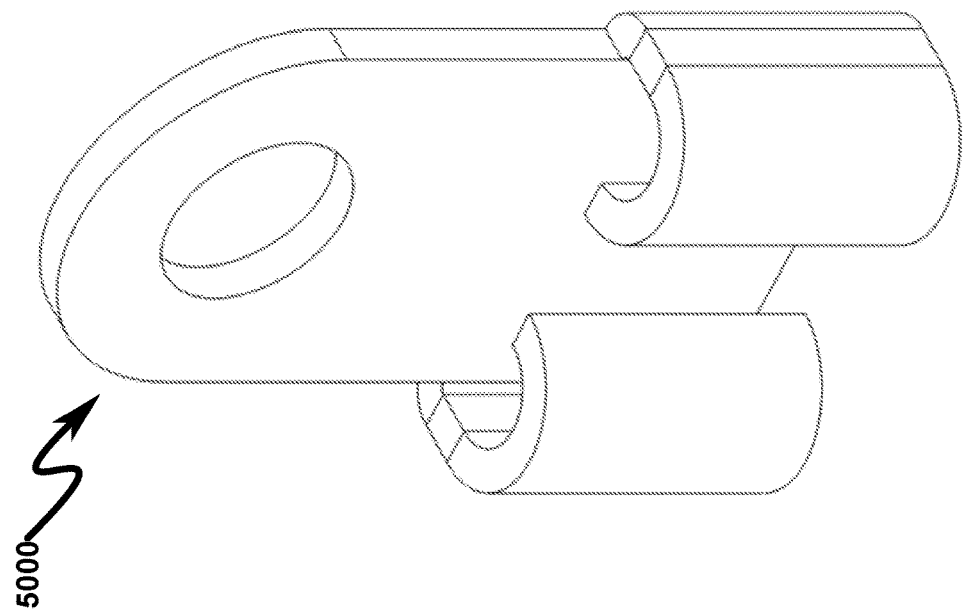
Figure 52:
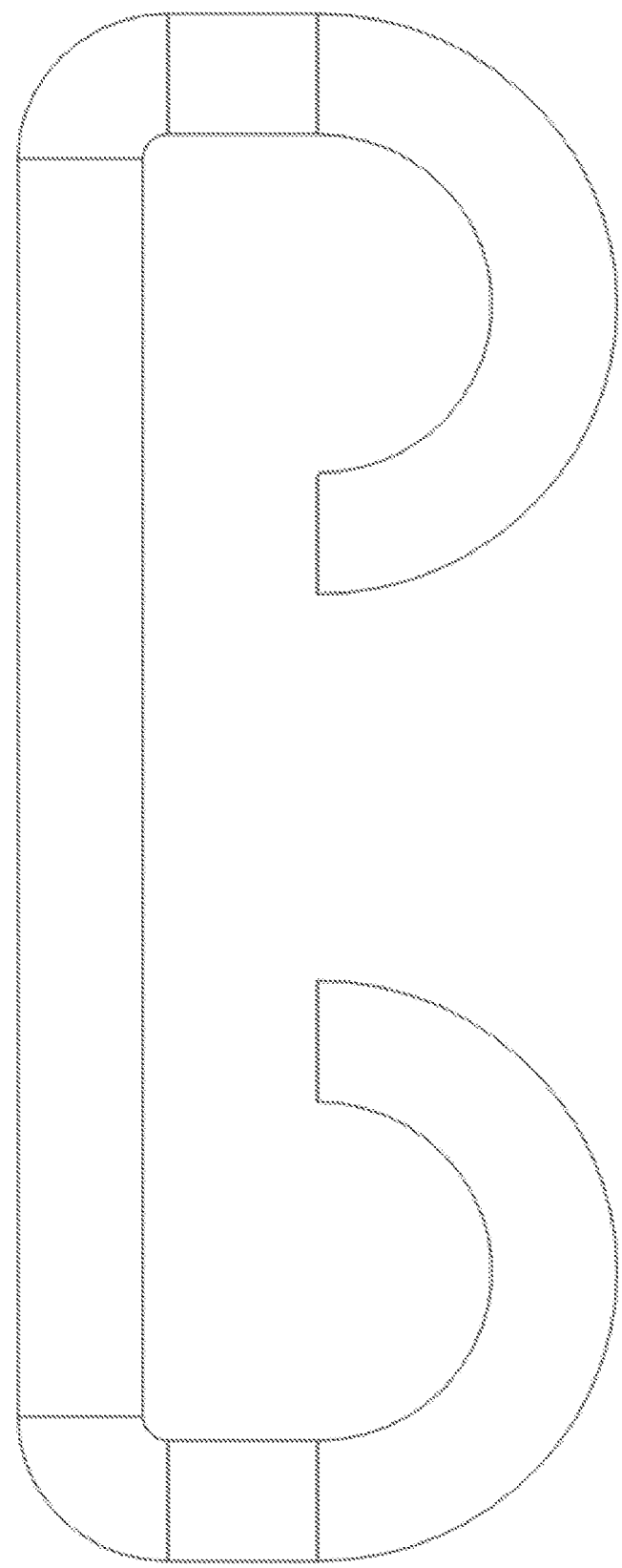
FIG. 52 illustrates a bottom view of an exemplary embodiment of a swaged eyelet cable terminator.
Figure 53:
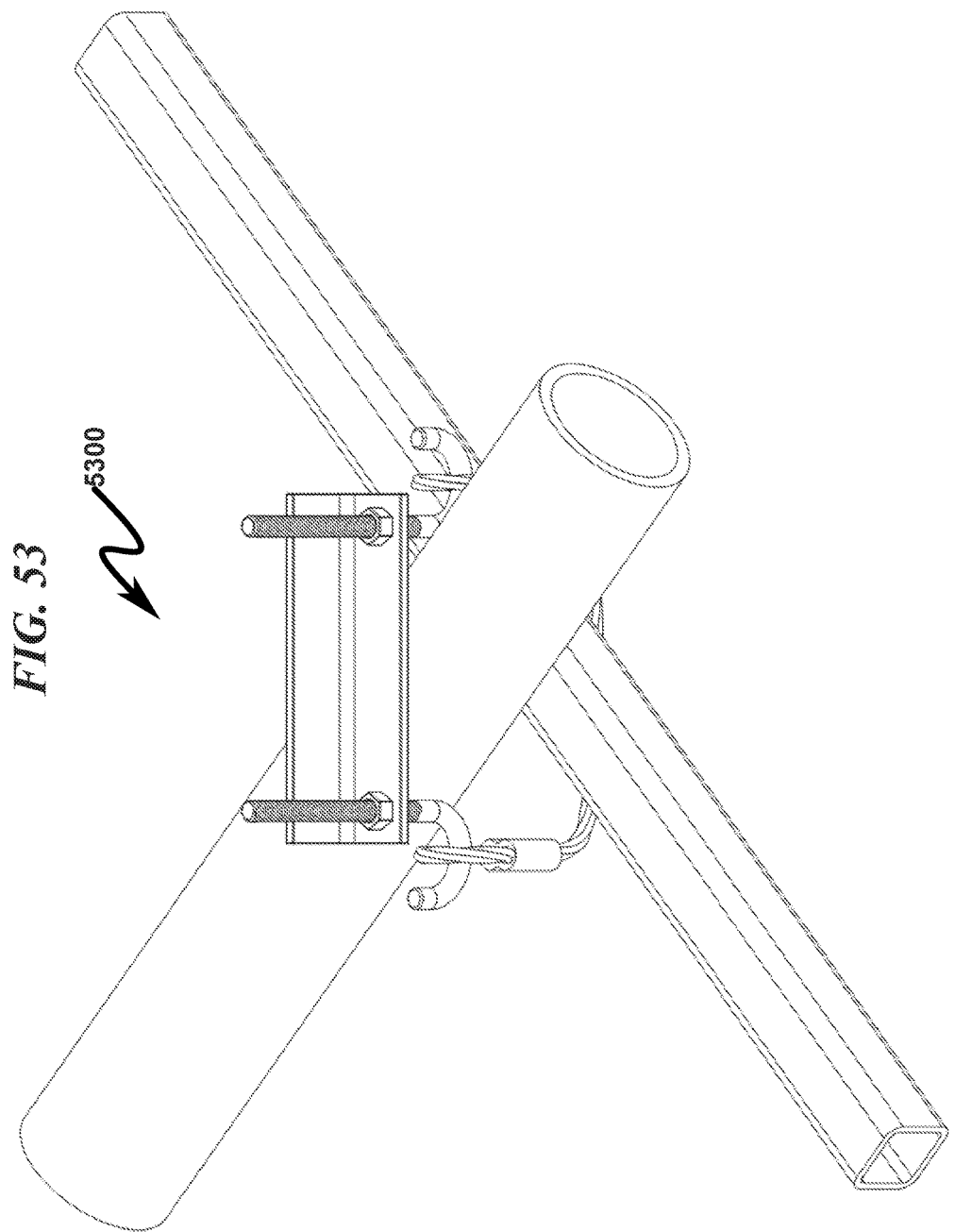
FIG. 53 illustrates a top perspective view of a preferred exemplary invention embodiment employing angle iron, J-hooks, and looped-end cable to secure a VSM pipe and SSF.
Figure 56:
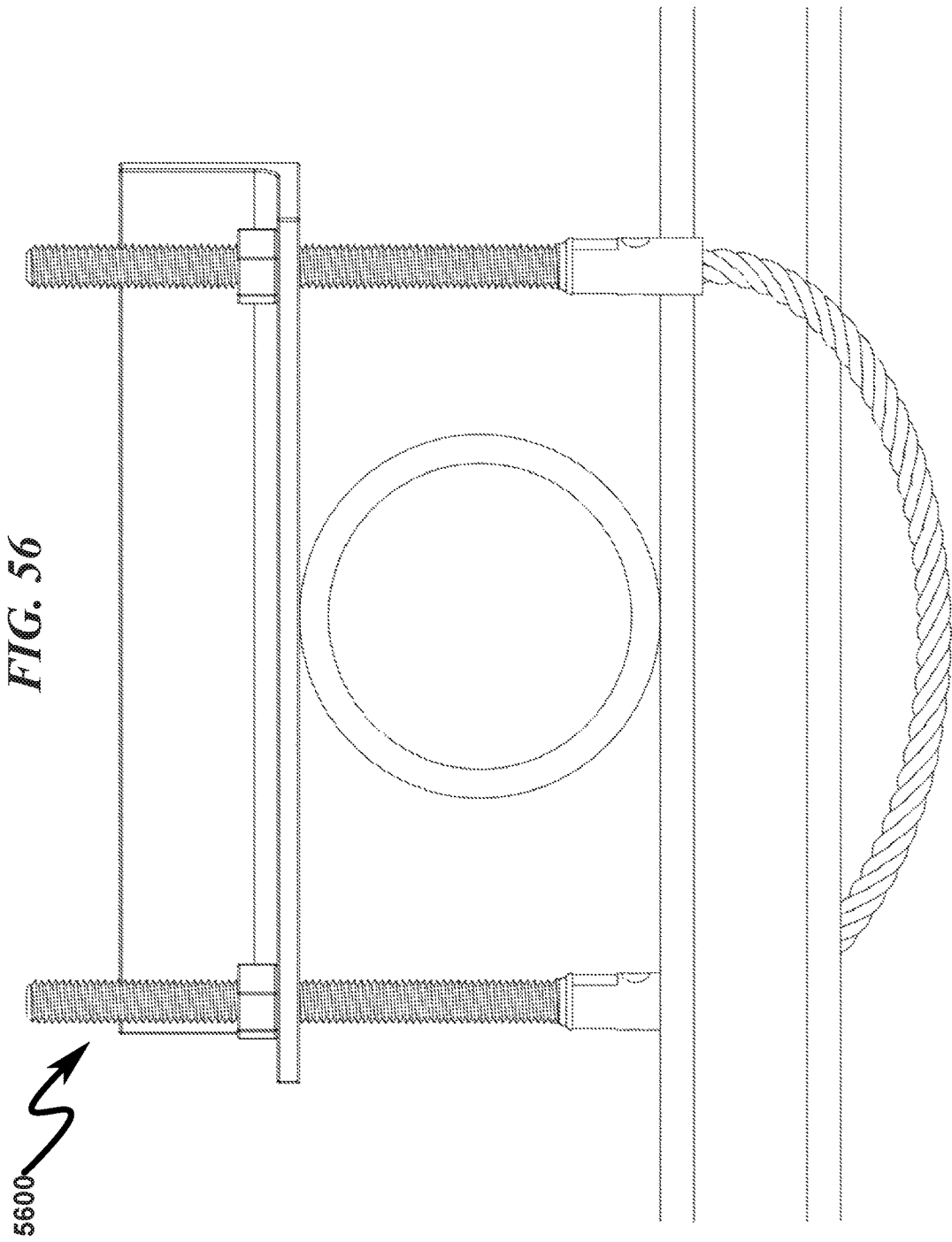
FIG. 56 illustrates a bottom perspective view of a preferred exemplary invention embodiment employing angle iron and crimped-stud cable to secure a VSM pipe and SSF.

Within the context of the DFC structures outlined in FIG. 15 (1500), the cable means used in these embodiments may take a wide variety of forms. While the present invention may be implemented in many forms, several preferred embodiments make use of cable means (1601) as depicted schematically in FIG. 16 (1600). This chart and the corresponding Figure references detail a variety of preferred exemplary methodologies of implementing the cable means for securing the vertical I-beams (VIB) to the acoustic suppression panel (ACP) structural support frames (SSF). These configurations are designed to provide for rapid deployment of the ASPS as well as ensure integrity of the sound abatement structure under high wind conditions. While not exhaustive, some preferred cable means (1601) configurations include:

FERRULE CABLE—comprising cable (1610) and ferrule (1611) (FIG. 37 (3700)-FIG. 40 (4000));

TRIPLE FERRULE CABLE—comprising double cable (1620) and triple ferrule (1621) (FIG. 41 (4100)-FIG. 44 (4400));

U-BOLT CABLE—comprising cable (1630), U-bolt (1631), nuts (1632), and retainer (1633) (FIG. 45 (4500)-FIG. 48 (4800));

SWAGED EYELETS—comprising cable (1640) and swaged eyelets (1641) (FIG. 49 (4900)-FIG. 52 (5200)); and PREFORMED BAR—comprising cable (1650) and preformed bar (1651) (FIG. 53 (5300)-FIG. 56 (5600)).

One skilled in the art will recognize that this list is only exemplary of the present invention teachings.

Exemplary Binding Retention Plate Embodiment (1700)-(2000)

A preferred exemplary invention employing a binding retention plate (BRP) is depicted in FIG. 17 (1700)-FIG. 20 (2000). In this preferred embodiment, the diagonal fastening cable (DFC) means is implemented utilizing a looped cable (1731) in conjunction with J-hooks (1732) having a threaded fastening shaft (1733), fasteners (1734), and a binding retention plate (BRP) (1735) typically constructed of angle iron. This configuration permits the VIB (1710) to be frictionally mated to the SSF (1720) by tightening the fasteners (1734) to place a predetermined tension on the looped cable (1731).

Inspection of this diagram illustrates several of the advantages of the present invention over the prior art. Specifically, the web length of the VIB (1710) may be quite large with respect to the cross sectional dimensions of the SSF (1720) as depicted in this scaled example illustrating a typical 12-inch VIB and 2×2 SSF tubular steel member. This in some circumstances prevents failure of conventional VIB-to-SSF fastening means in high wind conditions. In contrast, the use of a looped cable (1731) in this situation ensures that there is no possibility of the SSF (1720) being dislodged from the VIB (1710) without complete failure of the looped cable (1731).

Note that this embodiment provides for ease of installation in that the J-hooks (1732), fasteners (1734), and retention plate (1735) may be preassembled with the fasteners (1734) loosened to permit engagement of the J-hooks (1732) with the ends of the looped cable (1731) after the looped cable (1731) is positioned to encircle the VIB (1710) and SSF (1720). Once the J-hooks (1732) are engaged with the looped cable (1731), the fasteners (1734) may be tightened to secure the VIB (1710) to the SSF (1720) via tensioning of the looped cable (1731).

As depicted in FIG. 17 (1700), the looped cable (1731) may be looped once around the VIB (1710) and the SSF (1720) to secure the VIB (1710) to the SSF (1720). However, it is also possible in some preferred embodiments for the looped cable (1731) to be looped twice or more around the VIB (1710) and the SSF (1720) to secure the VIB (1710) to the SSF (1720). This multi-loop configuration may in some circumstances permit a single length of looped cable (1731) and associated J-hooks (1732) to operate in a variety of environments where the web length of the VIB (1710) varies. Thus, this configuration permits stocking of a single configuration of looped cable (1731) and J-hook (1732) length to permit application in a wide variety of acoustic suppression environments. This is in contrast with many prior art systems that require mounting hardware to be specifically designed for a given VIB and/or SSF configuration.

Exemplary Crimped Stud Embodiment (2100)-(2400)

Figure 22:
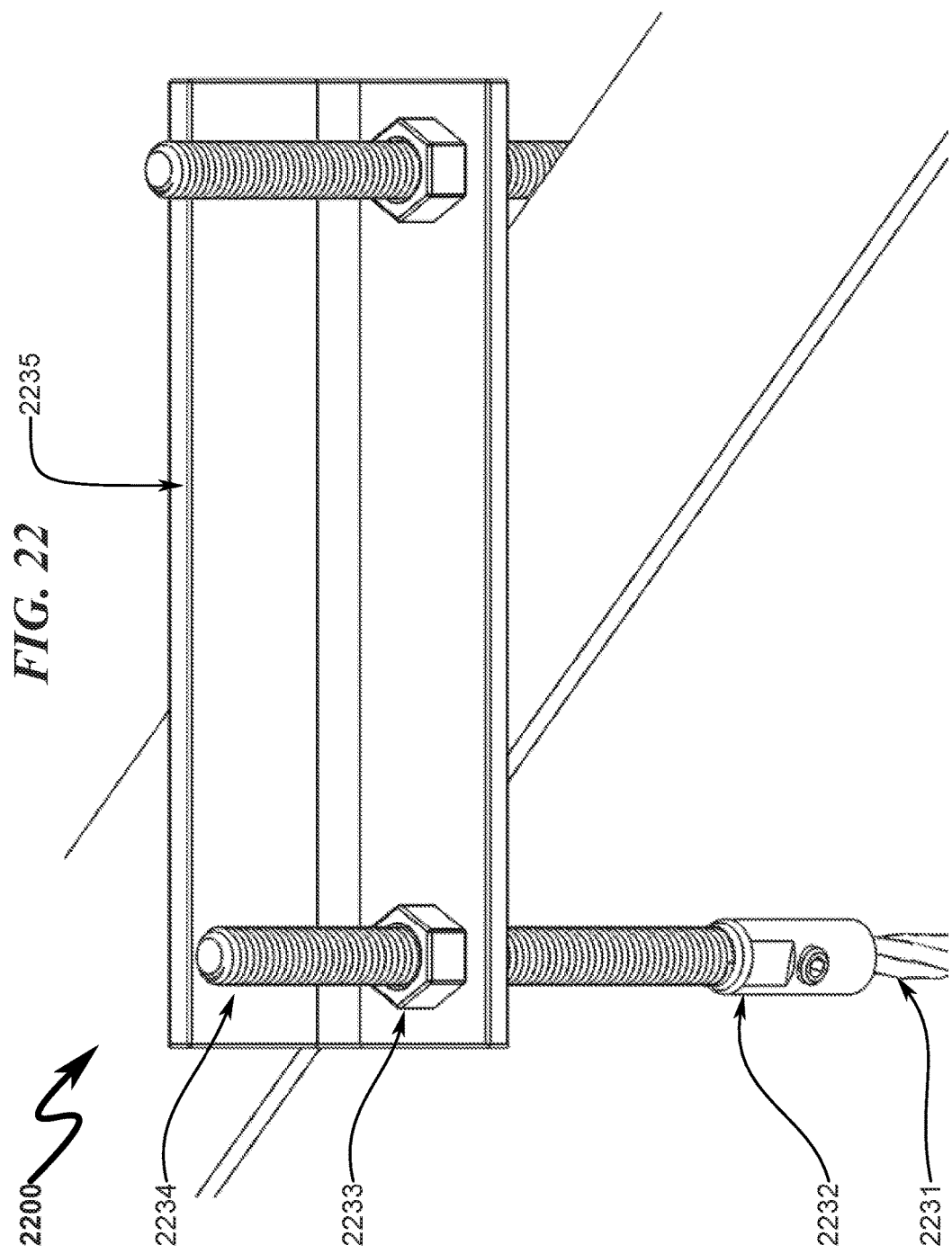
FIG. 22 illustrates a top right detail perspective view of a preferred invention embodiment utilizing a crimped stud cable and retention plate.

A preferred exemplary invention employing a crimped stud in conjunction with a retention plate is depicted in FIG. 21 (2100)-FIG. 24 (2400). In this preferred embodiment depicted in a typical application context in FIG. 21 (2100) and FIG. 22 (2200), the VIB (2110) and SSF (2120) are mated using a diagonal fastening cable (DFC) means. The diagonal fastening cable (DFC) means is implemented utilizing a cable (2131, 2231) incorporating crimped stud ends (2132, 2232) having a threaded fastening shaft (2133, 2233), fasteners (2134, 2234), and a retention plate (2135, 2235) typically constructed of angle iron. As depicted, this permits the cable means (2131, 2231) to eliminate the need for termination in addition to the threading means provided by the J-hooks in the embodiment illustrated in FIG. 17 (1700)-FIG. 20 (2000).

Figure 23:
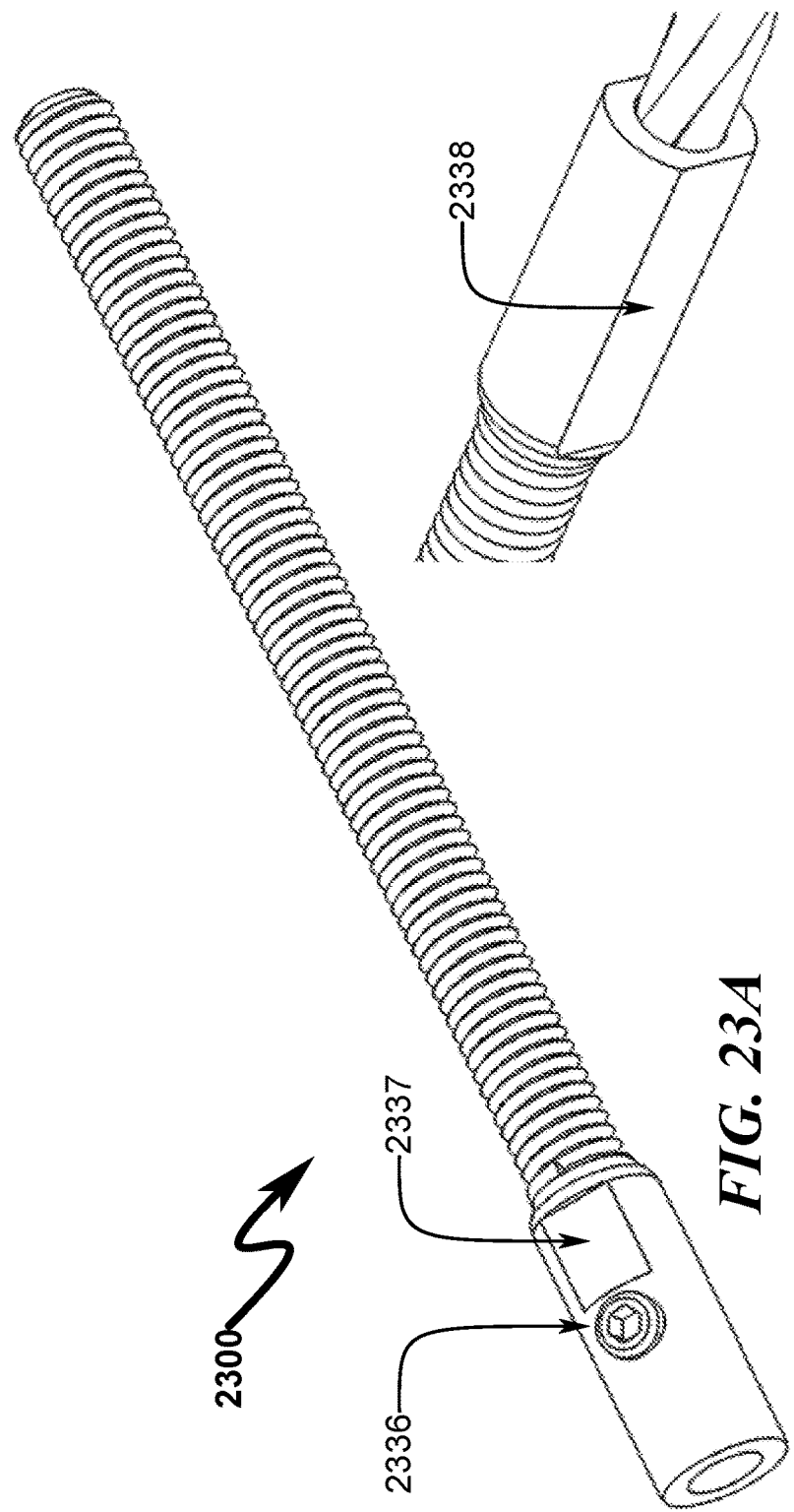
FIG. 23 illustrates a perspective view of a preferred invention crimped stud cable embodiment.

As depicted in FIG. 23 (2300) and FIG. 24 (2400), the crimped stud ends may incorporate a setscrew (2336) or other fastening means to affix the cable, and may incorporate a machined flat surface (2237) for a wrench or other tool to prevent twisting of the cable while the nut or other fastener is tightened on the threaded shaft. While illustrated as a setscrew in this example, the cable could be welded in place using a plug weld, or crimped within the hollow shaft using a hydraulic press or other metal forming apparatus. As depicted in FIG. 23 (2300), the wrench engagement surface may be created by hydraulically pressing the outer surface of the crimping stud to both form the wrench surface (2338) and retain the cable. The advantages to these embodiments include reduced cost as well as elimination of frayed cable ends that may result in operator injury when installing the system.

Exemplary Preformed Retention Plate Embodiment (2500)-(2800)

Figure 26:
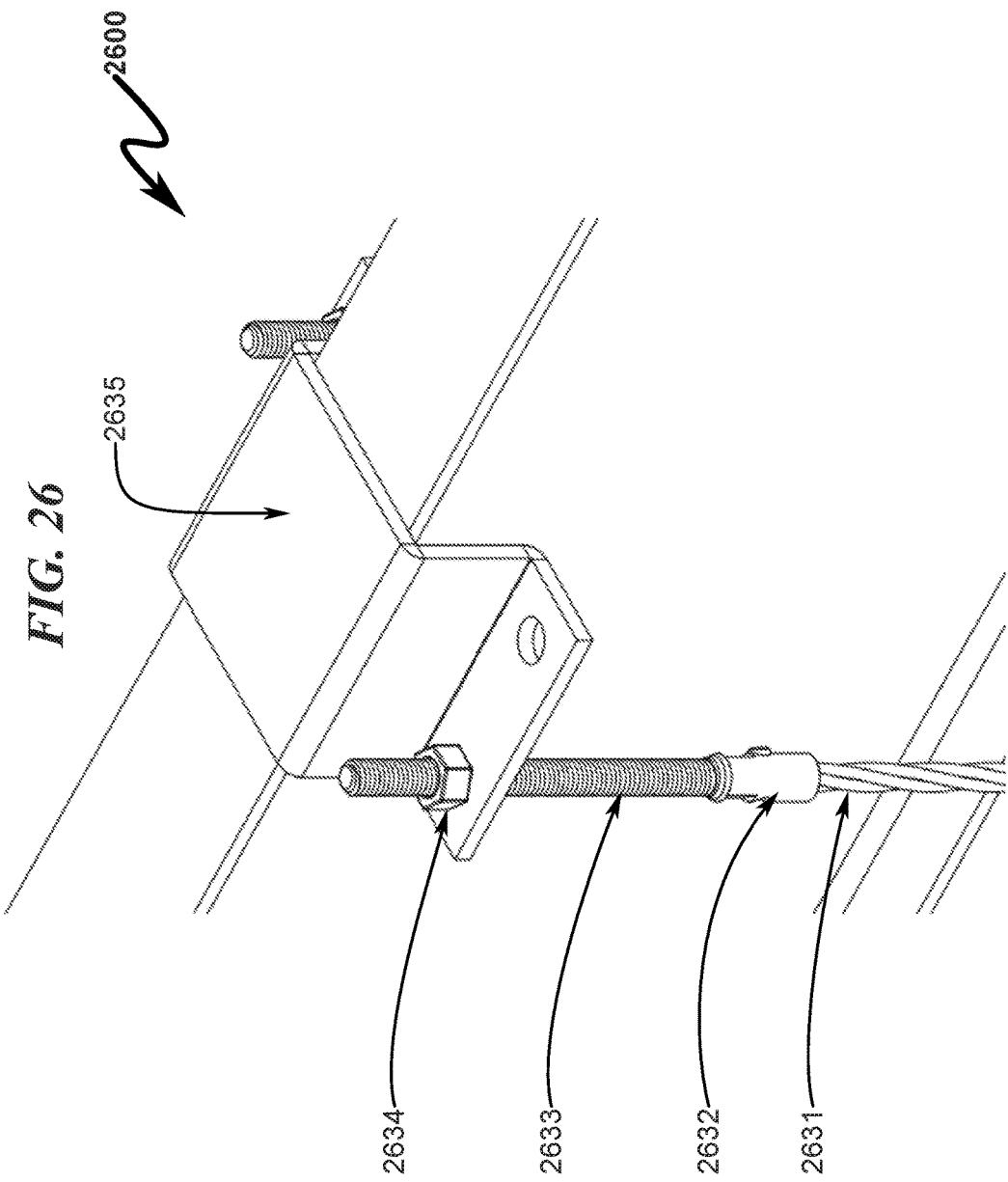
FIG. 26 illustrates a top detail perspective view of a preferred invention embodiment utilizing a crimped stud cable and preformed retention plate.
Figure 27:
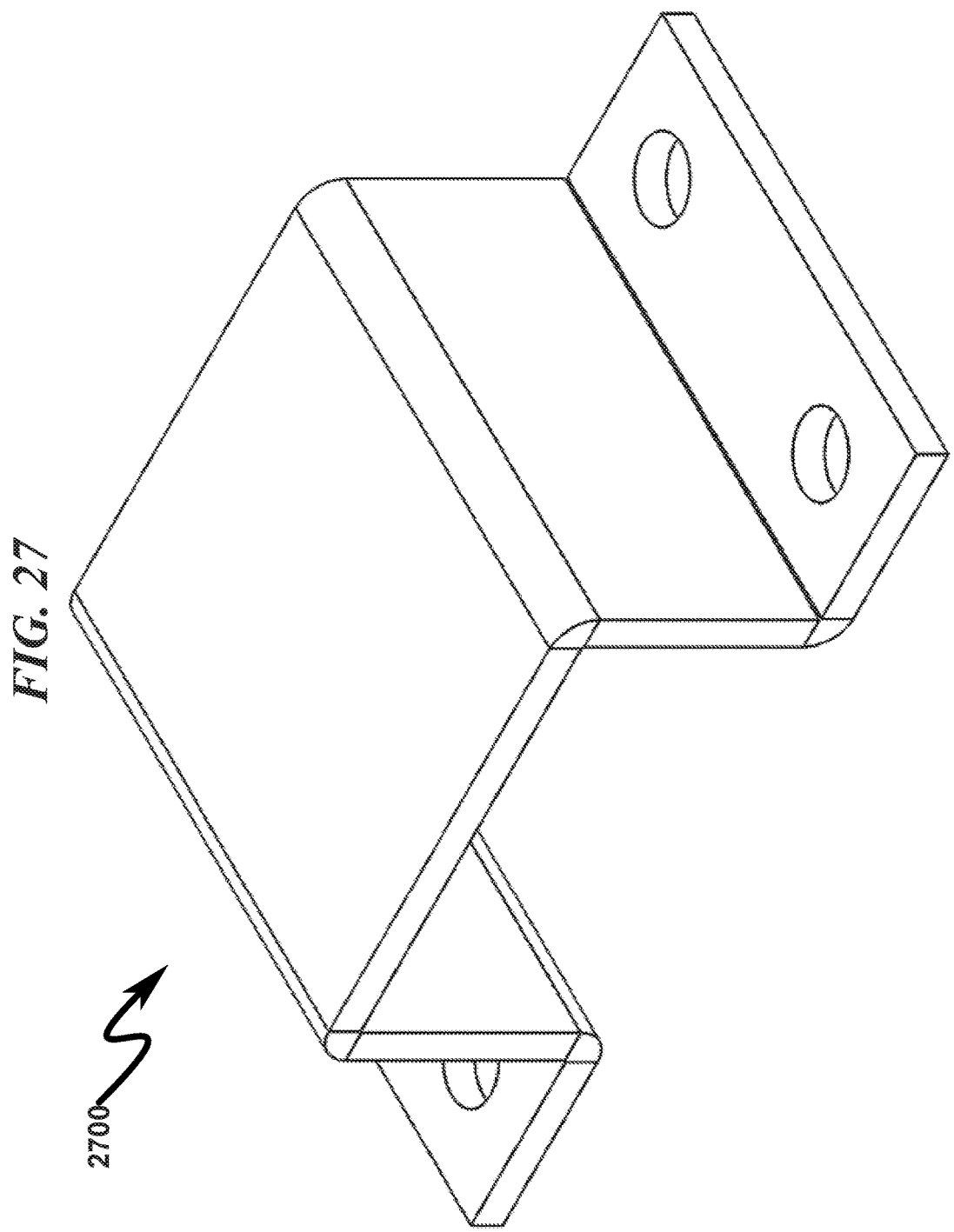
FIG. 27 illustrates a perspective view of a preferred invention embodiment utilizing a preformed retention plate.

A preferred exemplary invention employing a crimped stud in conjunction with a preformed retention plate is depicted in FIG. 25 (2500)-FIG. 28 (2800). In this preferred embodiment depicted in a typical application context in FIG. 25 (2500) and FIG. 26 (2600), the diagonal fastening cable (DFC) means is implemented utilizing a cable (2531, 2631) incorporating crimped stud ends (2532, 2632) having a threaded fastening shaft (2533, 2633), fasteners (2534, 2634), and a preformed retention plate (2535, 2635) that conforms to the flange width of the VIB. As depicted, this permits the cable means (2531, 2631) to eliminate the need for termination in addition to the threading means provided by the J-hooks in the embodiment illustrated in FIG. 17 (1700)-FIG. 20 (2000).

An advantage to this configuration is the fact that the preformed retention plate (2535, 2635) permits the use of two DFC means if desired, and also self-aligns to the inner flange of the VIB to aid in the installation process. This configuration also ensures that there is no "twist" in the retention plate (2535, 2635) after installation of the system, which might result in reduction of tension to the cabling means. Yet another advantage to this configuration is that the profile of the resulting fastening system may be assembled below the plane of the inner flange of the VIB (note that the threaded studs (2533, 2633) lie below the upper surface plane of the preformed retention plate (2535, 2625)) as depicted in FIG. 25 (2500) and FIG. 26 (2600). This feature can be an important safety issue in situations where workers or other individuals may come in contact with the inner wall surface of the sound abatement system. Additionally, this feature lessens the possibility of damaging a threaded stud via impacts with heavy machinery or the like.

Exemplary Preformed Retention Bar Embodiment (2900)-(3200)

Figure 30:
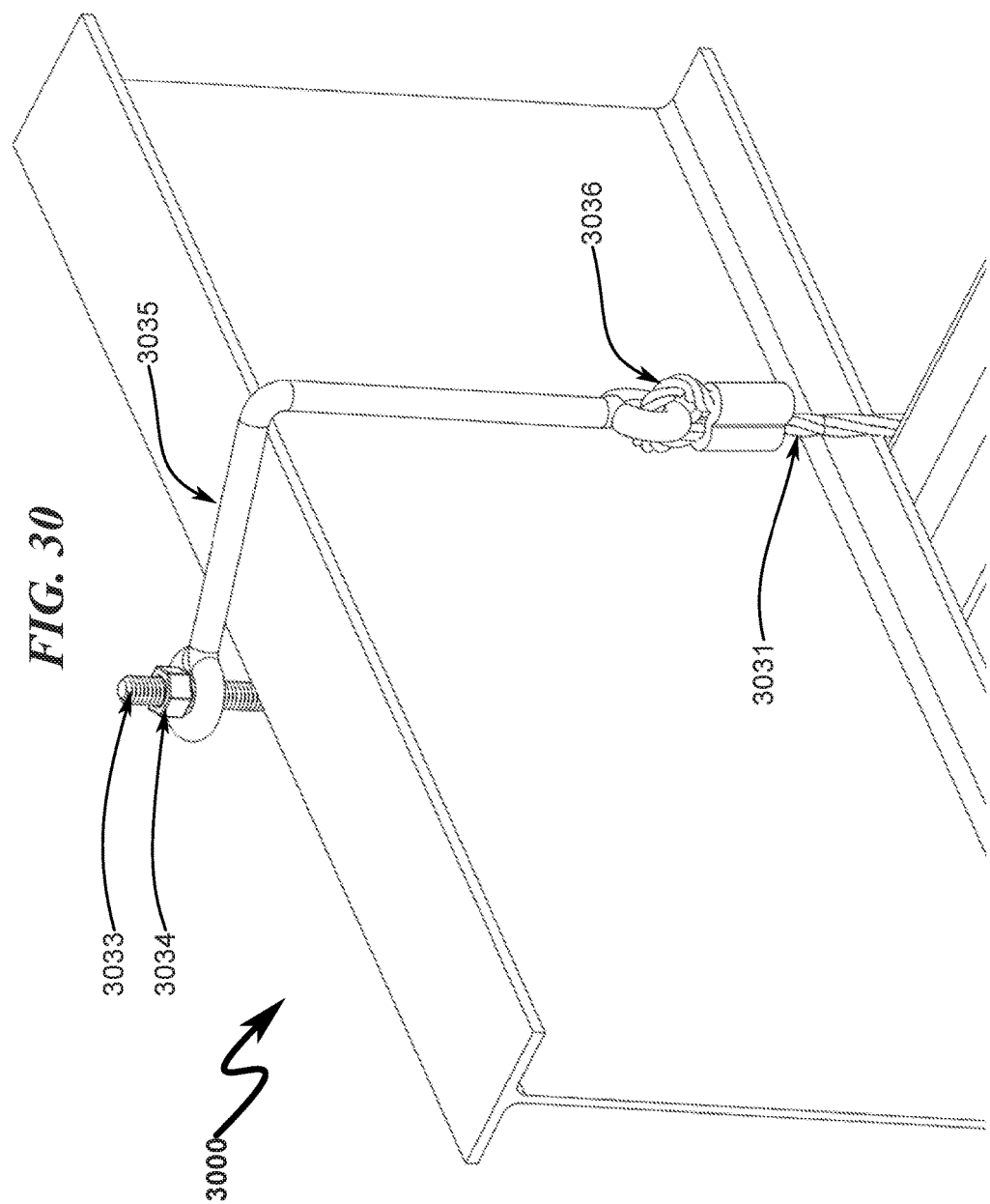
FIG. 30 illustrates a top right perspective view of a preferred invention embodiment utilizing a crimped stud cable and preformed retention bar.
Figure 31:
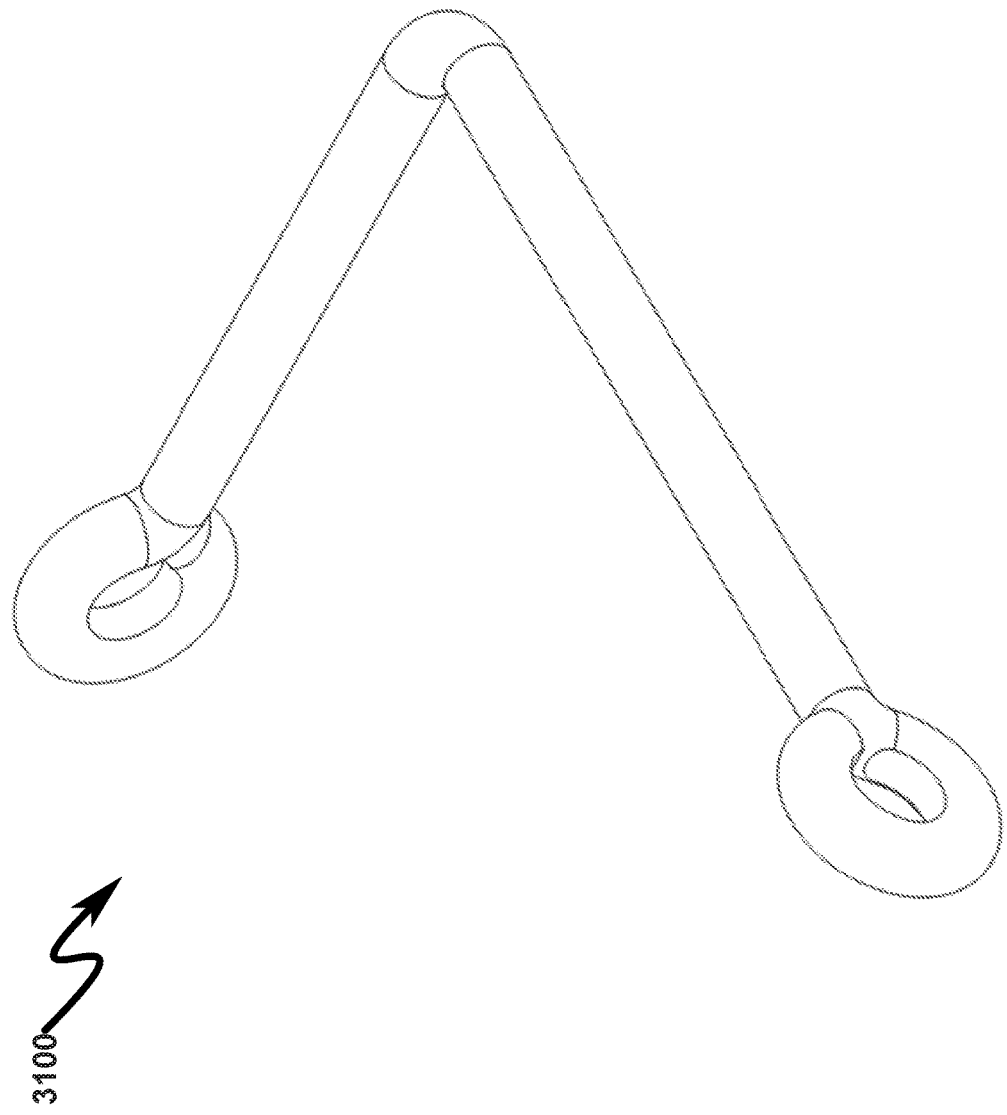
FIG. 31 illustrates a perspective view of a preferred invention embodiment preformed retention bar.

A preferred exemplary invention employing a crimped stud in conjunction with a preformed retention bar is depicted in FIG. 29 (2900)-FIG. 32 (3200). In this preferred embodiment depicted in a typical application context in FIG. 29 (2900) and FIG. 30 (3000), the diagonal fastening cable (DFC) means is implemented utilizing a cable (2931, 3031) incorporating crimped stud ends (2932) having a threaded fastening shaft (2933, 3033), fastener (2934, 3034), and a preformed retention bar (2935, 3035) that conforms to the flange width of the VIB. As depicted, this permits the cable means (2931, 3031) to eliminate the need for termination in addition to the threading means provided by the J-hooks in the embodiment illustrated in FIG. 17 (1700)-FIG. 20 (2000).

An advantage to this configuration is the fact that the preformed retention bar (2935, 3035) can be attached to one looped end (3036) of the cable means so that the entire system is one connected unit. This eases installation of the system in that the installer can place the preformed retention bar (2935, 3035) against the VIB flange and then wrap the cable (2931, 3031) around the VIB (2910)/SSF (2920) combination then insert the threaded fastening shaft (2933, 3033) into the eyelet of the preformed retention bar (2935, 3035) and then tighten the cable by engaging the fastener (2934, 3034). As the installation of the ASP/SSF panels can occur at significant heights, the ability to safely deploy the installation is a significant feature of this embodiment.

Exemplary Crimped Retention Bar Embodiment (3300)-(3600)

Figure 34:
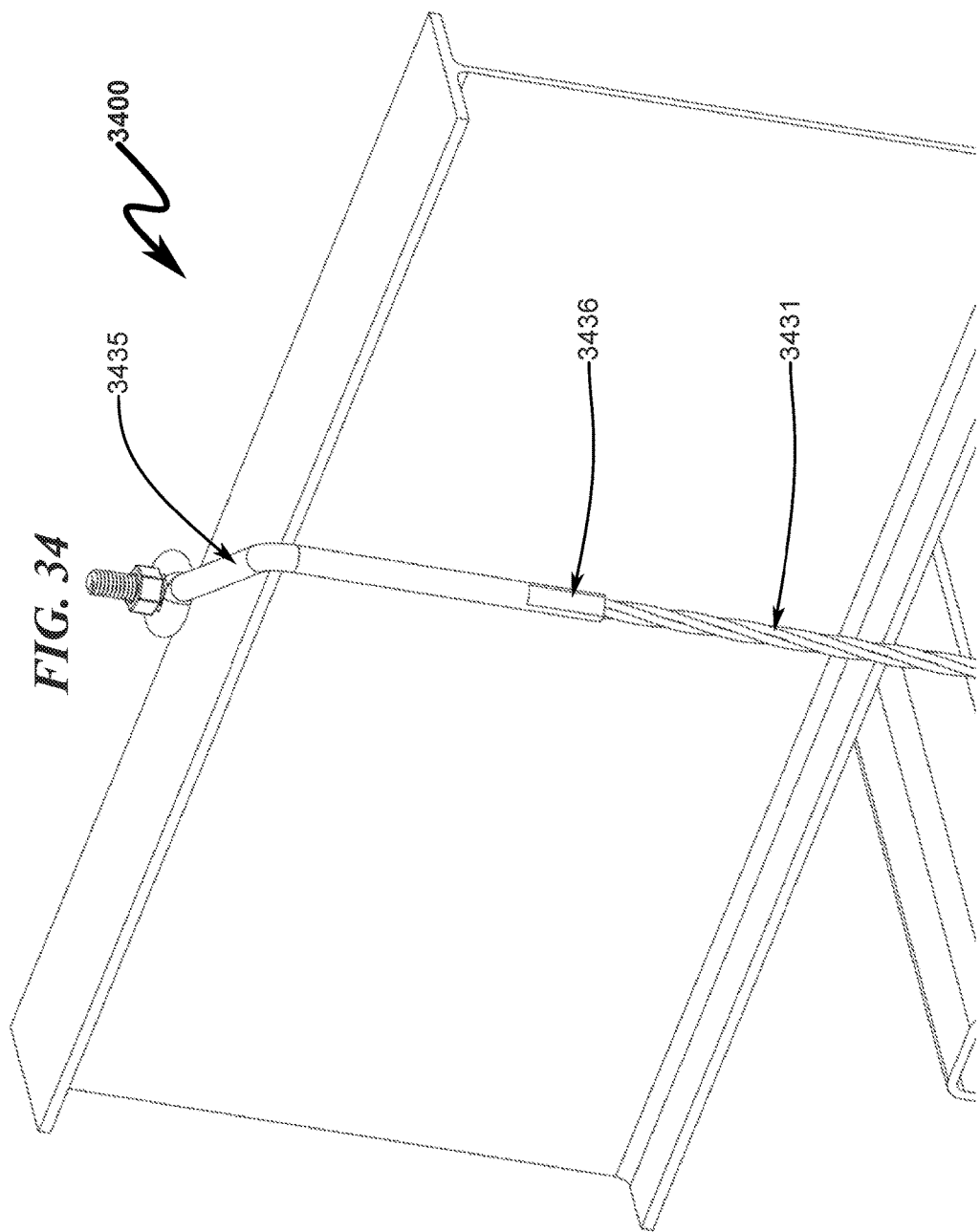
FIG. 34 illustrates a top left perspective view of a preferred invention embodiment utilizing a crimped stud cable and crimped stud retention bar.
Figure 35:
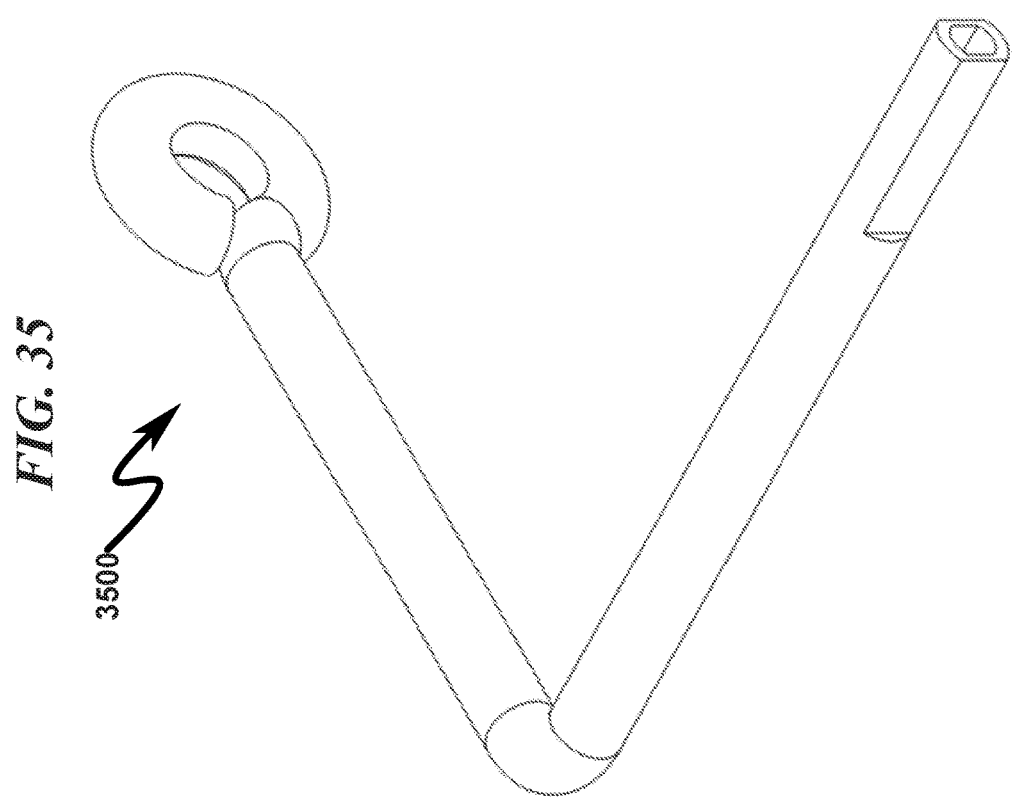
FIG. 35 illustrates a perspective view of a preferred invention embodiment crimped stud retention bar.

A preferred exemplary invention employing a crimped stud in conjunction with a preformed crimped stud retention bar is depicted in FIG. 33 (3300)-FIG. 36 (3600). In this preferred embodiment depicted in a typical application context in FIG. 33 (3300) and FIG. 34 (3400), the diagonal fastening cable (DFC) means is implemented utilizing a cable (3331, 3431) incorporating crimped stud end (3332) having a threaded fastening shaft (3333), fastener (3334), and a preformed retention bar (3335, 3435) that conforms to the flange width of the VIB. As depicted, this permits the cable means (3331, 3431) to eliminate the need for termination in addition to the threading means provided by the J-hooks in the embodiment illustrated in FIG. 17 (1700)-FIG. 20 (2000).

An advantage to this configuration is the fact that the preformed retention bar (3335, 3435) can be crimped (3436) to one end of the cable means (3331, 3431) so that the entire system is one connected unit. This eases installation of the system in that the installer can place the preformed retention bar (3335, 3435) against the VIB flange and then wrap the cable (3331, 3431) around the VIB (3310)/SSF (3320) combination then insert the threaded fastening shaft (3333) into the eyelet of the preformed retention bar (3335) and then tighten the cable by engaging the fastener (3334, 3434). As the installation of the ASP/SSF panels can occur at significant heights, the ability to safely deploy the installation is a significant feature of this embodiment.

Exemplary Ferrule Cable Termination (3700)-(4000)

FIG. 37 (3700)-FIG. 40 (4000) illustrate an exemplary looped cable configuration incorporating a ferrule cable termination methodology. This cable embodiment may be implemented in conjunction with threaded J-hook studs as previously described. The advantages to this approach include the ability to quickly generate custom cable lengths for various VIB/SSF configurations.

Exemplary Ferrule Double Cable Clip Termination (4100)-(4400)

FIG. 41 (4100)-FIG. 44 (4400) illustrate an exemplary looped double cable configuration incorporating an integrated double ferrule cable clip termination methodology. This cable embodiment may be implemented in conjunction with threaded J-hook studs as previously described. The advantages to this approach include the ability to quickly generate custom cable lengths for various VIB/SSF configurations and a doubling of the cable strength as compared to the approach depicted in FIG. 37 (3700)-FIG. 40 (4000).

Exemplary Cable Clamp Termination (4500)-(4800)

FIG. 45 (4500)-FIG. 48 (4800) illustrate an exemplary looped double cable configuration incorporating a cable clamp termination methodology. This cable embodiment may be implemented in conjunction with threaded J-hook studs as previously described. As discussed previously, this double cable design can provide additional cable strength when operating in high wind conditions.

Exemplary Swaged Cable Eyelet Termination (4900)-(5200)

FIG. 49 (4900)-FIG. 52 (5200) illustrate an exemplary looped cable configuration incorporating a swaged cable eyelet termination methodology. This cable embodiment may be implemented in conjunction with threaded J-hook studs as previously described. The advantages to this approach include ease of manufacturing and a more secure capturing of the cable to prevent disconnection of the eyelet structure and the cable during repeated high wind conditions.

Manufacturing of this embodiment is relatively straightforward and may be accomplished using a hydraulic press or other forming machinery. An advantage to this approach is that the swaged eyelet configuration is more resilient to wear than a conventional looped cable configuration, and in areas having consistently high wind conditions, results in higher overall system reliability and resiliency to wear under these circumstances.

Exemplary VSM Pipe Attachment (5300)-(5600)

Figure 54:
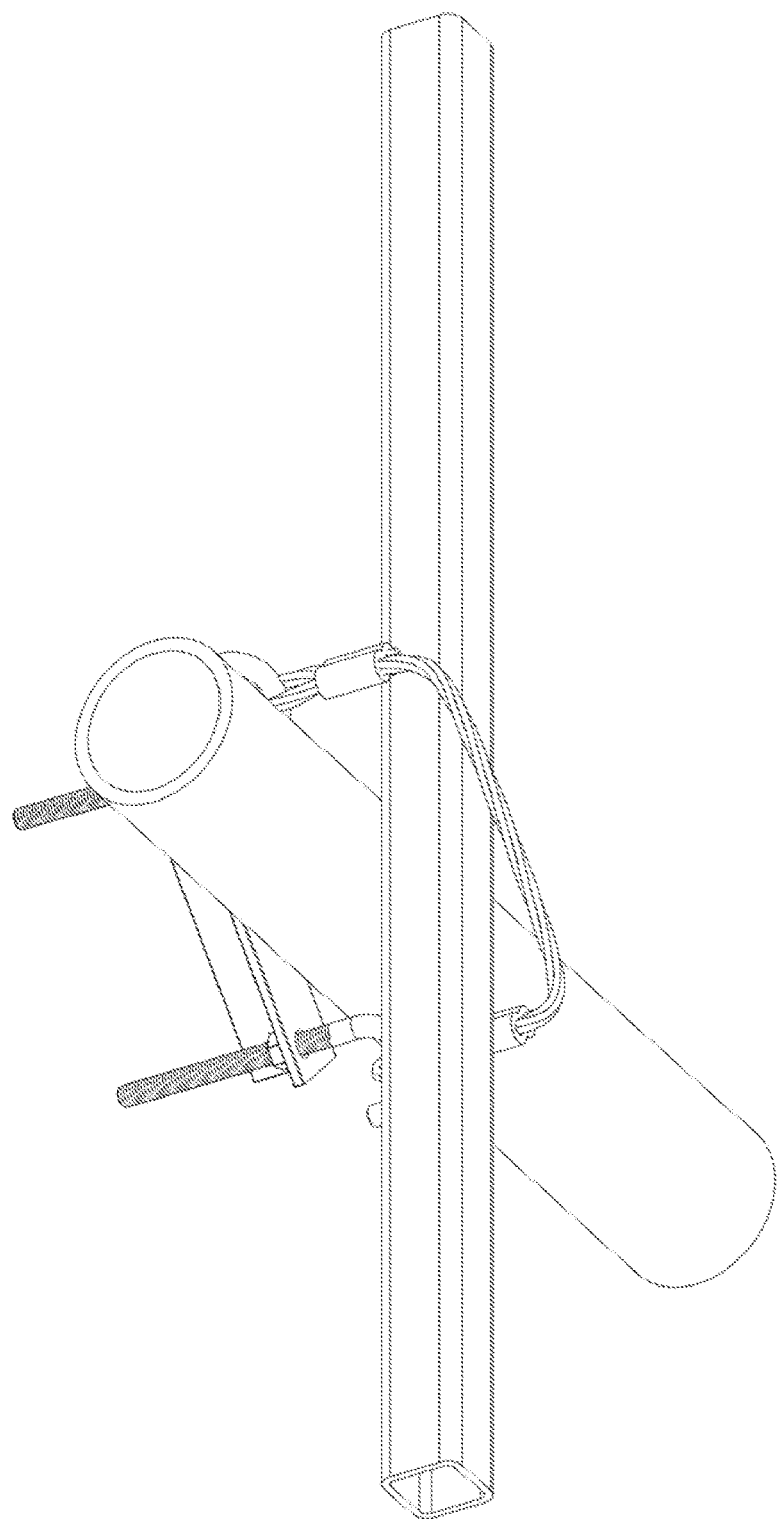
FIG. 54 illustrates a bottom perspective view of a preferred exemplary invention embodiment employing angle iron, J-hooks, and looped-end cable to secure a VSM pipe and SSF.
Figure 55:
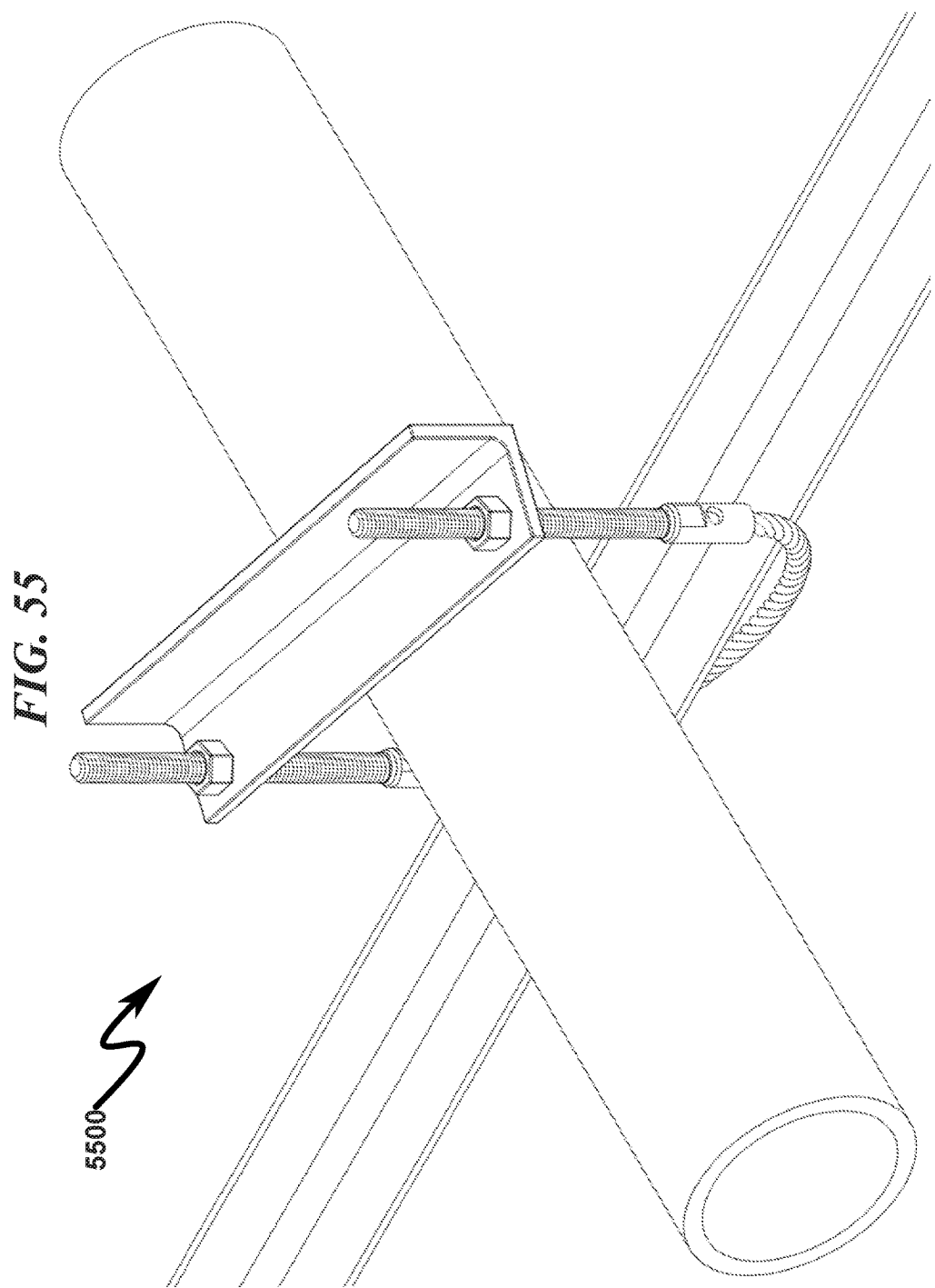
FIG. 55 illustrates a top perspective view of a preferred exemplary invention embodiment employing angle iron and crimped-stud cable to secure a VSM pipe and SSF.

As generally illustrated in FIG. 53 (5300)-FIG. 56 (5600), the present invention anticipates that pipe or other materials may be used as the VSM material. In FIG. 53 (5300)-FIG. 54 (5400), an exemplary invention embodiment is illustrated using angle iron as a binding retention plate in conjunction with J-hooks and cable having looped ends. Note in this example, the crimped-stud cable ends have yet to be fully tightened to conform the cable to the outer surface of the SSF. FIG. 55 (5500)-FIG. 56 (5600) illustrate an exemplary system embodiment employing crimped stud ends as the attachment mechanism to the angle iron BRP.

As mentioned previously, the ability for the cable ends to be independently tensioned is important to ensure that the overall frictional mate between the VSM and SSF remains sufficient to ensure stability of the acoustic suppression panels in high wind conditions. This capability prevents mate loosening that typically occurs when using bolted frame members as taught by the prior art.

Exemplary VSM Pipe Retention Bar Attachment (5700)-(5800)

Figure 57:
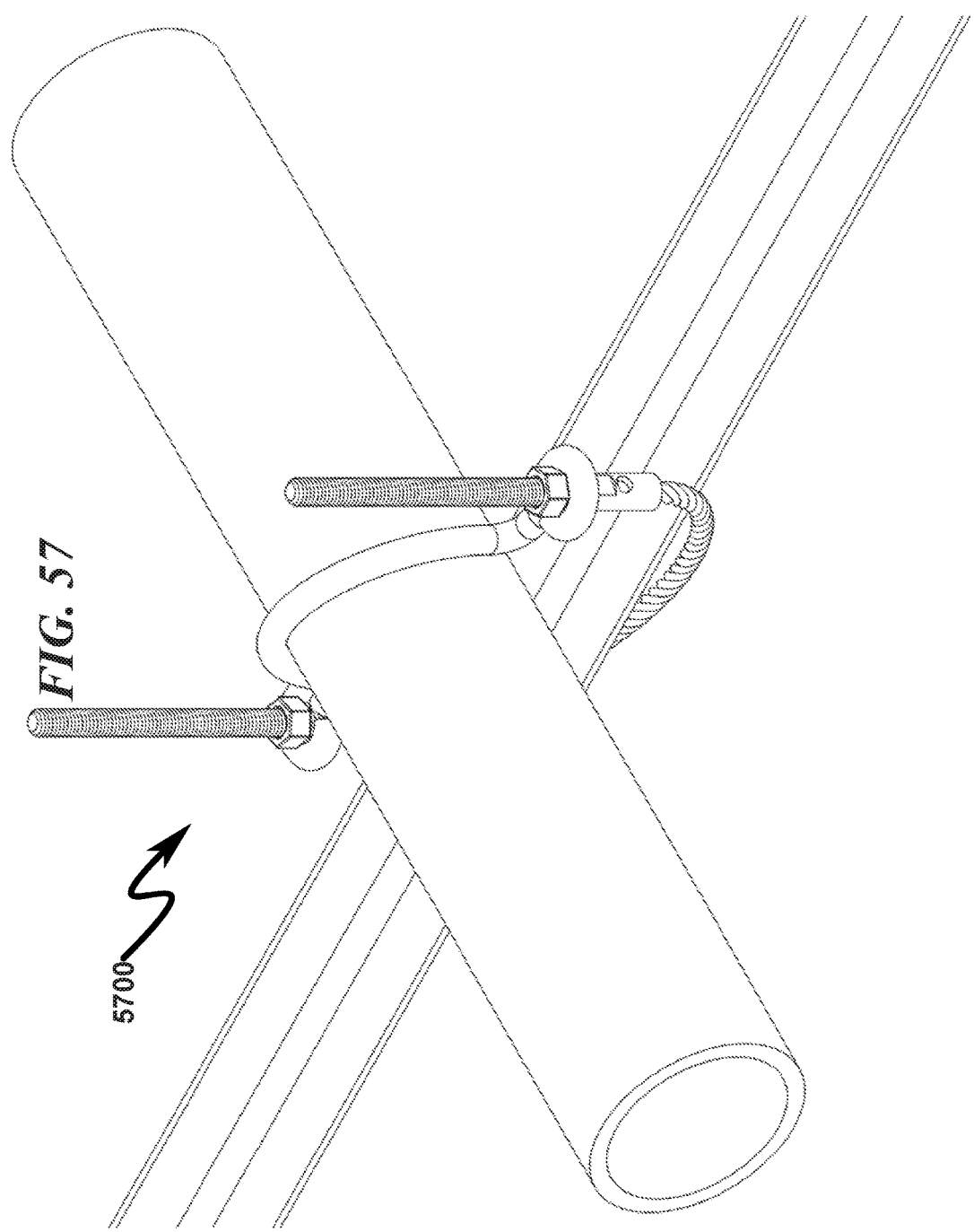
FIG. 57 illustrates a top perspective view of a preferred exemplary invention embodiment employing a preformed retention bar used to secure a VSM pipe and SSF.
Figure 58:
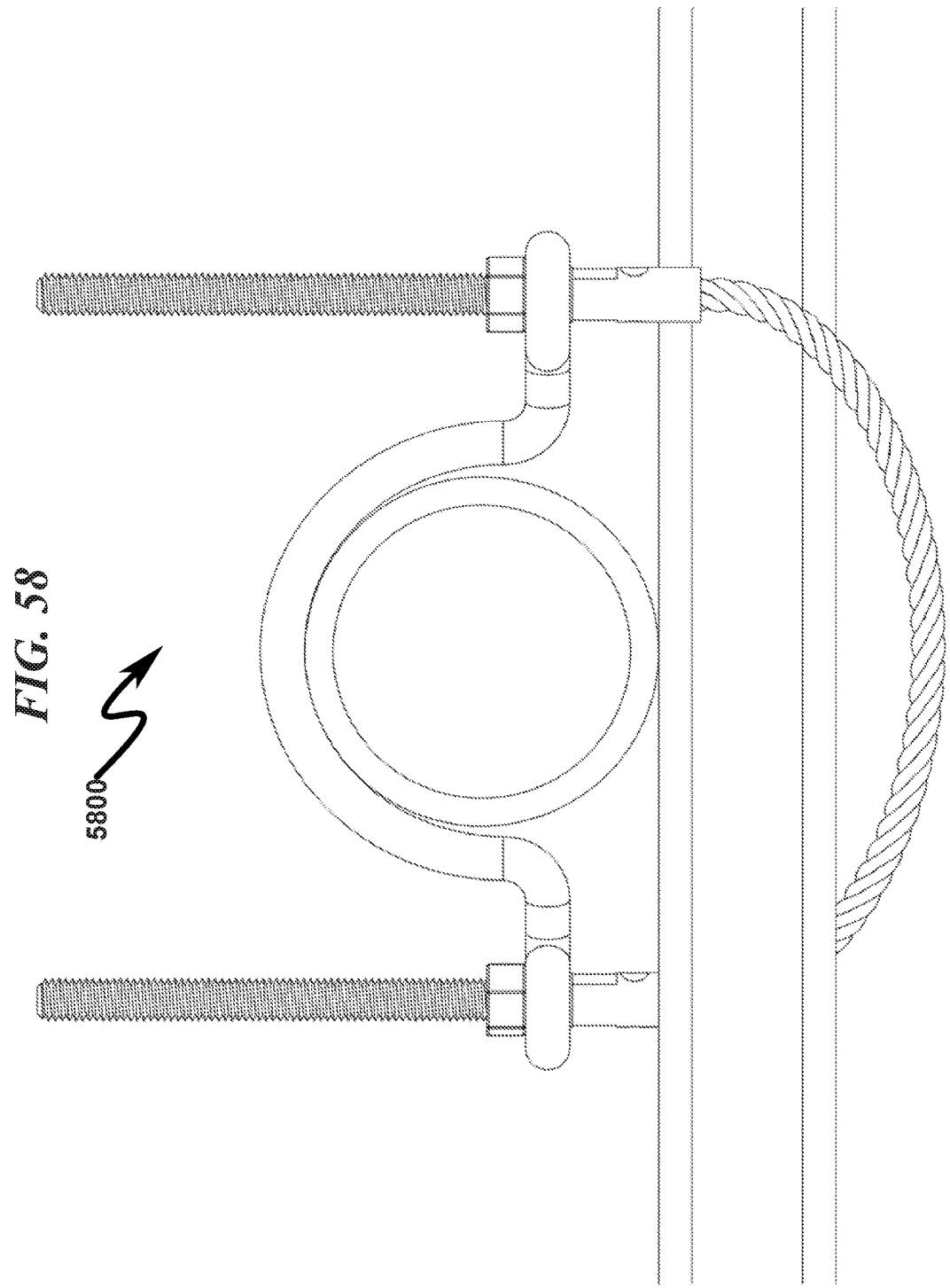
FIG. 58 illustrates a side view of a preferred exemplary invention embodiment employing a preformed retention bar used to secure a VSM pipe and SSF.

As generally illustrated in FIG. 57 (5700)-FIG. 58 (5800), the present invention anticipates that pipe or other materials may be used as the VSM material. In FIG. 57 (5700)-FIG. 58 (5800), an exemplary invention embodiment is illustrated using a preformed retention bar and stud-terminated cable to secure a pipe VSM to the SSF. As previously illustrated, the stud-terminated cable may be replaced with J-hooks and a cable having looped ends in other invention embodiments. This particular embodiment provides secure mating between the VSM and the SSF while permitting independent tensioning of each cable end as attached to the preformed retention bar.

Exemplary Cable Looping (5900)-(6400)

Figure 59:
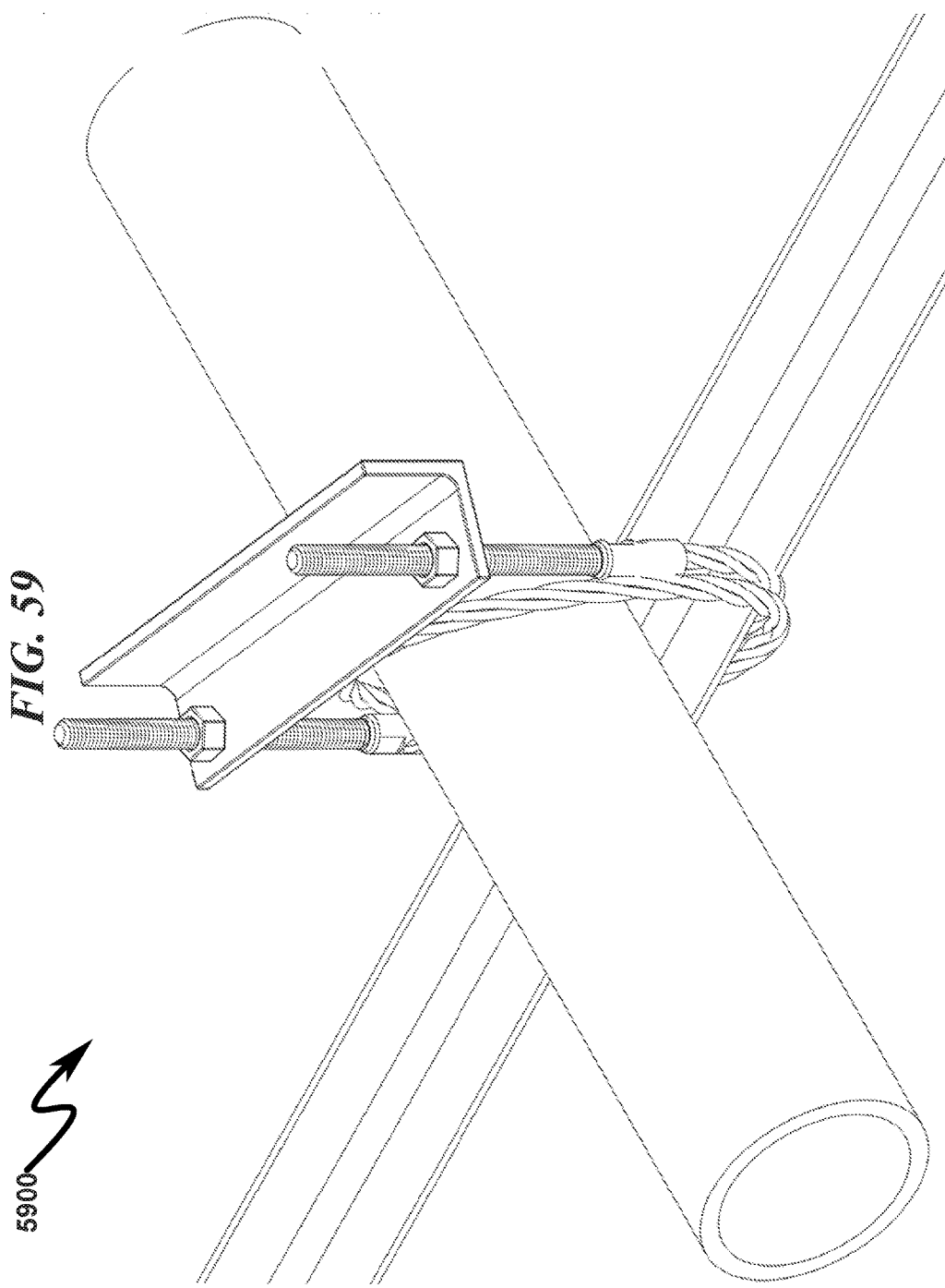
FIG. 59 illustrates a perspective view of a preferred exemplary multi-loop cabling configuration as applied to the present invention.

As generally illustrated in FIG. 59 (5900)-FIG. 64 (6400), the present invention anticipates a variety of multi-looped cable configurations in which the cabling means is looped a number of times around the VIB and/or SSF. As illustrated in these drawings, the cable paths are provided as exemplary and illustrated prior to cable tensioning. These options permit both additional cabling strength to be part of the design, but also anticipate situations in which a single cabling means is stocked and adapted to a variety of VIB/SSF perimeter lengths by wrapping the cable around the VIB/SSF combination a multiple number of times as needed to account for the overall thickness variations of these intersecting members.

Figure 60:
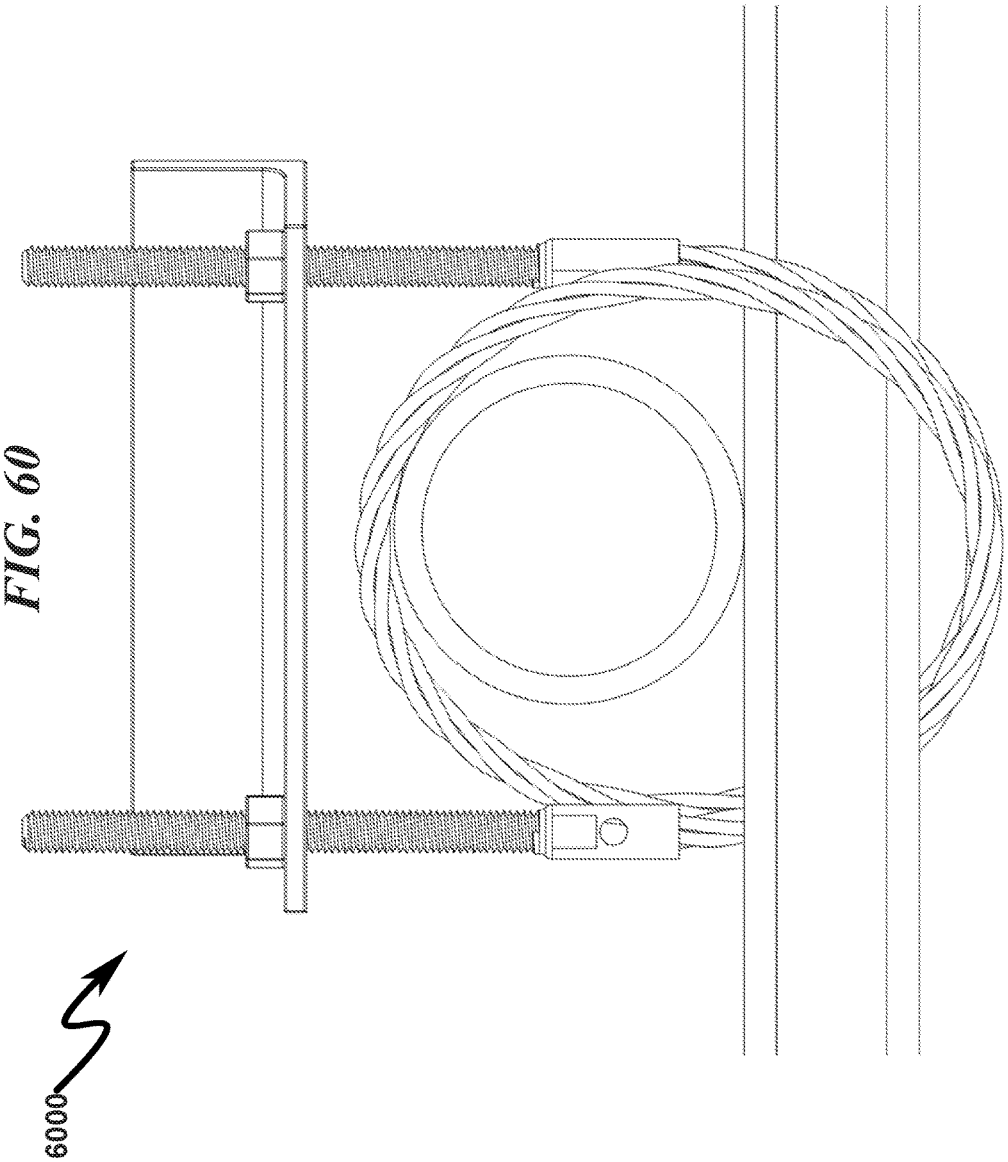
FIG. 60 illustrates a side view of a preferred exemplary multi-loop cabling configuration as applied to the present invention.
Figure 61:
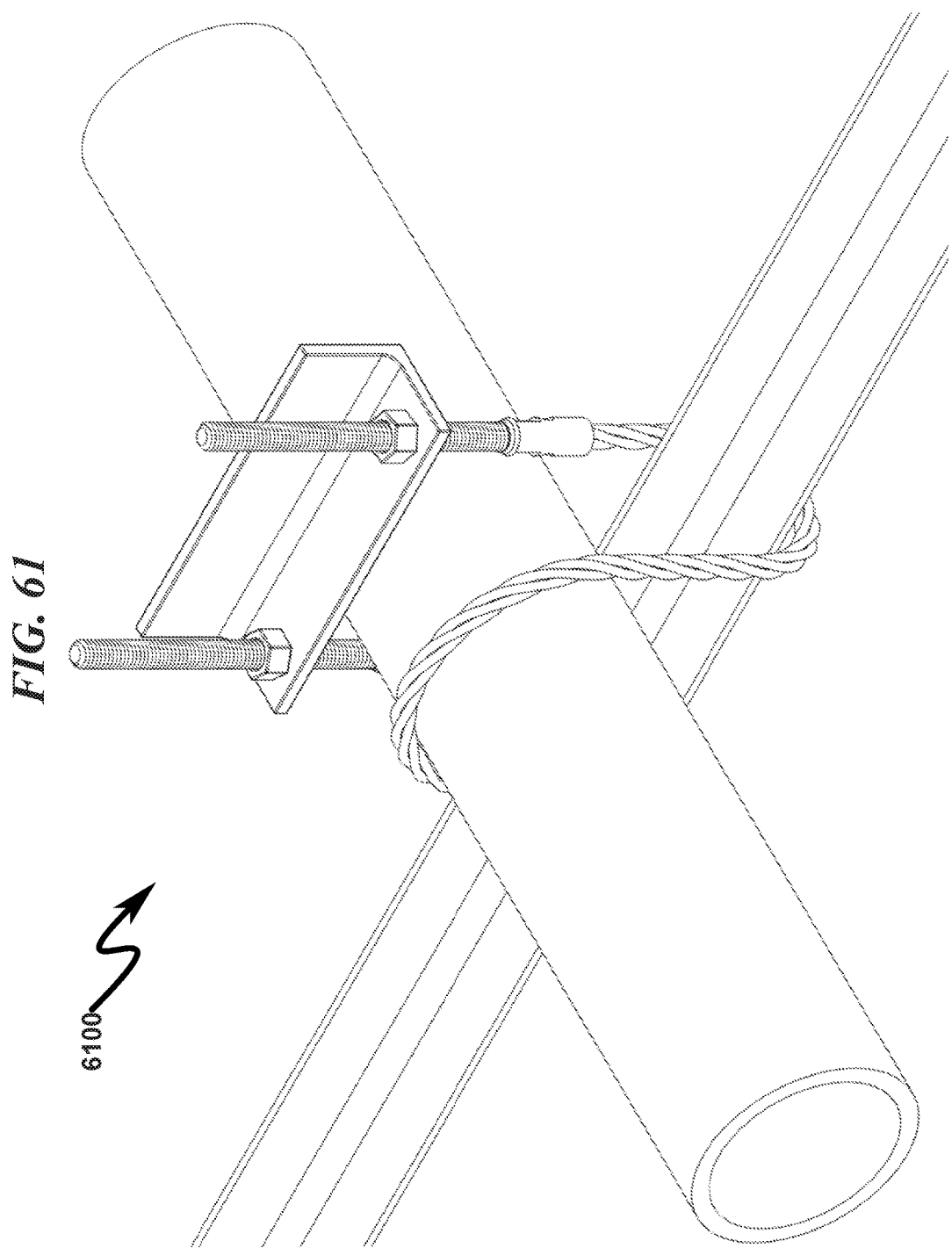
FIG. 61 illustrates a perspective view of a preferred exemplary multi-loop cross-over cabling configuration as applied to the present invention.
Figure 63:
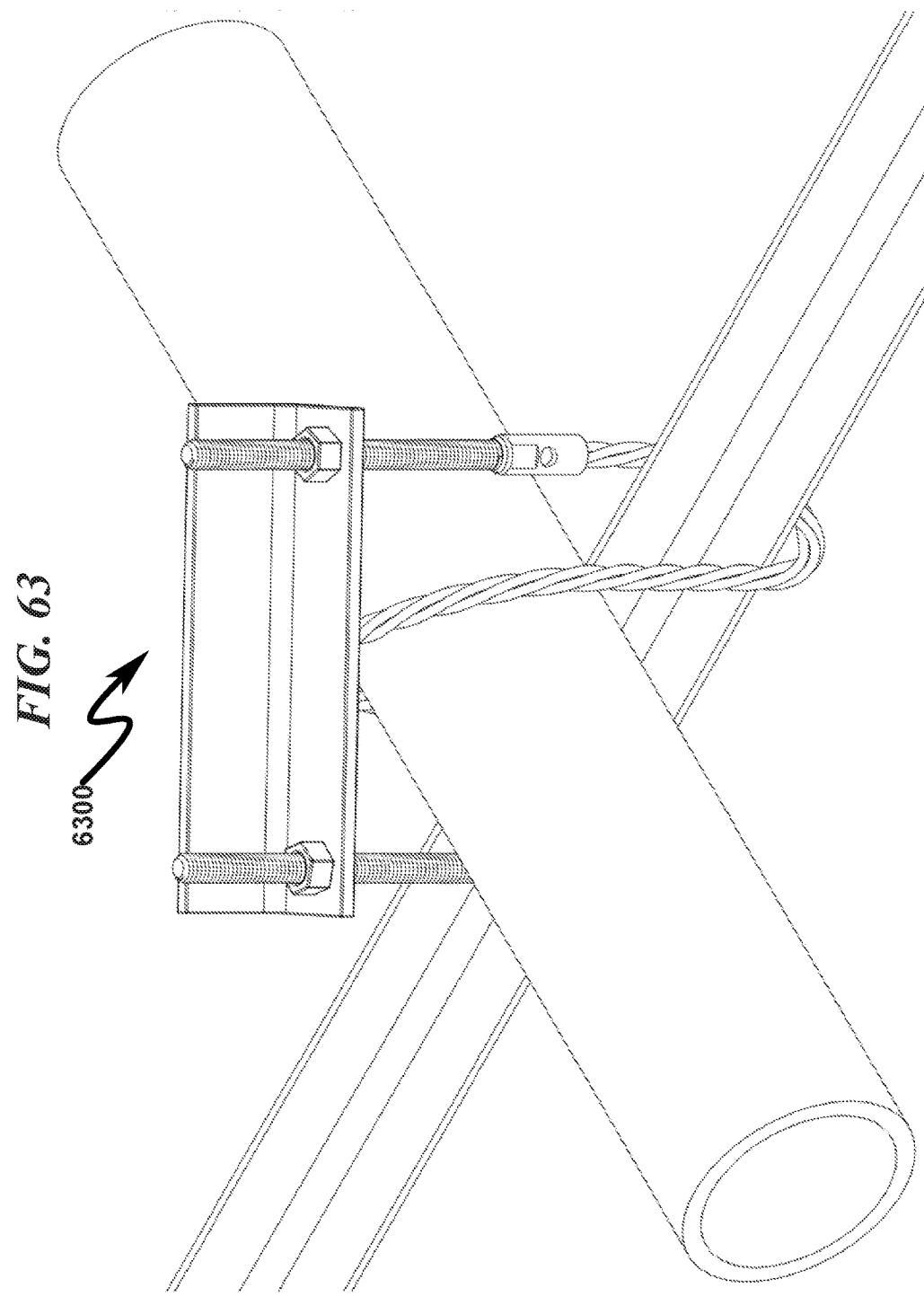
FIG. 63 illustrates a perspective view of a preferred exemplary multi-loop cross-point cabling configuration as applied to the present invention.

Within this context of cable looping, the cable may wrap around the VSM/VIB and SSF as generally illustrated in FIG. 59 (5900)-FIG. 60 (6000), or just the SSF (not illustrated but a variant of these illustrations). Additionally, as illustrated in FIG. 61 (6100)-FIG. 62 (6200), the looped cable may cross-over loop the intersection of the VSM/VIB and the SSF, or as illustrated in FIG. 63 (6300)-FIG. 64 (6400), the looped cable may cross-point loop the intersection of the VSM/VIB and the SSF. Within these variations there are also anticipated situations where the cable may loop around the SSF multiple times, or alternatively loop around each of the diagonals of the VSM/VIB and SSF crosspoint intersection.

VSM/VIB System Advantages

It should be noted that the various embodiments of the present invention depicted herein that use steel cable or the like to affix the SSF to the VIB have an advantage over conventional fastening means because the use of J-hooks or similar structures as depicted herein permit the looped cable to be tensioned independently in situations where the SSF is wrapped by the cable, or in situations where the SSF and cable bind by friction. Thus, the J-hook and equivalent configurations permit each leg of the cable to be independently tensioned so that the overall frictional mating between the VIB and SSF is maintained. This advantage is also present in situations where the VIB is a more general vertical support member (VSM) such as a pipe or other cylindrical object that is wrapped by the cable and then frictionally mated to the SSF.

System Summary

The present invention system anticipates a wide variety of variations in the basic theme of construction, but can be generalized as a sound abatement system comprising:
(a) a plurality of vertical support members (VSMs);
(b) a plurality of acoustic suppression panels (ASPS); and
(c) a plurality of diagonal fastening cables (DFCs);
wherein
the VSMs are positioned vertically in the ground surrounding the perimeter of an area to be provided sound suppression;
the ASPS further comprise a structural support frame (SSF) comprising a welded array of tubular metal;
the SSF is covered with an acoustic suppression fabric (ASF);
the DFC comprises:
  (1) a cable strap having first and second looped ends;
  (2) first and second J-hooks each having a hooked end and a threaded end;
  (3) first and second fasteners; and
  (4) binding retention plate (BRP) having first and second retention holes;
the DFC is configured to affix the ASP to the VSM by looping the cable strap around the SSF and the VSM to force a frictional contact surface between the SSF and the VSM;
the DFC is configured to engage the first J-hook hooked end with the first cable looped end;
the DFC is configured to engage the second J-hook hooked end with the second cable looped end;
the DFC is configured to retain the first J-hook threaded end in the first retention hole of the BRP using the first fastener;
the DFC is configured to retain the second J-hook threaded end in the second retention hole of the BRP using the second fastener; and
the BRP is configured to make frictional contact with the VSM.

This general system summary may be augmented by the various elements described herein to produce a wide variety of invention embodiments consistent with this overall design description.

Method Summary

The present invention method anticipates a wide variety of variations in the basic theme of implementation, but can be generalized as a sound abatement method wherein the method comprised is performed on a sound abatement system comprising:
(a) a plurality of vertical support members (VSMs);
(b) a plurality of acoustic suppression panels (ASPS); and
(c) a plurality of diagonal fastening cables (DFCs);
wherein
the VSMs are positioned vertically in the ground surrounding the perimeter of an area to be provided sound suppression;
the ASPS further comprise a structural support frame (SSF) comprising a welded array of tubular metal;
the SSF is covered with an acoustic suppression fabric (ASF);
the DFC comprises:
  (1) a cable strap having first and second looped ends;
  (2) first and second J-hooks each having a hooked end and a threaded end;
  (3) first and second fasteners; and
  (4) binding retention plate (BRP) having first and second retention holes;
the DFC is configured to affix the ASP to the VSM by looping the cable strap around the SSF and the VSM to force a frictional contact surface between the SSF and the VSM;
the DFC is configured to engage the first J-hook hooked end with the first cable looped end;
the DFC is configured to engage the second J-hook hooked end with the second cable looped end;
the DFC is configured to retain the first J-hook threaded end in the first retention hole of the BRP using the first fastener;
the DFC is configured to retain the second J-hook threaded end in the second retention hole of the BRP using the second fastener; and
the BRP is configured to make frictional contact with the VSM;
wherein the method comprises the steps of:
(1) driving the VSMs vertically into the ground surrounding the perimeter of a predefined area to be provided sound suppression;
(2) preassembling the ASPs to attach the ASF to the outer planar surface of the SSF;
(3) arraying the ASPs against the VSMs by repeated application of steps (4)-(8);
(4) locating the ASP coincident with the VSM and any previously installed ASPs;
(5) positioning the inner planar surfaces of the SSFs comprising the ASPs against the VSMs;
(6) affixing the SSFs to the VSMs using the DFCs at each point in which the tubular metal contacts the VSMs;
(7) at points where the outer frame edges of the SSF intersect, wrapping the cable strap around both SSF outer frame edges and the VSM to affix both SSF frames to the VSM; and
(8) proceeding to step (3) until the perimeter is enclosed by the ASP to a predetermined height.

This general method summary may be augmented by the various elements described herein to produce a wide variety of invention embodiments consistent with this overall design description.

Alternative System Summary

An alternative present invention system anticipates a wide variety of variations in the basic theme of construction, but can be generalized as a sound abatement system comprising:

(a) a plurality of vertical support members (VSMs);
(b) a plurality of acoustic suppression panels (ASPS); and
(c) a plurality of diagonal fastening cables (DFCs);
wherein
the VSMs are positioned vertically in the ground surrounding the perimeter of an area to be provided sound suppression;
the ASPS further comprise a structural support frame (SSF) comprising a welded array of tubular metal;
the SSF is covered with an acoustic suppression fabric (ASF);
the DFC comprises:
 (1) cable strap comprising steel cable having a first end mechanically coupled to a first threaded rod and a second end mechanically coupled to a second threaded rod;
 (2) first and second fasteners; and
 (3) binding retention plate (BRP) having first and second retention holes;
the DFC is configured to affix the ASP to the VSM by looping the cable strap around the SSF and the VSM to force a frictional contact surface between the SSF and the VSM;
the DFC is configured to retain the first cable strap threaded rod in the first retention hole of the BRP using the first fastener;
the DFC is configured to retain the second cable strap threaded rod in the second retention hole of the BRP using the second fastener; and
the BRP is configured to make frictional contact with the VSM.

This general system summary may be augmented by the various elements described herein to produce a wide variety of invention embodiments consistent with this overall design description.

Alternative Method Summary

An alternative present invention method anticipates a wide variety of variations in the basic theme of implementation, but can be generalized as a sound abatement method wherein the method comprised is performed on a sound abatement system comprising:
(a) a plurality of vertical support members (VSMs);
(b) a plurality of acoustic suppression panels (ASPS); and
(c) a plurality of diagonal fastening cables (DFCs);
wherein
the VSMs are positioned vertically in the ground surrounding the perimeter of an area to be provided sound suppression;
the ASPS further comprise a structural support frame (SSF) comprising a welded array of tubular metal;
the SSF is covered with an acoustic suppression fabric (ASF);
the DFC comprises:
 (1) cable strap comprising steel cable having a first end mechanically coupled to a first threaded rod and a second end mechanically coupled to a second threaded rod;
 (2) first and second fasteners; and
 (3) binding retention plate (BRP) having first and second retention holes;
the DFC is configured to affix the ASP to the VSM by looping the cable strap around the SSF and the VSM to force a frictional contact surface between the SSF and the VSM;
the DFC is configured to retain the first cable strap threaded rod in the first retention hole of the BRP using the first fastener;
the DFC is configured to retain the second cable strap threaded rod in the second retention hole of the BRP using the second fastener; and
the BRP is configured to make frictional contact with the VSM;
wherein the method comprises the steps of:
 (1) driving the VSMs vertically into the ground surrounding the perimeter of a predefined area to be provided sound suppression;
 (2) preassembling the ASPs to attach the ASF to the outer planar surface of the SSF;
 (3) arraying the ASPs against the VSMs by repeated application of steps (4)-(8);
 (4) locating the ASP coincident with the VSM and any previously installed ASPs;
 (5) positioning the inner planar surfaces of the SSFs comprising the ASPs against the VSMs;
 (6) affixing the SSFs to the VSMs using the DFCs at each point in which the tubular metal contacts the VSMs;
 (7) at points where the outer frame edges of the SSF intersect, wrapping the cable strap around both SSF outer frame edges and the VSM to affix both SSF frames to the VSM; and
 (8) proceeding to step (3) until the perimeter is enclosed by the ASP to a predetermined height.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the VSMs comprise material selected from a group consisting of: I-beams (VIBs); I-beams (VIBs) having a flange-to-flange web dimension of 12 inches; steel pipe; and steel pipe having a diameter of 3.5 inches.
 An embodiment wherein the SSF comprises construction parameters selected from a group consisting of: square tubular steel having outer frame dimensions of 8 feet by 20 feet and inner frame dimensions of 4 feet by 10 feet; 2-inch square tubular steel having outer frame dimensions of 8 feet by 20 feet and inner frame dimensions of 4 feet by 10 feet; and 2-inch square tubular steel having outer frame dimensions of 10 feet by 20 feet and inner frame dimensions of 5 feet by 10 feet.
 An embodiment wherein the ASF comprises material selected from a group consisting of: cementitious wood fiber; and TECTUM brand cementitious wood fiber.
 An embodiment wherein the BRP comprises material selected from a group consisting of: angle iron; square tubing; flat bar stock; preformed retention plate; preformed retention bar; and crimped retention bar.
 An embodiment wherein the cable strap is looped multiple times around the SSF and the VSM to affect fixation of the ASP to the VSM.

An embodiment wherein the first cable strap looped end and the second cable strap looped end further comprise a cable termination selected from a group consisting of: cable ferrule clip; double cable ferrule clip; cable clamp; and swaged cable eyelet.

One skilled in the art will recognize that other embodiments are possible based on combinations of elements taught within the above invention description.

CONCLUSION

A sound abatement system and method providing for rapid assembly of stacked acoustic suppression walls has been disclosed. The system incorporates vertical support members (VSM) and/or vertical I-beams (VIB) driven into the ground that support an acoustic suppression panel (ACP) array by virtue of diagonal fastening cables (DFC). The DFC in one preferred embodiment utilizes a combination of threaded J-hooks, cable loops, and angle iron to fix the ACP to the VSM/VIB by frictional contact. This system permits rapid installation of the ACPs once the VSM/VIBs are vertically positioned around the perimeter of a job site, and allow the installation of sound containment walls that are capable of withstanding severe wind and weather conditions as are commonly encountered in the oil and gas drilling industry.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A sound abatement system comprising:
   (a) a plurality of vertical support members (VSMs);
   (b) a plurality of acoustic suppression panels (ASPs); and
   (c) a plurality of diagonal fastening cables (DFCs);
   wherein:
   said VSMs are positioned vertically in the ground surrounding the perimeter of an area to be provided sound suppression;
   said ASPs further comprise a structural support frame (SSF) comprising a welded array of tubular metal;
   said SSF is covered with an acoustic suppression fabric (ASF);
   said DFC comprises:
   (1) a cable strap having first and second looped ends;
   (2) first and second J-hooks each having a hooked end and a threaded end;
   (3) first and second threaded fasteners; and
   (4) a binding retention plate (BRP) having first and second retention holes;
   said DFC is configured to affix said ASP to said VSM by looping said cable strap around said SSF and said VSM to force a frictional contact surface between said SSF and said VSM;
   said first J-hook hooked end is engaged with said first cable looped end;
   said second J-hook hooked end is engaged with said second cable looped end;
   said first J-hook threaded end is retained in said first retention hole of said BRP using said first threaded fastener;
   said second J-hook threaded end is retained in said second retention hole of said BRP using said second threaded fastener; and
   said BRP is configured to make frictional contact with said VSM.

2. The sound abatement system of claim 1 wherein said VSMs comprise material selected from a group consisting of: I-beams (VIBs); I-beams (VIBs) having a flange-to-flange web dimension of 12 inches; steel pipe; and steel pipe having a diameter of 3.5 inches.

3. The sound abatement system of claim 1 wherein said SSF comprises construction parameters selected from a group consisting of: square tubular steel having outer frame dimensions of 8 feet by 20 feet and inner frame dimensions of 4 feet by 10 feet; 2-inch square tubular steel having outer frame dimensions of 8 feet by 20 feet and inner frame dimensions of 4 feet by 10 feet; and 2-inch square tubular steel having outer frame dimensions of 10 feet by 20 feet and inner frame dimensions of 5 feet by 10 feet.

4. The sound abatement system of claim 1 wherein said ASF comprises cementitious wood fiber.

5. The sound abatement system of claim 1 wherein said BRP comprises material selected from a group consisting of: angle iron; square tubing; flat bar stock; preformed retention plate; preformed retention bar; and crimped retention bar.

6. The sound abatement system of claim 1 wherein said cable strap is looped multiple times around said SSF and said VSM to affect fixation of said ASP to said VSM.

7. The sound abatement system of claim 1 wherein said first cable strap looped end and said second cable strap looped end further comprise a cable termination selected from a group consisting of: cable ferrule clip; double cable ferrule clip; cable clamp; and swaged cable eyelet.

8. A sound abatement method configured to operate on a sound abatement system comprising:
   (a) a plurality of vertical support members (VSMs);
   (b) a plurality of acoustic suppression panels (ASPs); and
   (c) a plurality of diagonal fastening cables (DFCs);
   wherein:
   said VSMs are positioned vertically in the ground surrounding the perimeter of an area to be provided sound suppression;
   said ASPs further comprise a structural support frame (SSF) comprising a welded array of tubular metal;
   said SSF is covered with an acoustic suppression fabric (ASF);
   said DFC comprises:
   (1) a cable strap having first and second looped ends;
   (2) first and second J-hooks each having a hooked end and a threaded end;
   (3) first and second threaded fasteners; and
   (4) a binding retention plate (BRP) having first and second retention holes;
   said DFC is configured to affix said ASP to said VSM by looping said cable strap around said SSF and said VSM to force a frictional contact surface between said SSF and said VSM;
   said first J-hook hooked end is engaged with said first cable looped end;
   said second J-hook hooked end is engaged with said second cable looped end;
   said first J-hook threaded end is retained in said first retention hole of said BRP using said first threaded fastener;
   said second J-hook threaded end is retained in said second retention hole of said BRP using said second threaded fastener; and said BRP is configured to make frictional contact with said VSM;

wherein said method comprises the steps of:
(1) driving said VSMs vertically into the ground surrounding the perimeter of a predefined area to be provided sound suppression;
(2) preassembling said ASPs to attach said ASF to the outer planar surface of said SSF;
(3) arraying said ASPs against said VSMs by repeated application of steps (4)-(8);
(4) locating said ASP coincident with said VSM and any previously installed ASPs;
(5) positioning the inner planar surfaces of said SSFs comprising said ASPs against said VSMs;
(6) affixing said SSFs to said VSMs using said DFCs at each point in which said tubular metal contacts said VSMs;
(7) at points where the outer frame edges of said SSF intersect, wrapping said cable strap around both SSF outer frame edges and said VSM to affix both SSF frames to said VSM; and
(8) proceeding to step (3) until said perimeter is enclosed by said ASP to a predetermined height.

9. The sound abatement method of claim 8 wherein said VSMs comprise material selected from a group consisting of: I-beams (VIBs); I-beams (VIBs) having a flange-to-flange web dimension of 12 inches; steel pipe; and steel pipe having a diameter of 3.5 inches.

10. The sound abatement method of claim 8 wherein said SSF comprises construction parameters selected from a group consisting of: square tubular steel having outer frame dimensions of 8 feet by 20 feet and inner frame dimensions of 4 feet by 10 feet; 2-inch square tubular steel having outer frame dimensions of 8 feet by 20 feet and inner frame dimensions of 4 feet by 10 feet; and 2-inch square tubular steel having outer frame dimensions of 10 feet by 20 feet and inner frame dimensions of 5 feet by 10 feet.

11. The sound abatement method of claim 8 wherein said ASF comprises brand cementitious wood fiber.

12. The sound abatement method of claim 8 wherein said BRP comprises material selected from a group consisting of: angle iron; square tubing; flat bar stock; preformed retention plate; preformed retention bar; and crimped retention bar.

13. The sound abatement method of claim 8 wherein said cable strap is looped multiple times around said SSF and said VSM to affect fixation of said ASP to said VSM.

14. The sound abatement method of claim 8 wherein said first cable strap looped end and said second cable strap looped end further comprise a cable termination selected from a group consisting of: cable ferrule clip; double cable ferrule clip; cable clamp; and swaged cable eyelet.

* * * * *